US007657907B2

(12) United States Patent
Fennan et al.

(10) Patent No.: US 7,657,907 B2
(45) Date of Patent: Feb. 2, 2010

(54) AUTOMATIC USER PROFILING

(75) Inventors: A. Mufit Fennan, Vancouver, WA (US); James H. Errico, Portland, OR (US); Petrus J. L. van Beek, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1155 days.

(21) Appl. No.: 10/261,550

(22) Filed: Sep. 30, 2002

(65) Prior Publication Data

US 2004/0073918 A1 Apr. 15, 2004

(51) Int. Cl.
*G06F 3/00* (2006.01)
*G06F 13/00* (2006.01)
*H04H 60/32* (2008.01)

(52) U.S. Cl. ............................. 725/46; 725/45; 725/14

(58) Field of Classification Search ............ 725/25–29, 725/34, 46, 47, 14, 45
See application file for complete search history.

(56) References Cited

U.S. PATENT DOCUMENTS 4,183,056 A 1/1980 Evans et al.
4,253,108 A 2/1981 Engel
4,298,884 A 11/1981 Reneau
4,321,635 A 3/1982 Tsuyuguchi
4,324,402 A 4/1982 Klose
4,520,404 A 5/1985 Von Kohorn
4,729,044 A 3/1988 Kiesel
4,937,685 A 6/1990 Barker et al.
5,012,334 A 4/1991 Etra
5,027,400 A 6/1991 Baji et al.
5,101,364 A 3/1992 Davenport et al.
5,109,482 A 4/1992 Bohrman
5,148,154 A 9/1992 MacKay et al.
5,200,825 A 4/1993 Perine
5,222,924 A 6/1993 Shin et al.
5,223,924 A 6/1993 Strubbe
5,241,671 A 8/1993 Reed et al.
5,288,069 A 2/1994 Matsumoto
D348,251 S 6/1994 Hendricks
5,333,091 A 7/1994 Iggulden et al.
5,339,393 A 8/1994 Duffy et al.
D354,059 S 1/1995 Hendricks
5,381,477 A 1/1995 Beyers, II et al.

(Continued)

FOREIGN PATENT DOCUMENTS

EP 0 854 645 7/1998

(Continued)

OTHER PUBLICATIONS

"User Preference Description for MPEG-7," ISO/IEC JTC1/SC29/WG11, MPEG 99/MXXXX, Maui, Hawaii, Dec. 1999, pp. 1-18.

(Continued)

*Primary Examiner*—John W Miller
*Assistant Examiner*—Chris Parry
(74) *Attorney, Agent, or Firm*—Chernoff, Vilhauer, McClung & Stenzel

(57) ABSTRACT

A user profiling system preferably includes a set of fuzzy logic operators. Based upon the fuzzy logic operators the user profile may be updated.

36 Claims, 46 Drawing Sheets

U.S. PATENT DOCUMENTS 5,404,316 A 4/1995 Klingler et al.
5,410,344 A 4/1995 Graves et al.
5,424,770 A 6/1995 Schmelzer et al.
5,434,678 A 7/1995 Abecassis
5,444,499 A 8/1995 Saitoh
5,452,016 A 9/1995 Ohara et al.
5,459,830 A 10/1995 Ohba et al.
5,483,278 A 1/1996 Strubbe et al.
D368,263 S 3/1996 Hendricks
5,521,841 A 5/1996 Arman et al.
5,550,965 A 8/1996 Gabbe et al.
5,559,549 A 9/1996 Hendricks et al.
5,589,945 A 12/1996 Abecassis
5,600,364 A 2/1997 Hendricks et al.
5,600,573 A 2/1997 Hendricks et al.
5,600,781 A 2/1997 Root et al.
5,610,653 A 3/1997 Abecassis
5,634,849 A 6/1997 Abecassis
5,635,982 A 6/1997 Zhang et al.
D381,991 S 8/1997 Hendricks
5,654,769 A 8/1997 Ohara et al.
5,659,350 A 8/1997 Hendricks et al.
5,664,046 A 9/1997 Abecassis
5,664,227 A 9/1997 Mauldin et al.
5,675,752 A 10/1997 Scott et al.
5,682,195 A 10/1997 Hendricks et al.
5,684,918 A 11/1997 Abecassis
5,694,163 A 12/1997 Harrison
5,696,869 A 12/1997 Abecassis
5,696,965 A 12/1997 Dedrick
5,710,884 A 1/1998 Dedrick
5,717,814 A 2/1998 Abecassis
5,717,879 A 2/1998 Moran et al.
5,717,923 A * 2/1998 Dedrick ...................... 707/102
5,724,472 A 3/1998 Abecassis
5,727,129 A 3/1998 Barrett et al.
5,732,216 A 3/1998 Logan et al.
5,734,853 A 3/1998 Hendricks et al.
5,758,257 A 5/1998 Herz et al.
5,758,259 A 5/1998 Lawler
5,761,881 A 6/1998 Wall
5,764,916 A 6/1998 Busey et al.
5,774,357 A 6/1998 Hoffberg et al.
5,778,108 A 7/1998 Coleman, Jr.
5,781,188 A 7/1998 Amiot et al.
5,794,210 A 8/1998 Goldhaber et al.
5,797,001 A 8/1998 Augenbraun et al.
5,798,785 A 8/1998 Hendricks et al.
5,805,733 A 9/1998 Wang et al.
5,809,426 A 9/1998 Radojeric et al.
5,821,945 A 10/1998 Yeo et al.
5,822,537 A 10/1998 Katseff et al.
5,828,809 A 10/1998 Chang et al.
5,828,839 A 10/1998 Moncreiff
5,835,087 A 11/1998 Herz et al.
D402,310 S 12/1998 Hendricks
5,848,396 A 12/1998 Gerace
5,861,881 A 1/1999 Freeman et al.
5,867,226 A 2/1999 Wehmeyer et al.
5,867,386 A 2/1999 Hoffberg et al.
5,875,107 A 2/1999 Nagai et al.
5,875,108 A 2/1999 Hoffberg et al.
5,877,821 A 3/1999 Newlin et al.
5,878,222 A 3/1999 Harrison
5,892,536 A 4/1999 Logan et al.
5,900,867 A 5/1999 Schindler et al.
5,901,246 A 5/1999 Hoffberg et al.
5,903,454 A 5/1999 Hoffberg et al.
5,907,324 A 5/1999 Larson et al.
5,913,013 A 6/1999 Abecassis
5,913,030 A 6/1999 Lotspiech et al.
5,920,300 A 7/1999 Yamazaki et al.
5,920,360 A 7/1999 Coleman, Jr.
5,920,477 A 7/1999 Hoffberg et al.
5,923,365 A 7/1999 Tamir et al.
5,926,624 A 7/1999 Katz et al.
5,930,783 A 7/1999 Li et al.
5,933,811 A 8/1999 Angles et al.
5,945,988 A 8/1999 Williams et al.
5,956,026 A 9/1999 Ratakonda
5,958,006 A 9/1999 Eggleston et al.
5,959,681 A 9/1999 Cho
5,959,697 A 9/1999 Coleman, Jr.
5,969,755 A 10/1999 Courtney
5,973,683 A 10/1999 Cragun et al.
5,977,964 A 11/1999 Williams et al.
5,986,690 A 11/1999 Hendricks
5,986,692 A 11/1999 Logan et al.
5,987,211 A 11/1999 Abecassis
5,990,927 A 11/1999 Hendricks et al.
5,990,980 A 11/1999 Golin
5,995,094 A 11/1999 Eggen et al.
5,995,095 A 11/1999 Ratakonda
6,002,833 A 12/1999 Abecassis
6,005,565 A 12/1999 Legall et al.
6,005,597 A 12/1999 Barrett et al.
6,006,265 A 12/1999 Rangan et al.
6,011,895 A 1/2000 Abecassis
6,014,183 A 1/2000 Hoang
6,020,883 A 2/2000 Herz et al.
6,029,195 A 2/2000 Herz
6,038,367 A 3/2000 Abecassis
6,041,323 A 3/2000 Kubota
6,049,821 A 4/2000 Theriault et al.
6,052,554 A 4/2000 Hendricks et al.
6,055,018 A 4/2000 Swan
6,060,167 A 5/2000 Morgan et al.
6,064,385 A 5/2000 Sturgeon et al.
6,064,449 A 5/2000 White et al.
6,067,401 A 5/2000 Abecassis
6,070,167 A 5/2000 Qian et al.
6,072,934 A 6/2000 Abecassis
6,076,166 A 6/2000 Moshfeghi et al.
6,078,917 A 6/2000 Paulsen, Jr. et al.
6,078,928 A 6/2000 Schnase et al.
6,081,278 A 6/2000 Chen
6,081,750 A 6/2000 Hoffberg et al.
6,088,455 A 7/2000 Logan et al.
6,088,722 A 7/2000 Herz et al.
6,091,886 A 7/2000 Abecassis
RE36,801 E 8/2000 Logan et al.
6,100,941 A 8/2000 Dimitrova et al.
6,115,709 A 9/2000 Gilmour et al.
6,122,657 A 9/2000 Hoffman, Jr. et al.
6,128,624 A 10/2000 Papierniak et al.
6,133,909 A 10/2000 Schein et al.
6,137,486 A 10/2000 Yoshida et al.
6,141,041 A 10/2000 Carlbom et al.
6,141,060 A 10/2000 Honey et al.
6,144,375 A 11/2000 Jain et al.
6,151,444 A 11/2000 Abecassis
D435,561 S 12/2000 Pettigrew et al.
6,160,989 A 12/2000 Hendricks et al.
6,161,142 A 12/2000 Wolfe et al.
6,163,316 A * 12/2000 Killian ...................... 715/721
6,169,542 B1 1/2001 Hooks et al.
6,177,931 B1 1/2001 Alexander et al.
6,181,335 B1 1/2001 Hendricks et al.
6,185,625 B1 2/2001 Tso et al.
6,195,497 B1 2/2001 Nagasaka et al.
6,198,767 B1 3/2001 Greenfield et al.
6,199,076 B1 3/2001 Logan et al.
6,201,536 B1 3/2001 Hendricks et al.
6,208,805 B1 3/2001 Abecassis

| | | | | |
|---|---|---|---|---|
| 6,212,527 | B1 | 4/2001 | Gustman | |
| 6,215,526 | B1 | 4/2001 | Barton et al. | |
| 6,216,129 | B1 | 4/2001 | Eldering | |
| 6,219,837 | B1 | 4/2001 | Yeo et al. | |
| 6,226,678 | B1 | 5/2001 | Mattaway et al. | |
| 6,230,172 | B1 | 5/2001 | Purnaveja et al. | |
| 6,230,501 | B1 | 5/2001 | Bailey, Sr. et al. | |
| 6,233,289 | B1 | 5/2001 | Fredrickson | |
| 6,233,389 | B1 | 5/2001 | Barton et al. | |
| 6,233,586 | B1 | 5/2001 | Chang et al. | |
| 6,233,590 | B1 | 5/2001 | Shaw et al. | |
| 6,236,395 | B1 | 5/2001 | Sezan et al. | |
| 6,240,406 | B1 | 5/2001 | Tannen | |
| 6,252,444 | B1 | 6/2001 | Hoffberg | |
| 6,252,544 | B1 | 6/2001 | Hoffberg | |
| 6,253,203 | B1 | 6/2001 | O'Flaherty et al. | |
| 6,269,216 | B1 | 7/2001 | Abecassis | |
| 6,275,268 | B1 | 8/2001 | Ellis et al. | |
| 6,286,140 | B1 | 9/2001 | Ivanyi | |
| 6,286,141 | B1 | 9/2001 | Browne et al. | |
| 6,289,165 | B1 | 9/2001 | Abecassis | |
| 6,298,482 | B1 | 10/2001 | Seidman et al. | |
| 6,304,665 | B1 | 10/2001 | Cavallaro et al. | |
| 6,304,715 | B1 | 10/2001 | Abecassis | |
| 6,311,189 | B1 | 10/2001 | DeVries et al. | |
| 6,317,718 | B1 | 11/2001 | Fano | |
| 6,317,881 | B1 | 11/2001 | Shah-Nazaroff et al. | |
| 6,320,624 | B1 | 11/2001 | Ayer et al. | |
| 6,339,842 | B1 | 1/2002 | Fernandez et al. | |
| 6,342,904 | B1 | 1/2002 | Vasudevan et al. | |
| 6,353,444 | B1 | 3/2002 | Katta et al. | |
| 6,363,160 | B1 | 3/2002 | Bradski et al. | |
| 6,370,504 | B1 | 4/2002 | Zick et al. | |
| 6,405,371 | B1 | 6/2002 | Oosterhout et al. | |
| 6,412,008 | B1 | 6/2002 | Fields et al. | |
| 6,418,168 | B1 | 7/2002 | Narita | |
| 6,421,680 | B1 | 7/2002 | Kumhyr et al. | |
| 6,425,133 | B1 | 7/2002 | Leary | |
| 6,426,761 | B1 | 7/2002 | Kanevsky et al. | |
| 6,426,974 | B2 | 7/2002 | Takahashi et al. | |
| 6,438,579 | B1 | 8/2002 | Hosken | |
| 6,439,572 | B1 | 8/2002 | Bowen | |
| 6,446,261 | B1 | 9/2002 | Rosser | |
| 6,480,667 | B1 | 11/2002 | O'Connor | |
| 6,487,390 | B1 | 11/2002 | Virine et al. | |
| 6,490,320 | B1 | 12/2002 | Vetro et al. | |
| 6,498,783 | B1 | 12/2002 | Lin | |
| 6,522,342 | B1 | 2/2003 | Gagnon et al. | |
| 6,530,082 | B1 | 3/2003 | Del Sesto et al. | |
| 6,535,639 | B1 | 3/2003 | Uchihachi et al. | |
| 6,543,053 | B1 | 4/2003 | Li et al. | |
| 6,546,555 | B1 | 4/2003 | Hjelsvold et al. | |
| 6,549,643 | B1 | 4/2003 | Toklu et al. | |
| 6,553,178 | B2 | 4/2003 | Abecassis | |
| 6,556,767 | B2 | 4/2003 | Okayama et al. | |
| 6,571,279 | B1 | 5/2003 | Herz et al. | |
| 6,578,075 | B1 | 6/2003 | Nieminen et al. | |
| 6,581,207 | B1 | 6/2003 | Sumita et al. | |
| 6,587,127 | B1 | 7/2003 | Leeke et al. | |
| 6,593,936 | B1 | 7/2003 | Huang et al. | |
| 6,594,699 | B1 | 7/2003 | Sahai et al. | |
| 6,597,859 | B1 | 7/2003 | Leinhart et al. | |
| 6,611,876 | B1 | 8/2003 | Barrett et al. | |
| 6,614,987 | B1 | 9/2003 | Ismail et al. | |
| 6,658,095 | B1 | 12/2003 | Yoakum et al. | |
| 6,665,423 | B1 | 12/2003 | Mehrotra et al. | |
| 6,675,158 | B1 | 1/2004 | Rising et al. | |
| 6,678,635 | B2 | 1/2004 | Tovinkere et al. | |
| 6,678,659 | B1 | 1/2004 | Van Kommer | |
| 6,681,395 | B1 | 1/2004 | Nishi | |
| 6,691,126 | B1 | 2/2004 | Syeda-Mahmood | |
| 6,697,523 | B1 | 2/2004 | Divakaran et al. | |
| 6,704,929 | B1 | 3/2004 | Ozer et al. | |
| 6,724,933 | B1 | 4/2004 | Lin et al. | |
| 6,741,655 | B1 | 5/2004 | Chang et al. | |
| 6,754,904 | B1 | 6/2004 | Cooper et al. | |
| 6,754,906 | B1 | 6/2004 | Finseth et al. | |
| 6,766,362 | B1 | 7/2004 | Miyasaka et al. | |
| 6,774,917 | B1 | 8/2004 | Foote et al. | |
| 6,813,775 | B1 | 11/2004 | Finseth et al. | |
| 6,820,278 | B1 | 11/2004 | Ellis | |
| 6,829,781 | B1 | 12/2004 | Bhagavath et al. | |
| 6,868,440 | B1 | 3/2005 | Gupta et al. | |
| 6,880,171 | B1 | 4/2005 | Ahmad et al. | |
| 6,925,455 | B2 | 8/2005 | Gong et al. | |
| 6,931,595 | B2 | 8/2005 | Pan et al. | |
| 6,961,954 | B1 | 11/2005 | Maybury et al. | |
| 6,970,510 | B1 | 11/2005 | Wee et al. | |
| 6,981,129 | B1 | 12/2005 | Boggs et al. | |
| 6,990,679 | B2 | 1/2006 | Curreri | |
| 6,993,245 | B1 | 1/2006 | Harville | |
| 7,026,964 | B2 | 4/2006 | Baldwin et al. | |
| 7,055,168 | B1 * | 5/2006 | Errico et al. | 725/46 |
| 7,065,709 | B2 * | 6/2006 | Ellis et al. | 715/719 |
| 7,096,486 | B1 * | 8/2006 | Ukai et al. | 725/58 |
| 7,130,866 | B2 * | 10/2006 | Schaffer | 707/104.1 |
| 7,136,710 | B1 | 11/2006 | Hoffberg et al. | |
| 7,146,626 | B1 * | 12/2006 | Arsenault et al. | 725/46 |
| 7,185,355 | B1 | 2/2007 | Ellis et al. | |
| 7,296,285 | B1 * | 11/2007 | Jun et al. | 725/46 |
| 7,343,381 | B2 | 3/2008 | Shin | |
| 7,380,262 | B2 * | 5/2008 | Wang et al. | 725/46 |
| 7,454,775 | B1 | 11/2008 | Schaffer et al. | |
| 2001/0030664 | A1 | 10/2001 | Shulman et al. | |
| 2001/0043744 | A1 | 11/2001 | Hieda | |
| 2002/0013943 | A1 | 1/2002 | Haberman et al. | |
| 2002/0018594 | A1 | 2/2002 | Xu et al. | |
| 2002/0026345 | A1 | 2/2002 | Juels | |
| 2002/0069218 | A1 | 6/2002 | Sull et al. | |
| 2002/0079165 | A1 | 6/2002 | Wolfe | |
| 2002/0080162 | A1 | 6/2002 | Pan et al. | |
| 2002/0083473 | A1 | 6/2002 | Agnihotri et al. | |
| 2002/0093591 | A1 | 7/2002 | Gong et al. | |
| 2002/0097165 | A1 | 7/2002 | Hulme | |
| 2002/0104087 | A1 * | 8/2002 | Schaffer et al. | 725/46 |
| 2002/0108112 | A1 | 8/2002 | Wallace et al. | |
| 2002/0120929 | A1 | 8/2002 | Schwalb et al. | |
| 2002/0133412 | A1 | 9/2002 | Oliver et al. | |
| 2002/0141619 | A1 | 10/2002 | Standridge et al. | |
| 2002/0156909 | A1 | 10/2002 | Harrington | |
| 2002/0178135 | A1 | 11/2002 | Tanaka | |
| 2002/0184220 | A1 | 12/2002 | Teraguchi et al. | |
| 2002/0190991 | A1 | 12/2002 | Efran et al. | |
| 2002/0194589 | A1 | 12/2002 | Cristofalo et al. | |
| 2003/0001880 | A1 | 1/2003 | Holtz et al. | |
| 2003/0007555 | A1 | 1/2003 | Divakaran et al. | |
| 2003/0026592 | A1 | 2/2003 | Kawahara et al. | |
| 2003/0033288 | A1 * | 2/2003 | Shanahan et al. | 707/3 |
| 2003/0066068 | A1 | 4/2003 | Gutta et al. | |
| 2003/0067554 | A1 * | 4/2003 | Klarfeld et al. | 348/461 |
| 2003/0072440 | A1 | 4/2003 | Murray et al. | |
| 2003/0081937 | A1 | 5/2003 | Li | |
| 2003/0084448 | A1 * | 5/2003 | Soundararajan | 725/46 |
| 2003/0084450 | A1 | 5/2003 | Thurston et al. | |
| 2003/0088872 | A1 | 5/2003 | Maissel et al. | |
| 2003/0105682 | A1 | 6/2003 | Dicker et al. | |
| 2003/0177503 | A1 | 9/2003 | Sull et al. | |
| 2003/0182663 | A1 | 9/2003 | Gudorf et al. | |
| 2003/0187650 | A1 | 10/2003 | Moore et al. | |
| 2003/0229900 | A1 | 12/2003 | Reisman | |
| 2004/0003041 | A1 | 1/2004 | Moore et al. | |
| 2004/0015569 | A1 | 1/2004 | Lonnfors et al. | |
| 2004/0017389 | A1 | 1/2004 | Pan et al. | |
| 2004/0030750 | A1 | 2/2004 | Moore et al. | |
| 2004/0032486 | A1 | 2/2004 | Shusman | |
| 2004/0088289 | A1 | 5/2004 | Xu et al. | |

| | | | | |
|---|---|---|---|---|
| 2004/0098754 | A1 | 5/2004 | Vella et al. | |
| 2004/0125124 | A1 | 7/2004 | Kim et al. | |
| 2004/0125877 | A1 | 7/2004 | Chang et al. | |
| 2004/0197088 | A1 | 10/2004 | Ferman et al. | |
| 2004/0227768 | A1 | 11/2004 | Bates et al. | |
| 2004/0231003 | A1 | 11/2004 | Cooper et al. | |
| 2004/0250272 | A1* | 12/2004 | Durden et al. | 725/25 |
| 2005/0021784 | A1* | 1/2005 | Prehofer | 709/229 |
| 2005/0028194 | A1* | 2/2005 | Elenbaas et al. | 725/32 |
| 2005/0055713 | A1 | 3/2005 | Lee et al. | |
| 2005/0102202 | A1 | 5/2005 | Linden et al. | |
| 2005/0131906 | A1 | 6/2005 | Shin | |
| 2005/0262542 | A1 | 11/2005 | DeWeese et al. | |
| 2006/0129544 | A1* | 6/2006 | Yoon et al. | 707/3 |
| 2007/0011148 | A1 | 1/2007 | Burkey et al. | |

FOREIGN PATENT DOCUMENTS

| | | |
|---|---|---|
| EP | 0 878964 | 11/1998 |
| EP | 1250807 | 10/2002 |
| GB | 2 325 537 | 11/1998 |
| JP | 08125957 | 5/1996 |
| JP | 09322154 | 12/1997 |
| JP | 2000-229577 | 8/2000 |
| JP | 2001-036861 | 2/2001 |
| JP | 2001-085717 | 3/2001 |
| JP | 2001-206550 | 7/2001 |
| JP | 2002-503896 | 2/2002 |
| WO | WO 94/14284 | 6/1994 |
| WO | WO 98/56188 | 12/1998 |
| WO | WO 99/01984 | 1/1999 |
| WO | WO 99/04143 | 1/1999 |
| WO | WO 99/12194 | 3/1999 |
| WO | WO 99/65237 | 12/1999 |
| WO | WO 01/50753 | 7/2001 |

OTHER PUBLICATIONS

"A Proposal for User Preference Descriptions in MPEG-7," ISO/IEC JTC1SC29/WG11 M5222, MPEG 99, Oct. 4, 1999, pp. 1-6.

Michael G. Christel, Alexander G. Hauptmann, Adrienne S. Warmack, Scott A. Crosby, "Adjustable Filmstrips and Skims as Abstractions for a Digital Video Library," Computer Science Department, Carnegie Mellon University, Pittsburgh, PA 15213 USA.

Peng Xu, et al., "Algorithms and System for High-Level Structure Analysis and Event Detection in Soccer Video," Columbia University, ADVENT—Technical Report #111, Jun. 2001.

Keith Millar and David White, "A Schema for TV-Anytime: Segmentation Metadata AN195," NDS Contribution from MyTV, NDS Limited 2000, 27 pages.

Keith Millar et al., "A Schema for TV-Anytime Segmentation Metadata AN195rt myTV project," NDS Systems Division, NDS Limited 2000, 28 pages.

S.E. Levinson, L. R. Rabiner, and M. M. Sondhi, "An Introduction to the Application of the Theory of Probabilistic Functions of a Markov Process to Automatic Speech Recognition," Copyright 1983 American Telephone and Telegraph company, The Bell system Technical Journal, vol. 62. No. 4, Apr. 1983, pp. 1035-1074.

Dennis Yow, et al., "Analysis and Presentation of Soccer Highlights from Digital Video," To appear in the Proceedings, Second Asian Conference on Computer Vision (ACCV '95).

Drew D. Saur, et al. "Automated Analysis and Annotation of Basketball Video," SPIE vol. 3022, pp. 176-187, 1997.

Hao Pan, et al., "Automatic Detection of Replay Segments in Broadcast Sports Programs by Detection of Logos in Scene Transitions," 2002 IEEE, pp. IV-3385-IV-3388.

Yihong Gong, et al., "Automatic Parsing of TV soccer Programs," 1995 IEEE, pp. 167-174.

Jonathan D. Courtney, "Automatic Video Indexing via Object Motion Analysis," Pattern Recognition, vol. 30, No. 4, pp. 607-625, 1997.

Yong Rui, et al. "Automatically Extracting Highlights for TV Baseball Programs," ACM Multimedia 2000 Los Angeles, CA, USA, pp. 105-115.

Nuno Vasconcelos and Andrew Lippman, "Bayesian Modeling of Video Editing and Structure: Semantic Features for Video Summarization and Browsing," 1998 IEEE, pp. 153-157.

Padhraic Smyth, "Belief Networks, Hidden Markov Models, and Markov Random Fields: a Unifying View," To appear in Pattern Recognition Letters, 1998, Information and Computer Science Department, University of California, Irvine, CA 92697-3425, Mar. 20, 1998.

Francis C. Li et al., "Browsing Digital Video," CHI 2000 Apr. 1-6, 2000, CHI Letters vol. 2 issue 1, pp. 169-176.

Franklin Reynolds, et al. "Composite Capability/Preference Profiles (CC/PP): A user side framework for content negotiation," W3C Note Jul. 27, 1999, http://www.w3.org/1999/07/NOTE-CCPP-19990727/, 15 pages.

T. Lambrou, et al., "Classification of Audio Signals Using Statistical Features on Time and Wavelet Transform Domains," 1998 IEEE, pp. 3621-3624.

Rainer Lienhart, "Comparison of Automatic Shot Boundary Detection Algorithms," Part of the IS&T/SPIE conference on Storage and Retrieval for Image and Video Databases VII, San Jose, CA, Jan. 1999, SPIE vol. 3656, pp. 290-301.

John Canny, "A Computational Approach to Edge Detection," IEEE Transactions on Pattern Analysis and Machine Intelligence, vol. PAMI-8, No. 6, Nov. 1986, IEEE 1986, pp. 679-698.

Richard Qian et al., "A Computational Approach to Semantic Event Detection," 1999 IEEE, pp. 200-206.

F. Arman, et al., "Content-based Browsing of Video Sequences," to appear in the Proceedings of ACM International Conference on Multimedia '94, Oct. 15-20, San Francisco, CA, 7 pages.

Hongjiang Zhang, et al. "Content-Based Video Browsing Tools," SPIE vol. 2417, 1995, pp. 389-398.

Stephen W. Smoliar, et al. "Content-Based Video Indexing and Retrieval," 1994 IEEE, pp. 62-72.

Stefan Eickeler, et al., "Content-based Video Indexing of TV Broadcast News Using Hidden Markov Models," Proceedings of IEEE International Conference on Acoustics, Speech, and Signal Processing, Phoenix, AZ, 1999, 4 pages.

Kathy Bohrer and Bobby Holland, editors, "Customer Profile Exchange (CPExchange) Specification," Oct. 20. 2000, Version 1.0, International digital Enterprise Alliance, Inc. (IDEAlliance), pp. 1-127.

Jane Hunter (DSTC Pty Ltd), Editor, "DDL Working Draft 3.0," ISO/IEC JTC1/SC29/WG11 N3391, MPEG 00/May 2000 (Geneva), 23 pages.

Vikrant Kobla, et al. "Detection of Slow-Motion Replay Sequences for Identifying Sports Videos," Laboratory for Language and Media Processing, University of Maryland, College Park, MD 20742-3275, USA, 6 pages.

Richard J. Qian, et al. "Description Schemes for Consumer Video Applications," Proposal ID 429, ISO/IEC JTC1/SC29/WG11—MPEG-7 Proposal, Feb. 1999.

Zhu Liu and Qian Huang, "Detecting News Reporting Using Audio/Visual Information," 1999 IEEE, pp. 324-328.

Y Kawai, "Detection of Replay Scenes in Broadcasted Sports Video by focusing on digital Video Effects," IEICE (D-II), vol. J84-D-II, No. 2, pp. 432-435, Feb. 2001, (In Japanese), pp. 432-437.

Vikrant Kobla, et al., "Detection of Slow-Motion Replay Sequences for Identifying Sports Videos," Laboratory for Language and Media Processing, University of Maryland, College Park, MD 20742-3275, USA, pp. 135-140.

H. Pan, et al. "Detection of Slow-Motion Replay Segments in sports Video for Highlights Generation," Proceedings of IEEE International Conference on Acoustics, Speech, and signal Processing, Salt Lake City, UT, 2001, 4 pages.

Alan E Bell, "The dynamic digital disk," IEEE Spectrum, Oct. 1999, pp. 28-35.

Baoxin Li and M. Ibrahim Sezan, "Event Detection and Summarization in Sports Video," Sharp Laboratories of America, 5750 NW Pacific Rim Blvd., Camas, WA 98607, USA, 5 pages.

Minerva Yeung, "Extracting Story Units from Long Programs for Video Browsing and Navigation," Proceedings of Multimedia 1996, 1996 IEEE, pp. 296-304.

Boon-Lock Yeo et al., "On the Extraction of DC Sequence from MPEG Compressed Video," 1995 IEEE, pp. 260-263.
FAP Specifications, MPEG-4 Compliant Facial Animation, http://www.dsp.dist.unige.it/~pok/RESEARCH/MPEG/fapspec.htm, 4 pages.
Frank R. Kschischang, et al., "Factor Graphs and the Sum-Product Algorithm," IEEE Transactions on Information Theory, vol. 47, No. 2, Feb. 2001, pp. 498-519.
John S. Boreczky, et al. "A Hidden Markov Model Framework for Video Segmentation Using Audio and Image Features," Proceedings of IEEE International Conference on Acoustics, Speech, and Signal Processing, Seattle, WA, 1998, 4 pages.
Wayne Wolf, "Hidden Markov Model Parsing of Video Programs," Proceedings of the 1997 IEEE International Conference on Acoustics, Speech, and Signal Processing (ICASSP '97), pp. 2609-2611.
Bilge Gunsel, et al., "Hierarchical Temporal video Segmentation and content Characterization," Dept. of Electrical Engineering and Center for Electronic Imaging Systems, University of Rochester, Rochester, NY 14627, SPIE vol. 3229, 1997.
M. R. Naphade, et al. "A High-Performance Shot Boundary Detection Algorithm Using Multiple Cues," Proceedings of IEEE International Conference on Image Processing, Chicago, IL, 1998, pp. 884-887.
Vikrant Kobla, et al., "Identifying sports videos using replay, text, and camera motion features," Laboratory for Language and Media Processing, University of Maryland, College Park, MD 20742-3275, USA, Date Unknown.
B. B. Chaudhuri, et al., "Improved fractal geometry based texture segmentation technique," IEE Proceedings-E, vol. 140, No. 5, Sep. 1993, pp. 233-241.
Toshio Kawashima, et al., "Indexing of Baseball Telecast for Content-based Video Retrieval," Dept. of Information engineering, Hokkaido University, Kita-13, Nishi-8, Sapporo, 060-8628, Japan, 1998 IEEE, pp. 871-874.
Dulce Ponceleon, et al. "Key to Effective Video Retrieval: Effective Cataloging and Browsing," ACM Multimedia '98, Bristol, UK, 1998, pp. 99-107.
Henry Lieberman, et al. "Let's Browse: A collaborative Web Browsing Agent," Massachusetts Institute of Technology, 20 Ames Street #E15-305, Cambridge, MA 02139, USA, Copyright ACM 1999, pp. 65-68.
Noboru Babaguchi, et al., "Linking Live and Replay Scenes in Broadcasted Sports Video," ACM Multimedia Workshop, Marina Del Rey, CA, USA, Copyright ACM 2000, pp. 205-208.
Giridharan Iyengar, et al., "Models for automatic classification of video sequences," SPIE vol. 3312, 1997, pp. 216-227.
Nevenka Dimitrova, et al., "Motion Recovery for Video Content Classification," ACM Transactions on Information Systems, vol. 13, No. 4, Oct. 1995, pp. 408-439.
DDL Group, "MPEG-7 Description Definition Language Document V 2," ISO/IEC JTC1/SC29/WG11/N2997, Oct. 1999/Melbourne, 56 pages.
Description Scheme Group, "MPEG-7 Description Schemes (V0. 5)," ISO/IEC JTC1/SC29/WG11 N2844, MPEG 99, Jul. 1999, Vancouver, pp. 1-59.
Description Scheme Group, "MPEG-7 Generic AV Description Schemes (V0.7)," MPEG 99, Oct. 1999, Melbourne.
AHG on MPEG7 Media/Meta DSs and Harmonization with other Schemes, "MPEG-7 Media/Meta DSs upgrade (V0.2)," ISO/IEC JTC1/SC29/WG11 MXXXX, MPEG 99 Oct. 1999, Melbourne, pp. 1-17.
Peter Van Beek, et al, Editors, "MPEG-7 Multimedia Description Schemes WD (Version 3.0)," ISO/IEC JTC 1/SC 29/WG 11/N3411, May 2000, Geneva.
Peter Van Beek, et al., Editors, "MPEG-7 Multimedia Description Schemes XM (Version 3.0)," ISO/IEC JTC 1/SC29/WG 11/N3410, May 2000, Geneva.
P. Van Beek et al., "MPEG-7 Requirements for Description of Users," ISO/IEC JTC1/SC29/WG11, MPEG99/4601, Mar. 1999, 5 pages.
F. Pereira, Editor, "MPEG-7 Requirements Document V.9," ISO/IEC JTC1/SC29/WG11/N2859, Jul. 1999/Vancouver (Canada).
Sylvie Jeannin, et al., Editors, "MPEG-7 Visual part of eXperimentation Model Version 6.0," ISO/IEC JTC1/SC29/WG11/N3398, Geneva, Jun. 2000.
Jane Hunter (DSTC Pty Ltd.), "Text of ISO/IEC CD 15938-2 Information technology—Multimedia content description interface—Part 2 Description definition language," ISO/IEC JTC1/SC29/WG11 N3702, MPEG 00/3702, Oct. 2000 (La Baule).
"Information Technology—Multimedia Content Description Interface—Part 5: Multimedia Description Schemes," ISO/IEC JTC 1/SC 29 N 3705, Nov. 17, 2000, ISO/IEC CD 15938-5.
Peter Van Beek, et al., "Text of 15938-5 FCD Information Technology—Multimedia Content Description Interface—Part 5 Multimedia Description Schemes," ISO/IEC JTC 1/SC 29 N3966 Mar. 12, 2001, 500 pages.
Yao Wang, et al., "Multimedia Content Analysis," IEEE Signal Processing Magazine, Nov. 2000, pp. 12-35.
Mark T. Maybury, et al., "Multimedia Summaries of Broadcast News," Advanced Information Systems Center, The MITRE Corporation, 202 Burlington Road, Bedford, MA 01730, USA, pp. 442-449.
Shinichi Satoh, et al., "Name-It: Association of Face and Name in Video," School of Computer Science, Carnegie Mellon University, Pittsburgh, PA 15213, Dec. 20, 1996, 19 pages.
Stuart J. Golin, "New metric to detect wipes and other gradual transitions in . . . " Part of the IS&T/SPIE Conference on Visual communications and Image Processing '99, San Jose, CA Jan. 1999, SPIE vol. 3653, pp. 1464-1474.
Ullas Gargi, et al., "Transactions Letters: Performance Characterization of Video-Shot-Change Detection Methods," IEEE Transactions on Circuits and Systems for Video Technology, vol. 10. No. 1, Feb. 2000, 13 pages.
Michael Ehrmantraut, et al., "The Personal Electronic Program guide—Towards the Pre-selection of Individual TV Programs," 1996 ACM, pp. 243-250.
Kyoungro Yoon, et al., "Proposal of Usage History DS," ISO/IEC JTC1/SC29/WG11, MPEG00/M6259, Jul. 2000, Beijing.
Michael T. Chan, et al., "Real-Time Lip Tracking and Bimodal Continuous Speech Recognition," Rockwell Science Center, 1049 Camino Dos Rios, Thousand Oaks, CA 91360, 6 pages, date unknown.
Boon-Lock Yeo, et al., "Retrieving and Visualizing Video," Communications of the ACM, Dec. 1997, vol. 40, No. 12, pp. 43-52.
H.B. Lu, et al., "Robust Gradual Scene Change Detection," Proceedings of IEEE International Conference on Image Processing, Kobe, Japan, 1999, 5 pages.
Richard J. Qian, et al., "A Robust Real-Time Face Tracking Algorithm," Sharp Laboratories of America, 5750 N.W. Pacific Rim Blvd., Camas, WA 98607, 1998 IEEE, pp. 131-135.
Lexing Lie, "Segmentation and Event Detection in Soccer Audio," EE 6820 Project, Soccer Audio, May 15, 2001, 9 pages.
Riccardo Leonardi, et al., "Content-Based Multimedia Indexing and Retrieval: Semantic Indexing of Multimedia Documents," IEEE 2002, pp. 44-51.
R. W. Picard, "A Society of Models for Video and Image Libraries," IBM Systems Journal, vol. 35, Nos. 3 & 4, 1996, pp. 292-312.
Alberto Del Bimbo, et al., "A Spatial Logic for Symbolic Description of Image Contents," Journal of Visual Languages and Computing (1994) 5, pp. 267-286.
Jin-Soo Lee, et al. Editors, "Specification of The UsageHistory DS," ISO/IEC JTC 1/SC 29/WG 11/M5748, Mar. 2000, Noordwijkerhout, pp. 1-6.
Lexing Xie, et al., "Structure Analysis of Soccer Video with Hidden Markov Models," Department of Electrical Engineering, Columbia University, New York, NY, 4 pages.
Selim Aksoy, et al., "Textural Features for Image Database Retrieval," Intelligent Systems Laboratory, Department of Electrical Engineering, University of Washington, Seattle, WA 98195-2500, 5 pages.
B. S. Manjunath, et al., "Texture Features for Browsing and Retrieval of Image Data," IEEE Transactions on Pattern Analysis and Machine Intelligence, vol. 18, No. 8, Aug. 1996, pp. 837-842.

Richard W. Conners, et al., "A Theoretical comparison of Texture Algorithms," IEEE Transactions on Pattern Analysis and Machine Intelligence, vol., PAMI-2, No. 3, May 1980, pp. 204-222.
Noboru Babaguchi, "Towards Abstracting Sports Video by Highlights," ISIR, Osaka University, Ibaraki, Osaka 567-0047, Japan, 2000 IEEE, pp. 1519-1522.
Stephen S. Intille, "Tracking Using a Local Closed-World Assumption: Tracking in the Football Domain," MIT Media Lab Perceptual computing group Technical Report No. 296, pp. 1-62.
Lawrence R. Rabiner, "A Tutorial on Hidden Markov Models and Selected Applications in Speech Recognition," Proceedings of the IEEE, vol. 77, No. 2, Feb. 1989, pp. 257-286.
Ted Lewis, "UbiNet: The Ubiquitous Internet Will Be Wireless,"DaimlerChrysler Research & Technology North America, 3 pages, date unknown.
Richard O. Duda et al., "Use of the Hough Transformation To Detect Lines and Curves in Pictures," Communications of the ACM, Jan. 1972, vol. 15, No. 1, pp. 11-15.
"User Preference Descriptions for MPEG-7," ISO/IEC JTC1/SC29/WG11, MPEG 99/MXXXX, Maui, Hawaii, Dec. 1999, pp. 1-18.
Rainer Lienhart, et al., "Video Abstracting," Communications of the ACM, Dec. 1997/ vol. 40, No. 12, pp. 55-62.
Shingo Uchihashi, et al., "Video Manga: Generating Semantically Meaningful Video Summaries,"FX Palo Alto Laboratory, 3400 Hillview Avenue, Palo Alto, CA 94304, USA, pp. 383-392.
Michael A. Smith, et al., "Video Skimming for Quick Browsing based on Audio and Image Characterization," School of Computer Science, Carnegie Mellon University, Pittsburgh, PA 15213, Jul. 30, 1995, 24 pages.
Daniel Dementhon, et al., "Video summarization by Curve Simplification," Language and Media Processing (LAMP), University of Maryland, College Park, MD 20742-3275, 1998 ACM, pp. 211-218.
Chung-Lin Huang, et al., "Video summarization using Hidden Markov Model," Electrical Engineering Department, National Tsing-Hua University, Hsin-Chu, Taiwan, ROC, 2001 IEEE, pp. 473-477.
Ken Masumitsu, et al., "Video Summarization Using Reinforcement Learning in Eigenspace," IBM Research, Tokyo Research Laboratory, 1623-14, Shimotsuruma, Yamato-shi, Kanagawa, Japan, 4 pages.
Yihong Gong, et al., "Video Summarization Using Singular Value Decomposition," C&C Research laboratories, NEc USA, Inc. 110 Rio Robles, San Jose, CA 95134, USA, 2000 IEEE, 7 pages.
Yihong Gong, et al., "Video Summarization with Minimal Visual Content Redundancies," C&C Research Laboratories, NEC USA, Inc., 110 Rio robles, San Jose, CA 95134, USA, 2001 IEEE. pp. 362-365.
Minerva M. Yeung, et al., "Video visualization for Compact Presentation and Fast Browsing of Pictorial Content," IEEE Transactions on circuits and Systems for Video Technology, vol. 7, No. 5, Oct. 1997, pp. 771-785.
Stephen S. Intille, et al., "Visual Tracking Using closed-Worlds,", MIT Media Laboratory Perceptual computing Section Technical Report No. 294, Nov. 1994. pp. 1-18.
Leszek Cieplinski, et al. "Visual Working Draft 3.0," ISO/IEC JTC1/SC29/WG11/N3399, Jun. 2000 (Geneva), 92 pages.
Sunghoon Choi, et al., "Where are the ball and players?: Soccer Game Analysis with Color-based Tracking and Image Mosaick," Dept. of EE, Pohang University of Science and Technology, San 31 Hyoja Dong, Pohang, 790-784, Republic of Korea, pp. 1-15.
http://web.archive.org/web/20001017172449/http://www.pvi-inc.com/.
David Beech, et al., editors, "XML Schema Part 1: Structures," http://www.w3.org/1999/05/06-xmlschema-1/, W3C Working Draft, May 6, 1999, 67 pages.
Paul V. Birch, et al., editors, "SML Schema Part 2: Datatypes, World Wide Web Consortium Working Draft," May 6, 1999, http://www.w3.org/1999/05/06-xmlschema-2/, 37 pages.
J. Alspector, A. Kolcz, N. Karunanithi, *Comparing Feature-Based and Clique Based User Models for Movie*, Proc ACM Digital Libraries, v. 1998, pp. 11-18.
Kurapati Gutta Schaffer Martino and Zimmerman, *A Multi-Agent TV Recommender*, Proc Workshop on Personalization in Fugure TV, User Modeling 20, V. 2001, July, pp.
Marc Light, Mark T. Maybury, *Personalized Multimedia Information Access*, Communications of the ACM,May 2002, vol. 45, No. 5, pp. 54-59.
Josh Bernoff, Charlene Li, Jennifer Parr, Greg Flemming, *How Cable TB Can Beat Satellite*, The techStrategy Report, Apr. 2002, Forrester, pp. 1-20.
Nathaniel J. Thurston, Devin F. Hosea, Thomas L. Renger, *Intelligent Audience Guidance: The New Paradigm in Television Navigation*, Predictive Networks, Inc. Feb. 21, 2002, pp. 1-8.
Jim Stroud, *TV Personalization: A Key Component of Interative TV*, The Carmel Group, 2001, pp. 1-8.
Yuichi Yagawa et al., "TV Program Planning Agent using Analysis Method of User's Taste", Technical report of IEICE, vol. 98, No. 437, AI98-54-61, Dec. 1, 1998.

* cited by examiner

| Name | Location | TestOp | InterOp | IntraOp |
|---|---|---|---|---|
| FilteringAndSearch Preferences/ CreationPreferences | /Program /*CreationMetaInformation /*Creation | match-case-insens | AND | AND |
| Creator/role | //*Creator/role | NULL | CAND | OR |
| Creator/Individual/ FamilyName | //*Creator/Individual /FamilyName | substring-case-insens | CAND | OR |
| Creator/Individual/ GivenName | //*Creator/Individual /*GivenName | substring-case-insens | CAND | OR |

FIG. 8

| Test Operator | Description |
|---|---|
| substring-case-insensitive | Test that the preference value string [is a substring of] / [matches] the Program Description element value, [with] / [without] being case sensitive. |
| substring-case-sensitive | |
| string-match-case-insensitive | |
| string-match-case-sensitive | |
| value-less-than | Test that the Program Description element value converted to a number is [<, < = >, > =, = =, > <, > = < =, ~ ] the preference value converted to number[s]. In the case of range tests (> <, > = < =), the preference value is assumed to be a pair of comma-delimited numbers. The approximate operator may have a second number describing the rolloff form the target number. |
| value-less-than-or-equal | |
| value-greater-than | |
| value-greater-than-or-equal | |
| value-equal | |
| value-greater-than-less-than | |
| value-greater-than-equal-less-than-equal | |
| value-approximately | |
| count-less-than | Test that the quantity of Program Description elements is [ <, < >, >, = =, > <, ~ ] the preference value converted to number[s]. In the case of range tests (> <), the preference value is assumed to be a pair of comma-delimited numbers. The approximate operator may have a second number describing the rolloff from the target number. |
| count-greater-than | |
| count-equal | |
| count-greater-than-less-than | |
| count-approximately | |

FIG. 9

| Combinatorial Operator | Description |
|---|---|
| AND | The result of this Individual Preference test is boolean ANDed with others. If all the results in this combination are non-zero, the combined result is one, otherwise zero. |
| OR | The result of this Individual Preference test is boolean ORed with others. If any of the results in this combination are non-zero, the combined result is one, otherwise zero. |
| CAND | The Individual Preferences in this combination are evaluated form a Constrained common node. If all the results in this combination are non-zero, the combined result is one, otherwise zero. |
| MAX | The result of this Individual Preference test is combined arithmetically in a Maximum function with others. The combined result is the largest of all the results in this combination. |
| MIN | The result of this Individual Preference test is combined arithmetically in a Minimum function with others. The combined result is the smallest of all the results in this combination |
| PROD | The result of this Individual Preference test is combined arithmetically in a Product function with others. The combined result is the product of all the results in this combination. |
| SAND | The result of this Individual Preference test is fuzzy ANDed with others. The combined result is the product of all the fuzzy-transformed (mapped to an S-curve profile) results. |
| SUM | The result of this Individual Preference test is combined arithmetically in a Sum function with others. The combined result is the sum of all the results in this combination. The result may be further bounded to a maximum result value. |
| FREQ | The result of this Individual Preference test is boolean counted with others, and the sum is normalized. The combined result is the count of all non-zero results, divided by a fixed maximum frequency number. The result may be further bounded to a maximum result value. |
| RATIO | The result of this Individual Preference test is boolean counted with others, and the sum is normalized by the number of Individual Preference tests in this combination. The combined result is the count of all non-zero results, divided by the count of all results. |

FIG. 10

Mapping Table:

| name | interOp | intraOp |
|---|---|---|
| A | AND | OR |
| B | AND | OR |
| C | AND | OR |

Mapping Table:

| name | interOp | intraOp |
|---|---|---|
| R (root) | AND | OR |
| D | AND | AND |
| P (parent) | AND | OR |
| A | AND | OR |
| B | AND | OR |

User Preference Description
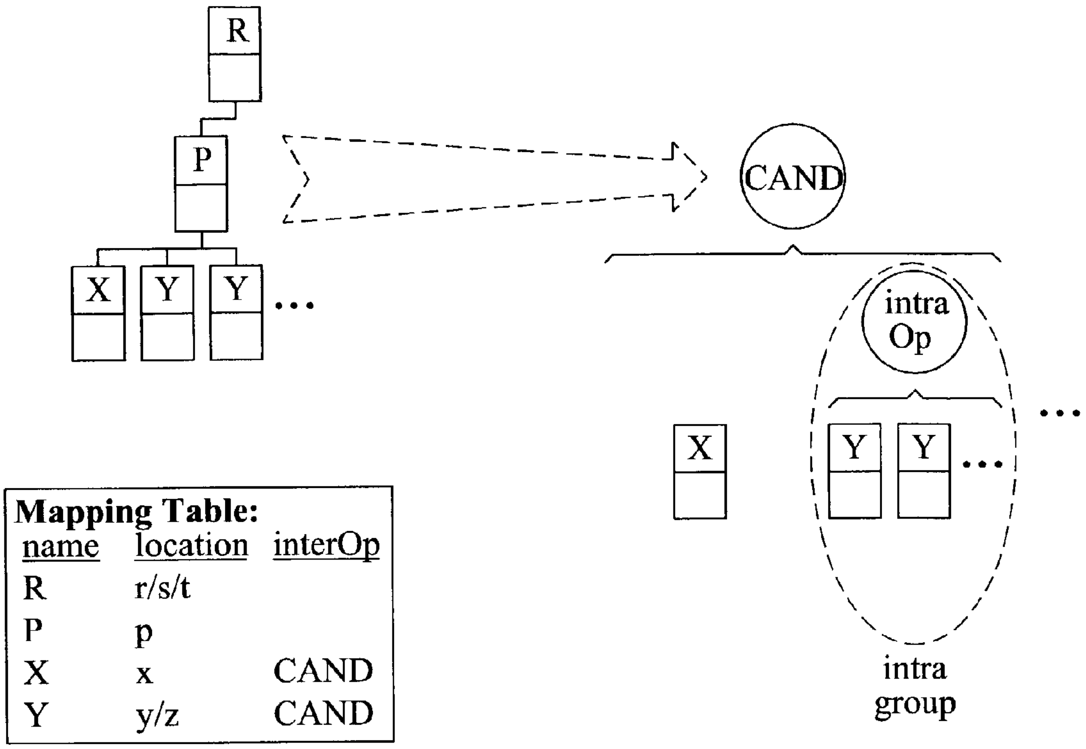
Mapping Table:
| name | location | interOp |
|---|---|---|
| R | r/s/t | |
| P | p | |
| X | x | CAND |
| Y | y/z | CAND |
Program Description
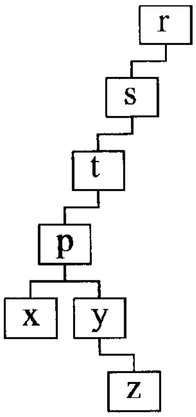
FIG. 15

Mapping Table:

| name | interOp | intraOp |
|---|---|---|
| A | OR | |
| B | OR | |
| C | OR | AND |
| D | OR | OR |
| E | AND | |
| F | AND | |
| G | AND | AND |
| H | AND | OR |
| E | CAND | |
| F | CAND | |
| G | CAND | AND |
| H | CAND | OR |

| **Name** | **Location** | **TestOp** | **InterOp** | **IntraOp** |
|---|---|---|---|---|
| **Level 0 Preferences** | | | | |
| FilteringAndSearchPreferences | null | NA | NA | OR |
| BrowsingPreferences | null | NA | NA | OR |
| **Level 1 Preferences** | | | | |
| *Children of FilteringAndSearchPreferences* | | | | |
| CreationPreferences | /Program/*CreationMetaInformation /*Creation | NA | AND | AND |
| ClassificationPreferences | /Program/*CreationMetaInformation /*Classification | NA | AND | AND |
| SourcePreferences | /Program/*UsageMetaInformation | NA | AND | AND |
| ClassificationPreferences/Country | /Program/*CreationMetaInformation /*Classification/*Country | STR_ISUB | AND | OR |
| *Children of BrowsingPreferences* | | | | |
| SummaryPreferences | /Program/*Summarization | NA | AND | AND |
| **Level 2 Preferences** | | | | |
| *Children of CreationPreferences* | | | | |
| Title | /*Title/TitleText | STR_ISUB | AND | OR |
| CreationDescription | /*CreationDescription | NA | AND | OR |
| Creator | //*Creator | NA | AND | OR |
| CreationLocation | /*CreationLocation | NA | AND | OR |
| CreationDate | /*CreationDate | NA | AND | OR |
| CreationMaterial | /*CreationMaterial | NA | AND | OR |
| CreationLocation/Country | /*CreationLocation/Country | STR_ISUB | AND | OR |
| *Children of ClassificationPreferences* | | | | |
| Language | /*Language | STR_ISUB | AND | OR |
| Genre | /*Genre | STR_ISUB | AND | OR |
| PackageType | /*PackageType | STR_ISUB | AND | OR |

FIG. 18A

| Name | Location | TestOp | InterOp | IntraOp |
|---|---|---|---|---|
| *Children of SourcePreferences* | | | | |
| PublicationType | /*Publication/PublicationType | STR_ISUB | AND | NA |
| *Children of SummaryPreferences* | | | | |
| SummaryTypePreference | /*HierarchicalSummary%summaryType | STR_ISUB | AND | OR |
| SummaryName | /*HierarchicalSummary%name | STR_ISUB | AND | OR |
| NumOfKeyFrames | /*HierarchicalSummary/*HighlightLevel %numberOfKeyFrames | VAL_EQ | AND | OR |
| MinNumOfKeyfrmaes | /*HierarchicalSummary/*HighlightLevel %numberOfKeyFrames | VAL_GTE | AND | OR |
| MaxNumOfKeyframes | /*HierarchicalSummary/*HighlightLevel %numberOfKeyFrames | VAL_LTE | AND | OR |
| SmmaryDuration | /*HierarchicalSummary/*HighlightLevel /Duration | VAL_EQ | AND | OR |
| MinSummaryDuration | /*HierarchicalSummary/*HighlightLevel /Duration | VAL_GTE | AND | OR |
| MaxSummaryDuration | /*HierarchicalSummary/*HighlightLevel /Duration | VAL_LTE | AND | OR |
| **Level 3 Preferences** | | | | |
| *Children of CreationDescription* | | | | |
| Who | /Who | STR_ISUB | AND | OR |
| TextAnnotation | /TextAnnotation | STR_ISUB | AND | OR |
| *Children of Creator* | | | | |
| role | /role | STR_IEQ | CAND | NA |
| *Children of Creator, RealPerson* | | | | |
| Individual | /Individual | NA | AND | OR |
| QuasiPerson | /QuasiPerson | NA | AND | OR |
| *Children of CreationLocation* | | | | |

FIG. 18B

| | | | | |
|---|---|---|---|---|
| PlaceName | /*PlaceName | STR_ISUB | AND | OR |
| PlaceRole | /PlaceRole | STR_ISUB | AND | NA |
| Planet | /Planet | STR_ISUB | AND | NA |
| GPSCoordinates | /GPSCoordinates | STR_ISUB | AND | NA |
| Region | /Region | STR_ISUB | AND | NA |
| PostingIdentifier | /PostingIdentifier | STR_ISUB | AND | NA |
| AdministrativeUnit | /AdministrativeUnit | STR_ISUB | AND | NA |
| PostalAddress | /PostalAddress | STR_ISUB | AND | NA |
| InternalCoordinates | /InternalCoordinates | STR_ISUB | AND | NA |
| *Children of CreationMaterial* | | | | |
| device_instrument | /device_instrument | STR_ISUB | AND | NA |
| device_setting | /device_setting | STR_ISUB | AND | NA |
| **Level 4 Preferences** | | | | |
| *Children of Individual, ContactPerson* | | | | |
| FamilyName | /FamilyName | STR_ISUB | CAND | NA |
| GivenName | /*GivenName | STR_ISUB | CAND | OR |
| SecondFamilyName | /*SecondFamilyName | STR_ISUB | CAND | OR |
| Initial | /*Initial | STR_ISUB | CAND | OR |
| ProfessionalName | /*ProfessionalName | STR_ISUB | CAND | OR |
| *Children of QuasiPerson* | | | | |
| CharacterName | /*CharacterName | STR_ISUB | CAND | OR |
| RealPerson | /*RealPerson | NA | CAND | OR |
| *Children of Organization* | | | | |
| OrganizationName | /OrganizationName | STR_ISUB | CAND | NA |
| ContactPerson | /*ContactPerson | NA | CAND | OR |
| Address | /*Address | NA | CAND | OR |
| **Preference Types** | | | | |
| FilteringAndSearchPreferenceType | /*FilteringAndSearchPreferenceType | NA | NA | OR |
| BrowsingPreferenceType | /*BrowsingPreferenceType | NA | NA | OR |

FIG. 18C

| Program | | PVa = 1 OR PVb = 1 | | Score | Rank |
|---|---|---|---|---|---|
| J | A = B = 1 | 1 | 1 | 2 | 1 |
| K | A = 1, B = 0 | 1 | 0 | 1 | 2 |

| Program | | PVa = 1 OR PVb = 1 | | Score | Rank |
|---|---|---|---|---|---|
| J | A = 1, B = 0.01 | 1 | 0.01 | 1.01 | 1 |
| K | A = 1, B = 0 | 1 | 0 | 1 | 2 |

| Program | | PVa = 4 OR PVb = 1 OR PVc = 1 | | | Score | Rank |
|---|---|---|---|---|---|---|
| J | A = 1, B = C = 0 | 4 | 0 | 0 | 4 | 1 |
| K | A = 0, B = C = 1 | 0 | 1 | 1 | 2 | 2 |

| Program | | PVa = 4 OR PVb = 1 OR PVc = 1 | | | Score | Rank |
|---|---|---|---|---|---|---|
| J | A = 0.4, B = C = 0 | 1.6 | 0 | 0 | 1.6 | 3 |
| K | A = 0.5, B = C = 0 | 2 | 0 | 0 | 2 | 2 tied |
| L | A = 0, B = C = 1 | 0 | 1 | 1 | 2 | 2 tied |
| M | A = 0.1, B = C = 1 | 0.4 | 1 | 1 | 2.4 | 1 |

| Program | | PVa = 1 AND PVb = 1 | | Score | Rank |
|---|---|---|---|---|---|
| J | A = B = 1 | 1 | 1 | 1 | 1 |
| K | A = 1,<br>B = 0.5 | 1 | 0.5 | 0.75 | 2 |

| Program | | PVa = 1 AND PVb = 1 | | Score | Rank |
|---|---|---|---|---|---|
| J | A = B = 0.6 | 0.6 | 0.6 | 0.6 | 1 |
| K | A = 1,<br>B = 0.1 | 1 | 0.1 | 0.55 | 2 |
| L | A = B = 0.5 | 0.5 | 0.5 | 0.5 | 3 |

| Program | | PVa = 1 AND PVb = 1 | | Score | Rank |
|---|---|---|---|---|---|
| J | A = 1,<br>B = 0.9 | 1 | 0.9 | 0.95 | 1 |
| K | A = B = 0.9 | 0.9 | 0.9 | 0.9 | 2 |
| L | A = 1,<br>B = 0 | 1 | 0 | 0.5 | 3 |

| Program | | PVa = 1 AND PVb = 1 | | Score | Rank |
|---|---|---|---|---|---|
| L | A = 1,<br>B = 0 | 1 | 0 | 0.5 | reject |

| Program | | PVx = 1 OR PVy = 1 | | | | | | Score | Rank |
|---|---|---|---|---|---|---|---|---|---|
| | | PVa=1 OR PVb=1 OR PVc=1 OR PVd=1 | | | | PVd=1 OR PVe=1 | | | |
| J | A=B=C=1, D=E=F=0 | 1 | 1 | 1 | 0 | 0 | 0 | 3 | 1 |
| K | A=B=C=D =0, E=F=1 | 0 | 0 | 0 | 0 | 1 | 1 | 2 | 2 |

| Program | | PVx = 1 OR PVy = 1 | | | | | | Score | Rank |
|---|---|---|---|---|---|---|---|---|---|
| | | PVa=1 OR PVb=1 OR PVc=1 OR PVd=1 | | | | PVd=2 OR PVe=2 | | | |
| J | A=B=C=1, D=E=F=0 | 1 | 1 | 1 | 0 | 0 | 0 | 3 | 2 |
| K | A=B=C=D =0, E=F=1 | 0 | 0 | 0 | 0 | 2 | 2 | 4 | 1 |

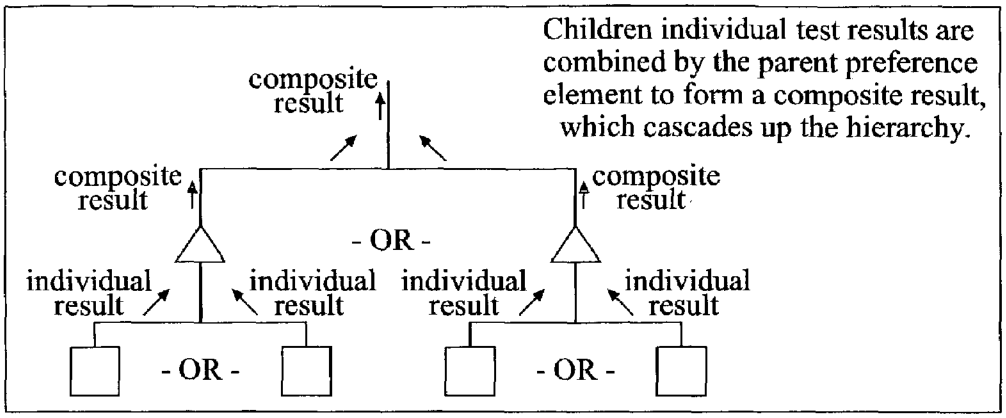
FIG. 39
| Program | | PVx = 0.8 OR PVy = 1 | | | | Score | Rank |
|---|---|---|---|---|---|---|---|
| | | PVa=1 OR PVb=1 | | PVc=1 OR PVd=0.5 | | | |
| J | A=1, B=C=D=0 | 0.8 | 0 | 0 | 0 | 0.8 | 1 |
| K | A=B=C=0, D=1 | 0 | 0 | 0 | 0.5 | 0.5 | 2 |
FIG. 40
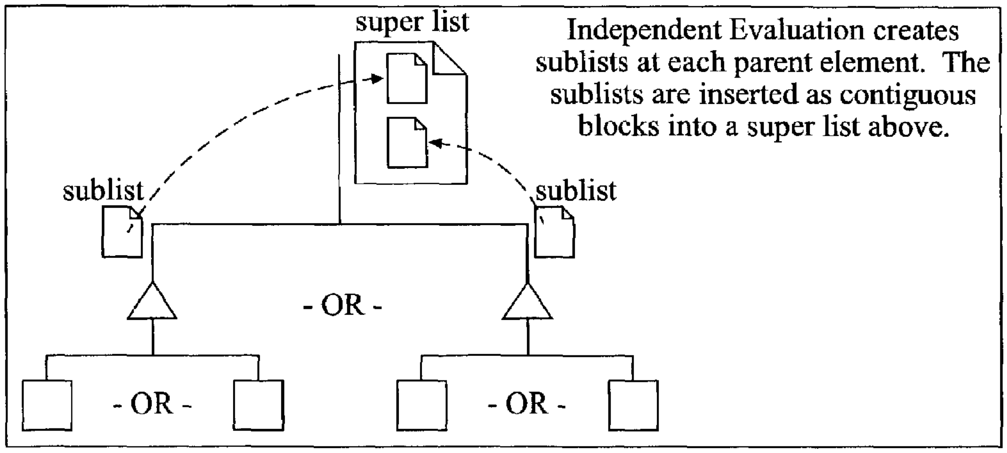
FIG. 41

| Program | | PVa = 1 OR PVb = 1 | | Score | Rank |
|---|---|---|---|---|---|
| J | A = 1, B=C=D=0 | 1 | 0 | 1 | 1 |
| K | A=B=C=0, D = 1 | 0 | 0 | 0 | reject |

FIG. 42

| Program | | PVc=1 OR PVd=0.5 | | Score | Rank |
|---|---|---|---|---|---|
| J | A = 1, B=C=D=0 | 0 | 0 | 0 | reject |
| K | A=B=C=0, D = 1 | 0 | 0.5 | 0.5 | 1 |

FIG. 43

Merging of SubLists into SuperList:

| SubLists sorted by Preference Value | Programs in SubList | Rank |
|---|---|---|
| SubList Y with PVy = 1 | K | 1 |
| SubList X with PVx = 0.8 | J | 2 |

FIG. 44

| Program | | PVx = 2 AND PVy = 1 | | | | Score | Rank |
|---|---|---|---|---|---|---|---|
| | | PVa=1 OR PVb=1 | | PVc=1 OR PVd=1 | | | |
| J | A=0.9, B=C=D=1 | 0.9 | 1 | 1 | 1 | 2.9 | 2 |
| K | A=B=C=1, D=0.9 | 1 | 1 | 1 | 0.9 | 2.95 | 1 |

FIG. 45

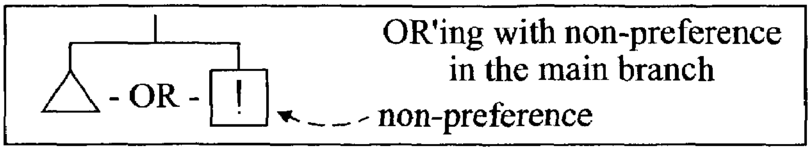
FIG. 46
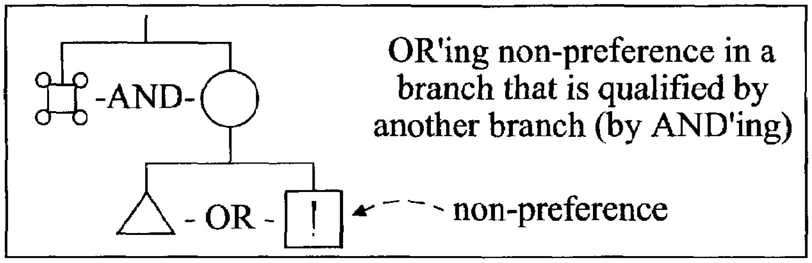
FIG. 47
| Program | | PVa = 1 OR PVb = -1 | | Score | Rank |
|---|---|---|---|---|---|
| J | A = B = 1 | 1 | 0 | 1 | 2 |
| K | A = 1, B = 0 | 1 | 1 | 2 | 1 |
FIG. 48
| Program | | PVa = 1 AND PVb = -1 | | Score | Rank |
|---|---|---|---|---|---|
| J | A = 1, B = 0.01 | 1 | -0.01 | 0.495 | 2 |
| K | A = 1, B = 0 | 1 | 0 | 0.5 | 1 |
FIG. 49
| Program | | PVa=1 AND PVb=-100 | | Score | Rank |
|---|---|---|---|---|---|
| J | A = 1, B = 0.01 | 1 | -1 | 0 | reject |
FIG. 50
| Program | | PVa = 1 AND PVb = -1 | | Score | Rank |
|---|---|---|---|---|---|
| J | A = 1, B = 0.01 | 1 | -0.01 | NA | reject |
FIG. 51

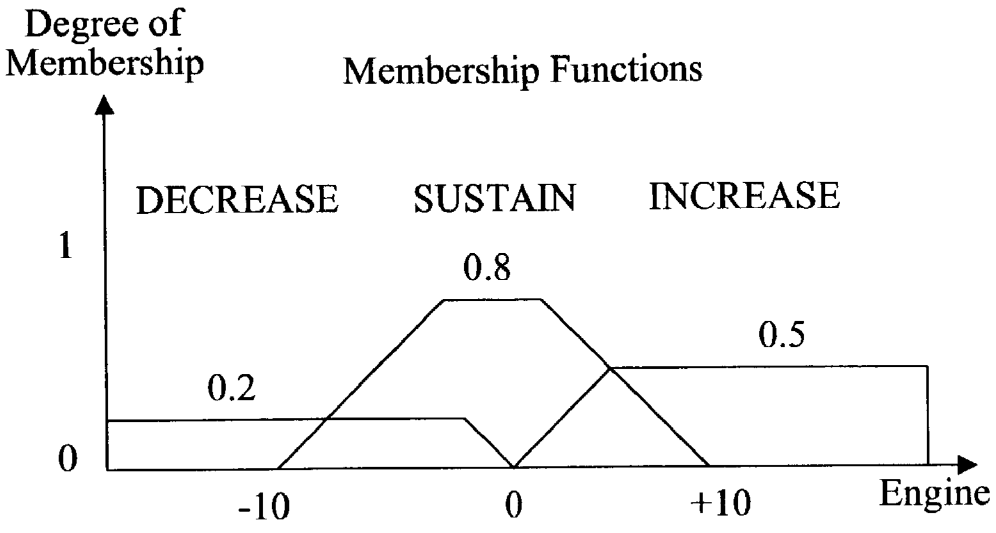
FIG. 61
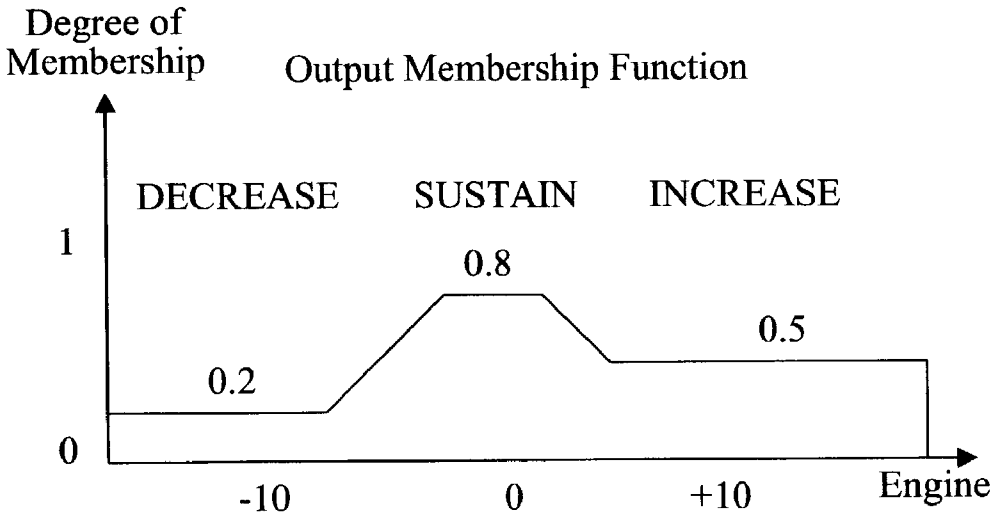
FIG. 62
$$COG = \frac{\int_a^b F(x) \cdot x\,dx}{\int_a^b F(x)\,dx}$$
FIG. 63

AUTOMATIC USER PROFILING

BACKGROUND OF THE INVENTION

The present invention relates to user profiling.

In the early days of video broadcasting there existed only a limited number of available broadcast channels. In addition, there existed a limited number of video choices, such as movies, news, and sitcoms. To view a particular broadcast, the user needed to make sure he was available during the time that the desired content was broadcast. With a relatively limited amount of content available and a relatively limited number of broadcast channels this requirement for concurrent viewing of the content with the broadcast was not excessively burdensome. In addition, the amount of potential content was limited.

With the extensive development of additional sources of broadcast content together with the decreased ability of users to view the broadcast content concurrent with its broadcast, the concurrent viewing of all potentially desirable content has become a burdensome task. The development of a video cassette recorder (VCR) provides a partial solution to the need for concurrent viewing of content with its broadcast. The VCR permits viewers to record one or more selected programs or portions thereof, onto a tape. Selecting the times for recording may be performed manually at a time concurrent with the start of the content broadcast or otherwise programmed into the VCR to record particular broadcast content at a later time. The tape may then be subsequently played to permit the user to watch previously recorded content. The VCR also permits the user to perform several other functions, such as for example, play, pause, rewind, fast-forward, slow play, slow rewind, fast-reverse, and step frame-by-frame forward or reverse.

Subsequent to the development of the VCR, multimedia (e.g., video and audio) computer based broadcast content recording systems have been developed. These multimedia systems include recording media to record content thereon. One of the advantages of the multimedia systems is the ability to access and view selections from a collection of recorded programs in a nearly instantaneous manner without the need to rewind or fast-forward a tape.

While the development of such multimedia systems are beneficial, there is nearly an endless amount of potential content that is available to the user. As the amount of information and content available for consumption increases at an ever increasing rate, it is becoming increasingly difficult for the user to locate and access the particular content that fits their interests and tastes, without of course spending nearly endless hours watching uninteresting content.

Searching systems have been developed, such as those available from TiVO, that require the user to select a set of attributes of the potentially available content that they may be interested in. For example, the user may select the following attributes: action movies, comedy movies, Brad Pitt, Harrison Ford, and Tanya Puttin. The searching system attempts to match the selected attributes to the attributes of the potentially available content, which may be available from any suitable source, such as a storage device, the Internet, live broadcasts, pay-per-views, video-on demand, video libraries, etc. The search-based paradigm is often inconvenient and time consuming for the user to use. More importantly, with such a search tool the user is limited to content that he is already aware of Accordingly, it is difficult for the user to discover new content that he was previously unaware of that he may find interesting.

One technique to assist the user in discovering and selecting potentially desirable content is to construct and maintain a user profile, which provides a relatively compact description of a user's tastes and personal interests. The user profile may be subsequently utilized by the user to filter available content, so that items that are likely to be enjoyable are readily available to the user. The user profile may be specified directly by the user who explicitly states the descriptions of the programs he is interested in. Alternatively, the user profile may be automatically generated and updated to match the content consumption behavior of the users by recording and subsequently analyzing usage history information. The later alternative typically requires little or no effort on the user's part and is adaptable to the user's changing needs and interests. In addition, the user's perception of his preferences may be significantly different from what the user's content consumption habits actually suggest.

Several techniques have been proposed for discovering and updating user profiles based on the user's consumption history. These methods are often supervised, i.e., they rely on explicit user input (in the form of user-assigned rankings) to identify what the user likes or finds interesting, and the methods then construct simple user profiles that comprise terms extracted from descriptions of the content and their respective weights. The resulting profiles are typically arranged in a non-structured list of the user's preferences.

BRIEF DESCRIPTION OF THE DRAWINGS

FIG. 8 illustrates a mapping table.

FIG. 9 illustrates test operators.

FIG. 10 illustrates combinatorial operators.

FIG. 15 illustrates a constrained operator.

FIG. 18 illustrates a mapping table.

FIG. 39 illustrates composite scoring combination
FIG. 40 illustrates composite scoring combination
FIG. 41 illustrates independent evaluation combination.
FIG. 42 illustrates independent evaluation combination.
FIG. 43 illustrates independent evaluation combination.
FIG. 44 illustrates independent evaluation combination.
FIG. 45 illustrates comparing various PVS across hierarchy combination.
FIG. 46 illustrates unqualified OR'ing combination.
FIG. 47 illustrates qualified OR'ing combination.
FIG. 48 illustrates a test case.
FIG. 49 illustrates non preference score combination.
FIG. 50 illustrates a test case.
FIG. 51 illustrates non-preference filter combination.
FIG. 61 illustrates membership functions.
FIG. 62 illustrates output membership function.
FIG. 63 shows a COG equation.

DETAILED DESCRIPTION OF THE PREFERRED EMBODIMENT

Figure 1:
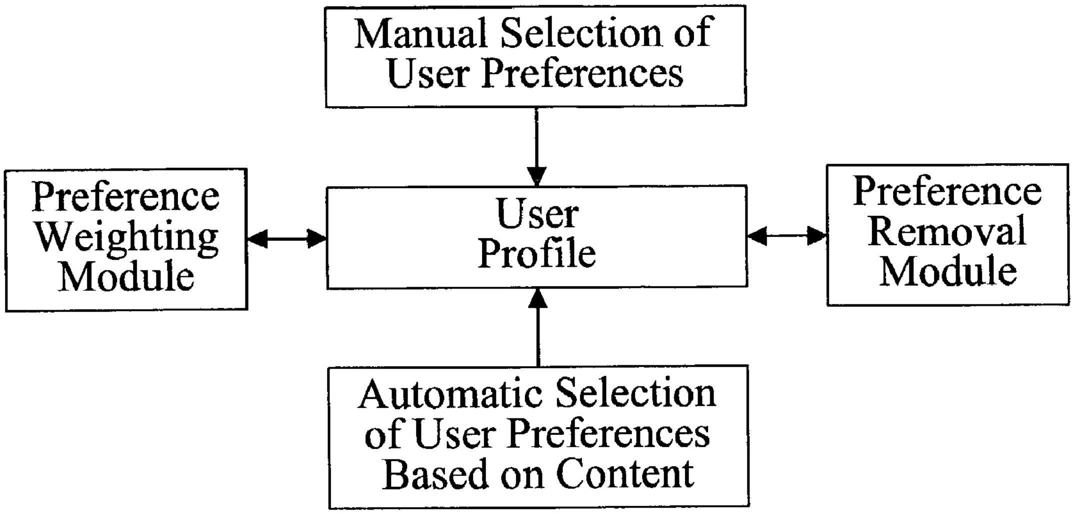
FIG. 1 illustrates a user profile.

Referring to FIG. 1, to provide an enhanced selection of user profiles the present inventors came to the realization that the system should identify the user's preferences based upon their historical content selection. While the user's historical viewing of any particular type of content may be reflected in the user's profile, this fails to appreciate the extent to which a particular user desires such content. For example, if a viewer once selected a movie with Jackie Chan but has selected several movies with Bruce Willis, then merely indicating that the user appreciates both Jackie Chan and Bruce Willis is inadequate because the particular user may appreciate movies with Bruce Willis to an extent much greater than movies with Jackie Chan. To further address these concerns the present inventors determined that the system should further provide a preference weight (e.g., measure, relative measure) for at least a portion of the preferences. In other words, the preference weights may be non-binary in nature. For example, the preference for Bruce Willis may have a greater weight than the preference for Jackie Chan, such that all else being equal a movie with Bruce Willis will be preferred over a movie with Jackie Chan. It is to be understood that the preference weighting module may also include a temporal characteristic, such as for example, content that has been viewed more recently may have a higher preference than content that has been previously viewed, with all else being equal.

After further consideration the present inventors came to the realization that ever expanding the user profile during an extended period of time and/or extended amount of content being selected will result in an excessively large user profile that is not indicative of the user's current preferences. For example, this year the user may be interested in movies with Bruce Willis but next year the user's preference may shift toward movies with Jackie Chan. Accordingly, the user profile should remove the preference for particular content after some criteria has been achieved, such as for example, sufficient time has elapsed from the time that such content was consumed (e.g., elapsed temporal time period) or sufficient other content has been consumed. In addition, it is to be understood that removal may likewise include setting a preference to a value such that it will not be considered or be statistically irrelevant in the selection.

The user profile typically interrelates the user's preferences to potentially available content in some manner. In many cases the processing of information contained within the user's profile and the description of available programs, a system may determine those programs that are likely desirable to the particular user. The processing by the system for such information may be referred to as an agent.

Existing agents are focused on correlating a limited number of user preference descriptors with a limited number of program descriptors. The designer of such agents manually determines, and hard codes into the agent, predetermined interrelationships which are likely to result in identifying desired programs. As such, the mapping between the user preference descriptors and the program descriptors includes a static model because such designers are under the belief that the domain of data fields is a fixed predetermined set, and therefore the relationships between the potential combinations of relevant data is likewise a fixed predetermined set. For example, the "actor" in the user preference and the "actor" in the program descriptor may be a relevant potential combination. The traditional focus for designing such static agents avoids the problematical dilemma of how to interpret and process an arbitrarily complex set of preferences.

Maintaining the traditional focus of avoiding an arbitrarily complex set of user preferences, commercial products such as TiVO and Replay TV, permit the specification of a first preference, such as a particular actor. The user may further attempt a more specific search by searching for a first preference, a second preference, and additional preferences. While this results in identifying the desired programs, it is a time consuming and frustrating process for the user. Like the static agents, the TiVO and Replay TV devices have a limited set of permitted search queries.

While such static models of the interrelationships is readily easy to implement, it results in a system that is unable to process interrelationships that are not foreseen by the agent designer. The present inventors came to the realization that all of the potentially desirable interrelationships, especially for an arbitrarily complex set of preference criteria, can not be effectively programmed using the traditional static model.

Figure 2:
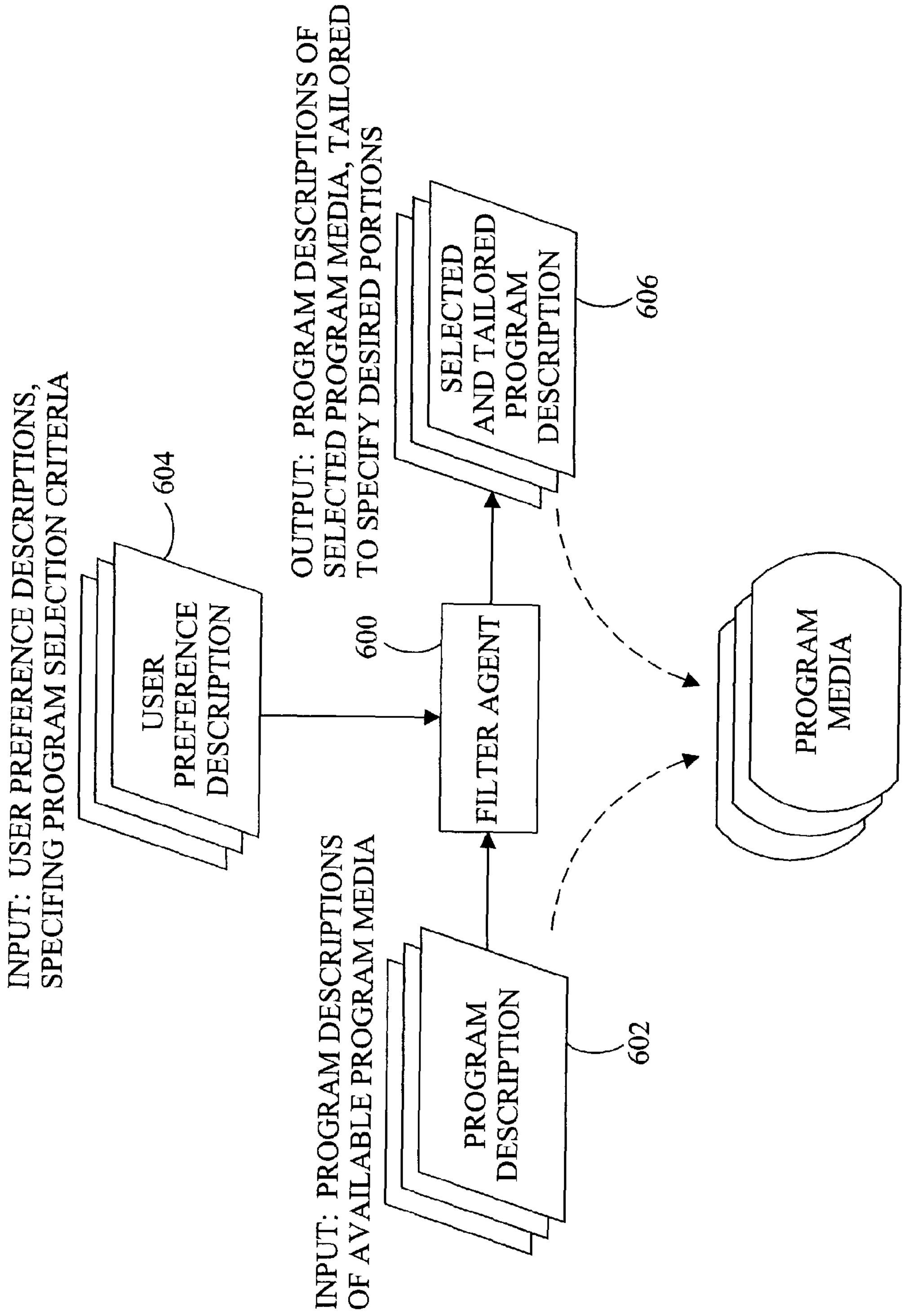
FIG. 2 illustrates a system with a filter agent.

Referring to FIG. 2, a filter agent 600 receives or otherwise has access to at least a description of one program 602 (generally referred to as a program description) and at least one user preference description 604. Each program description 602 may also, if desired, include meta-data associated with the actual consumable program media. Also, the user preference description 604 may contain selection criteria for the information contained within the meta-data. The output of the filter agent 600 is a subset of the received program descriptions 606 that have been selected, and tailored if needed, in accordance with the user preference description 604.

Figure 3:
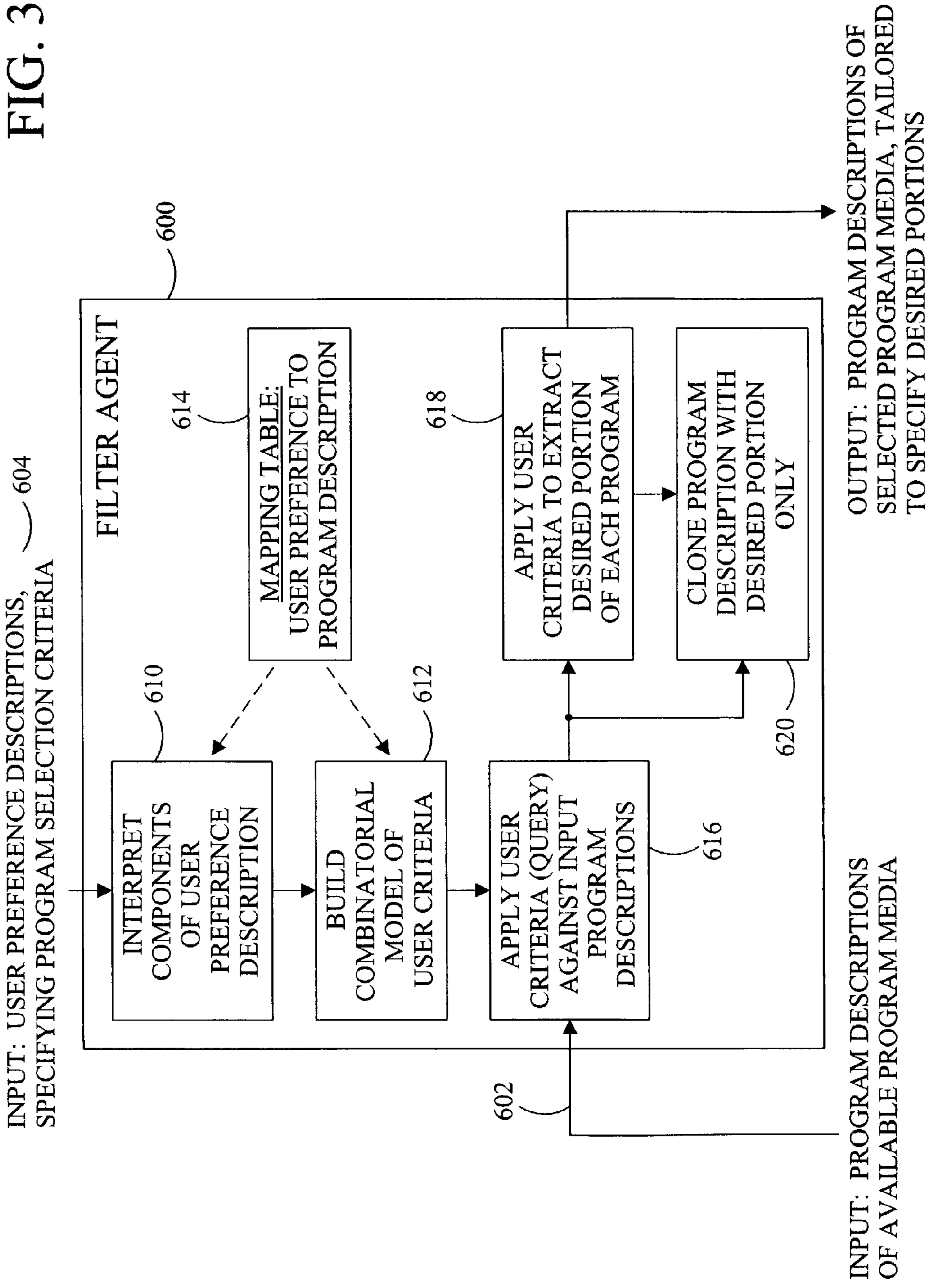
FIG. 3 illustrates a filter agent.

Referring to FIG. 3, the filter agent 600 receives the user preference description 604 and interprets the information contained within the user preference description 604 at block 610 using information from a mapping table 614. The filter agent 600 also builds a model, such as a combinatorial model, of the user criteria indicating the desired user criteria at block 612 using information from the mapping table 614. The resulting model or otherwise set of criteria, is then applied against the available program descriptions 602 at block 616 to select the desired programs. Each of the selected programs include a rich set of associated data which may then be applied against user criteria at block 618 to further refine the data by extracting desirable subportions of each program. Each of the selected programs may further be cloned at block 620 together with the desired sub-portion of each program, and the resulting tailored instances are output from the filter agent 600.

Hierarchy Descriptions

Figure 4:
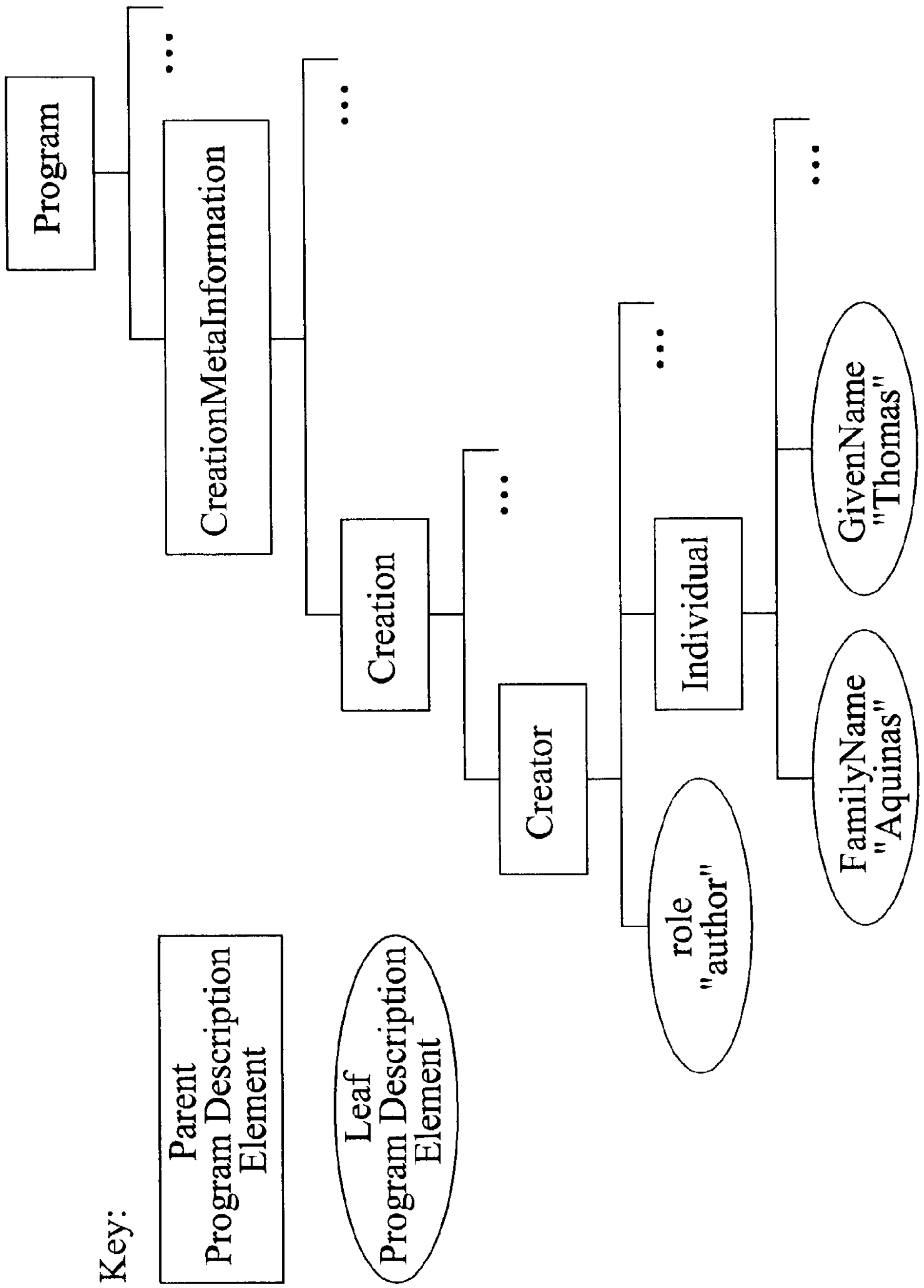
FIG. 4 illustrates a program description.

Referring to FIG. 4, a Program Description may be composed of a hierarchy of individual descriptions. The hierarchy implies relationships amongst the individual description elements including composition, type-of, and other relationships. The particular structure of the input Program Descriptions vary, and are typically generated and provided by a commercial provider. The output Program Descriptions may be, for example, copies of the selected input instances, portions of the selected input instances, or are modified clones of the input instances. In the case of modified clones, the clones should describe a subset of the program media that meets the user's preferences, and exclude the portion that the user does not desire, or is not feasible to process for other reasons, such as bandwidth. It is to be understood that the output may omit cloning, if desired. In addition or alternatively, the user description may include a hierarchy of descriptions.

Figure 5:
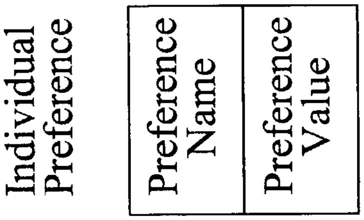
FIG. 5 illustrates a user preference description.

Referring FIG. 5, the User Preference Description may include primitive elements that describe individual or multiple preferences. The individual preferences may be generally defined in terms of "name:value" pairs. The name component is one of a set of Preference Names. The domain of the value depends on the name, such as codes and free form text.

The individual preference may be a single preference test (or multiple preference). It is to be understood that the individual preferences are not limited to tests. For example, the User Preferences may describe the desired configuration for presentation, such as volume or any other functionality. Each preference test describes some aspect or attribute of the Program Description that is to be evaluated. If desired, the preference test may be limited to the smallest granularity of a test that may be executed on the Program Description. A common preference test is a comparison of a Program Description element's value to the preference value. It is also to be understood that the preference tests need not be directly associated with the value of a corresponding element, if any, of the Program Description. For example, a single User Preference element, indicating a desired number of key-frames to be shown, may be tested against the count of elements in the Program Description representing (or describing) a key-frame. In general, the pair (title: title_value) will compare the title element value of the Program Description to title_value.

Figure 6:
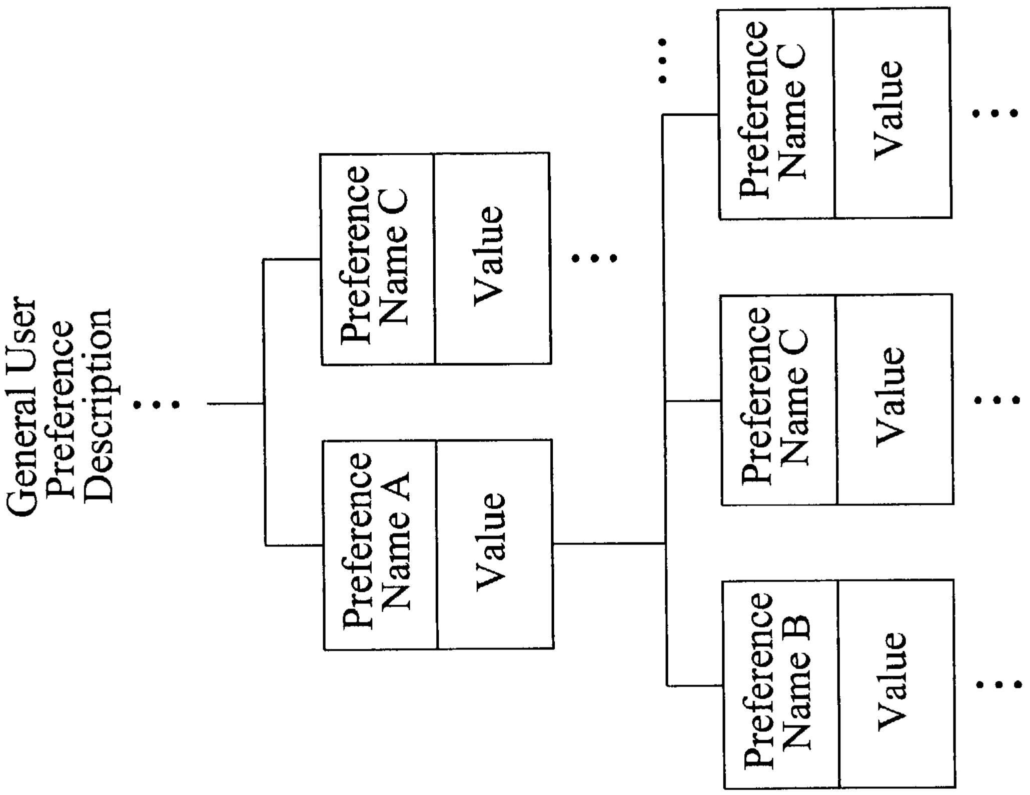
FIG. 6 illustrates a user query.

After further consideration, the present inventors came to the realization that the individual preferences may include composite relationships. Moreover, the relationships may include duplicate fields, such as several instances of "name" in either the user preferences and/or the Program Descriptions. With the inclusion of composite relationships it becomes difficult to determine an appropriate technique for queries, where duplicate individual preferences are at the same or different hierarchy levels. In addition, it is difficult to determine how to interpret queries that provide multiple matching results (such as several instances of "John Doe") or inconsistent matching entries (such as several instances of "John Doe" and a lack of an instance of "Comedy"). For example, referring to FIG. 6, if the user uses a query involving multiple preference names, and the query results in several potential matches, it is difficult to determine if an appropriate program has been located or which portion of an appropriate program is suitable. As shown in FIG. 6, the preference with name A is composed of one instance of name B and two instances of name C, each of which may include the same or different names.

Figure 7:
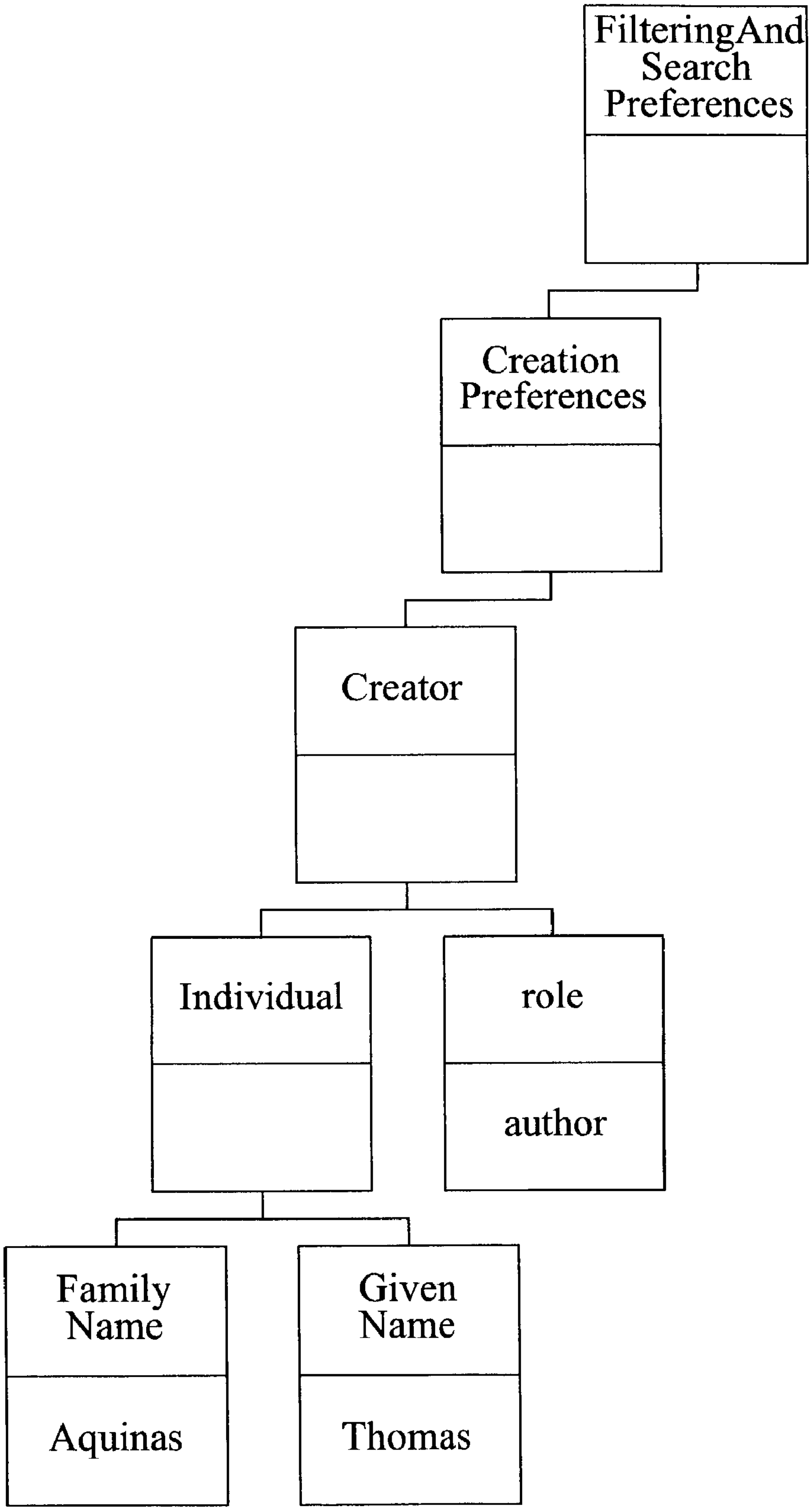
FIG. 7 illustrates a portion of a user preference description.

Referring to FIG. 7 an example of a portion of a User Preference Description is illustrated. This portion of a user preference description illustrates a hierarchy of a "creator" that has the "role" of "author" with the name of "Thomas" "Aquinas". In addition, the hierarchy may be used as the path to define the interrelationships.

The normal behavior of a location path is to retrieve the single data from this node in the program. One potential enhancement is to allow this data to be manipulated and combined with other related nodes to form a composite value.

One example is when evaluating a media review rating, three numerical values may be provided, namely, RatingValue, WorstRating, and BestRating. A composite value for media review rating may be calculated as ((RatingValue)−(WorstRating)/((BestRating)−(WorstRating)).

Another example may include the test of Keyword preferences against the Title or Description fields by concatenating these two fields. A composite value might be calculated as (CreationDescription/TextAnnotation) & (Title/TitleText). It is noted that these two fields use relative paths from the parent "Creation" element.

Yet another example may include a single preference data manipulated to adjust its value numerically, or its text may be translated into a target language.

The composite values provide defaults for any of the calculated elements. This is useful for defining the default range of a media review rating. It is also useful for inserting identity values (e.g. 1, 0, "") when the absence of an element should not make the test fail.

The preference description may make use of built-in composite values. An example of a built-in composite value may be one that is based on the environment of the viewer. For instance, a portion of a Preference Description may define time of day ranges when the user wants the associated preferences to be evaluated. The target location could be defined as a composite value of built-in type "TimeofDay".

Referring to FIG. 8, the present inventors have determined that a mapping table of the User Preferences and the input Program Descriptions provides a robust comparison of the user preferences and the input Program Descriptions. It is to be understood that the mapping table may be any type of data structure, as desired. The first column ("name") of the mapping table includes the name of one or more of the user preferences. FIG. 8 illustrates the inclusion of the user preferences of FIG. 7. Each node, generally referred to by name, of an individual preference to be tested has an ancestry path associated with it. The second column ("location") of the mapping table includes the name of one or more of the input Program Descriptions. Alternatively, portions of the path or even single elements of the path may be specified in the table, if desired. For example, the Creator/Individual/FamilyName preference in FIG. 7 has a path of /FilteringAndSearchPreferences/CreationPreferences/Creator/Individual/FamilyName. This path is decomposed and resolved, piece by piece, using the "Location" column (e.g., field) in the Mapping Table. The result of decomposing and resolving the user preference path results in a corresponding path within the Program Description resolved from entries in column two. For example, the resulting location path for this test may be "/Program/CreationMetaInformation/Creation/Creator/Individual/FamilyName".

Common names, such as "Country" used at multiple locations, may be distinguished by including all or part of the ancestry path. For example, the following two preference tests have the same "leaf" name, but it may be desirable to have different tests for each. This may be done by specifying more of the ancestry in the Name field (column 1) of the mapping table: "/FilteringAndSearchPreferences/CreationPreferences/CreationLocation/Country", and "/FilteringAndSearchPreferences/ClassificationPreferences/Country". To distinguish between the two, the following names may be used: "/CreationLocation/Country" and "/ClassificationPreferences/Country". In addition the preference tests may be associated with multiple entries in the Mapping Table. This permits a single test to be performed on more than one location in the Program Description.

The Location field may include various wildcards to expand or restrict the target paths to be evaluated in the Program Description. For example, a "*" wildcard implies that there may be multiple instances of the given location under one parent, e.g., /Creation/*Creator implies that there may be multiple Creators under the Creation parent. A "#xxx" wildcard restricts the target path to the xxx instance of the given location under its parent, e.g., /Creation/#002Creator restricts the target path to the second instance of Creator under Creation. A double forward slash "//" indicates a node of the target path which may be used as a base path for groups of tests which must be constrained to evaluate from the same common location. In particular, this is useful for Constrained-AND operations, described later. The preference paths may be used to build target locations in the program. These preference paths may also allow preference paths to be interpreted as locations. Composite values may be defined for these preference path locations.

Syntax for a default preference and a default location may be provided. This allows updates in the preference or program definition to be handled by the filter agent without requiring changes to the mapping table.

The default mapping elements may be specified for a limited set of preference branches to bound the default mapping to a safe portion of the user preferences.

For instance, the default element "FilteringAndSearchPreferences/CreationPreferences/UserDefinedPreference/.*" may place a default mapping that can only map to elements in the program beneath the "Program/CreationMetaInformation/Creation" branch.

The third column "TestOp" of the Mapping Table includes what comparison to perform between the corresponding user preference path (column 1) and (resolved) input Program Description location (column 2). In this manner, the Mapping Table provides a convenient manner of identifying the interrelationships between the corresponding data from the user preferences and input Program Descriptions. For instance, the "FamilyName" preference in FIG. 7 has a test operator of substring-case-insensitive when compared with "/*FamilyName". Test operators may yield a discrete result, such as true or false, they may yield a range of values, or any other desired data. In particular results that span a range of values provide the advantage that filtered programs may be sorted according to the resultant "similarity" value. This provides the user with a ranked output that they may select from. Also, user preferences may be "softened" to pass programs that are near matches to the specific preference criteria. This fuzzy approach may allow the user preference description to more clearly model the user's intended criteria. In cases where the entry is always a parent (composed of children preference tests) the test operator may be NA (not applicable). An exemplary set of test operators are illustrated in FIG. 9.

After the individual preferences are interpreted into individual preference tests, these tests may be combined into a single test that models the user's preferences. The preferred technique includes combining the individual preference tests according to their hierarchy. Each parent test becomes the combination of its children tests, and this continues up to the root preference, yielding in effect one composite test. The combination of "children" tests within a single "parent" may be broken down into the combination of similar tests and the combination of dissimilar tests. Similar tests may have the same name or otherwise be associated in the Mapping Table such as by being on the same row. Also, dissimilar tests may have different entries in the Mapping Table.

It is to be understood that the concept of inter group and intra group interrelations relates to any comparison between different sets of data, whether or not they include a hierarchical scheme. As an example, intragroup may be used to define a group of similar tests. Also, any scheme may be implemented to form comparisons or groupings for the testing of data.

If desired, the mapping table, which may be any type of data structure or otherwise to simply express the desired operations to be performed, may be expanded to include additional functionality. For example, specific groupings of user preference may be denoted, to specify additional operations to be performed on the elements of the group that are separate from the inter group and intra group operations. These specific groupings may provide additional flexibility for combining individual preference tests. The combinatorial operations applied to these groups may be performed before, after or instead of the general inter group and intra group combinatorial operations.

For instance, entries in the mapping table may be explicitly linked together with a shared index, and a specific combinatorial operator may be mapped to each indexed group. The UserPreferences elements may likewise be explicitly linked together with a shared index. The latter two groups and operators present an alternative method to generate the arbitrarily complex combinations. A preferred sequence for performing the various combinatorial operations might be intra group operation, followed by indexed group operation, followed by inter group operation.

In addition to explicitly defined indexed groups, other groupings may be built-in. For instance, a program description may have attributes associated with it. The user preferences that are mapped to this program description and its associated attributes may be grouped together in a so-called attribute group, and a specific combinatorial operator may be mapped to this attribute group. For example, the program description element, TitleText, may have a language attribute associated with it. A user preference, KeywordPreferences, may be mapped to TitleText and a separate user preference may be mapped to the language attribute of TitleText. These two user preferences may be grouped together into the following attribute group, and the results to these two tests may be combined in an attribute group combinatorial operation:

| Name | Location | AttrGroupOperation |
|---|---|---|
| KeywordPreferences@xml lang | Title/TitleText@ xml lang | AND |
| KeywordPreferecnes | Title/TitleText | AND |

The functionality may also include multi-mapped preference group and associated operator. Elements in this group may have the same user preference element, but have multiple different program description mappings. For example, PersonName may have the following mappings, forming one multi-mapped group:

| Name | Location | MultiMapGroupOperation |
|---|---|---|
| PersonName | Creator/GivenName | OR |
| PersonName | Creator/FamilyName | OR |
| PersonName | Creator/ProfessionalName | OR |

Preferably, the various groupings are combined in sequence starting with attribute groups, followed by intra groups, multi-mapped groups, indexed groups, and inter groups.

Referring to FIG. 10, exemplary examples of combinatorial operators are listed. Several of the combinatorial operators (notably SAND, SUM, FREQ, and RATIO) provide "soft" combinations that can be used to yield non-zero results, even when some of the individual preference tests in the combination are zero. These soft combinations are useful when a group of program descriptions are to be evaluated, but one or more nodes in the group does not exist. In this manner, the result will be a diminished, but non-zero value.

For example, the SAND operator provides a soft AND combination of its constituent elements by applying a transformation to the input values before they are combined. This may transform a zero input to a non-zero value. Additionally, the combination operation may be a non-linear function that will increase or decrease the result, related to a strict AND combination.

Another set of combinatorial operators are soft maximum and soft minimum operators. In the typical maximum or minimum operation, only one of the combined individual preference tests determines the combined result value. In contrast, the soft minimum operator and soft maximum operator allows other non-contributing individual preference test results to adjust the final combined result. Typically, the adjustment is a minor amount, e.g., +−10 percent. The purpose of the soft maximum/minimum operators is shown in the example where a user prefers program which contain A or B. IF a program with A and a program with A and B were available, the typical maximum operator would rank both programs equally, whereas the soft maximum operator would rank the program containing A and B above the program containing only A. A similar result occurs from the soft minimum.

Another combinatorial operator is an average, which averages a set of scores resulting from a plurality of tests.

One combination for dissimilar preference tests is under a single parent.

Figure 11:
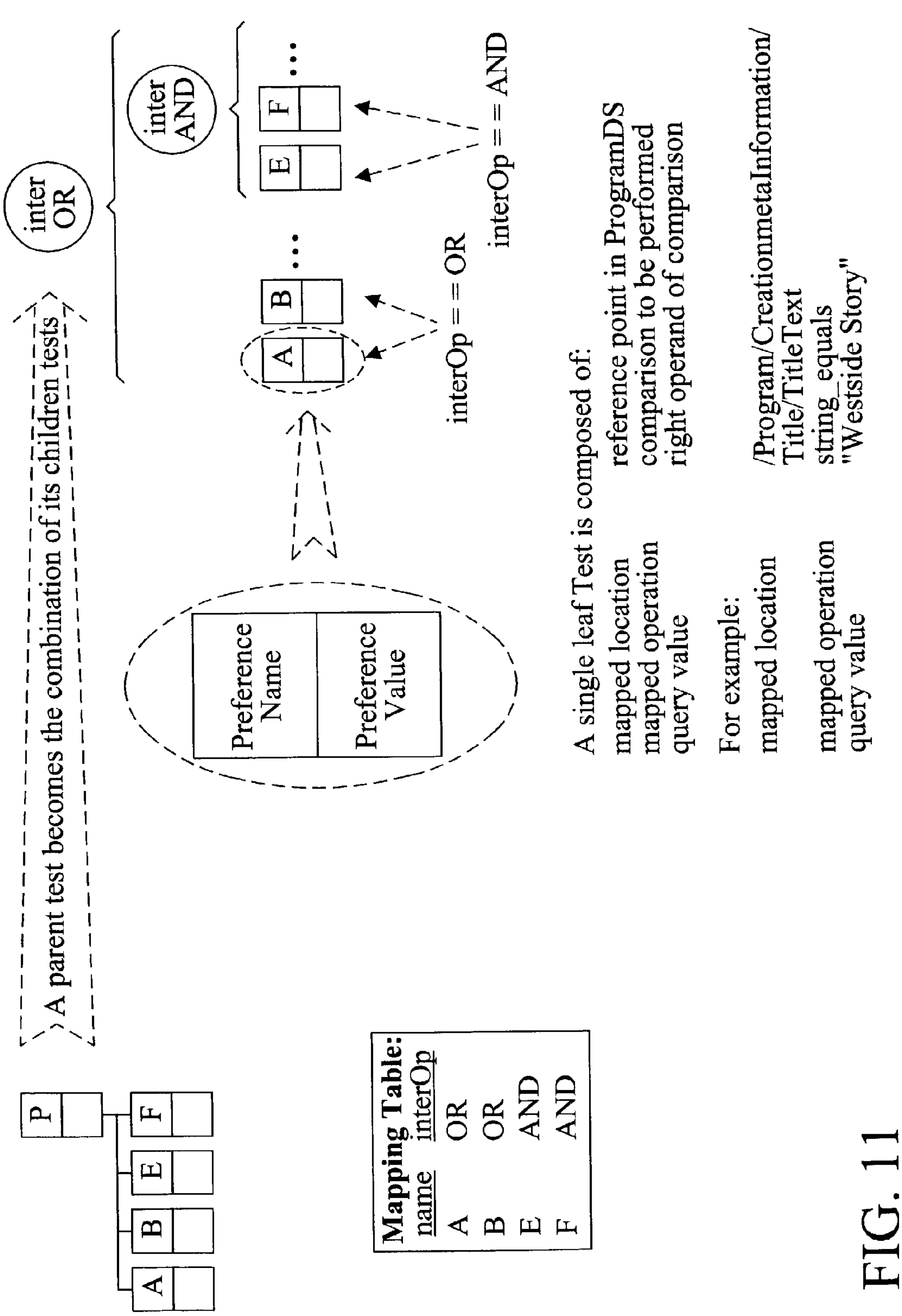
FIG. 11 illustrates a parent test.

Each entry in the Mapping table has a field that defines how this type of preference test should be combined with different type preference tests under the same parent. This type of test may be referred to as inter group combinatorial operator (InterOperator). Referring to FIG. 11, this example illustrates a parent test with four dissimilar "leaf" test children. Two of the leaf tests have InterOperator AND. These two tests are evaluated independently, then their results are AND'd together. The other two leaf tests have InterOperator OR. These two tests are evaluated independently, then their results and the AND'd sub-result are all OR'd together to form the parent test result.

The rules for combining dissimilar tests (with the operator mappings of OR and AND) may be:

(1) evaluate all the tests;

(2) AND the test results which have InterOp=AND, forming the InterAND result;

(3) OR the test results which have InterOp=OR, with the InterAND result, forming the InterOR result; and (4) the InterOR result is the final result for the parent test.

Figure 12:
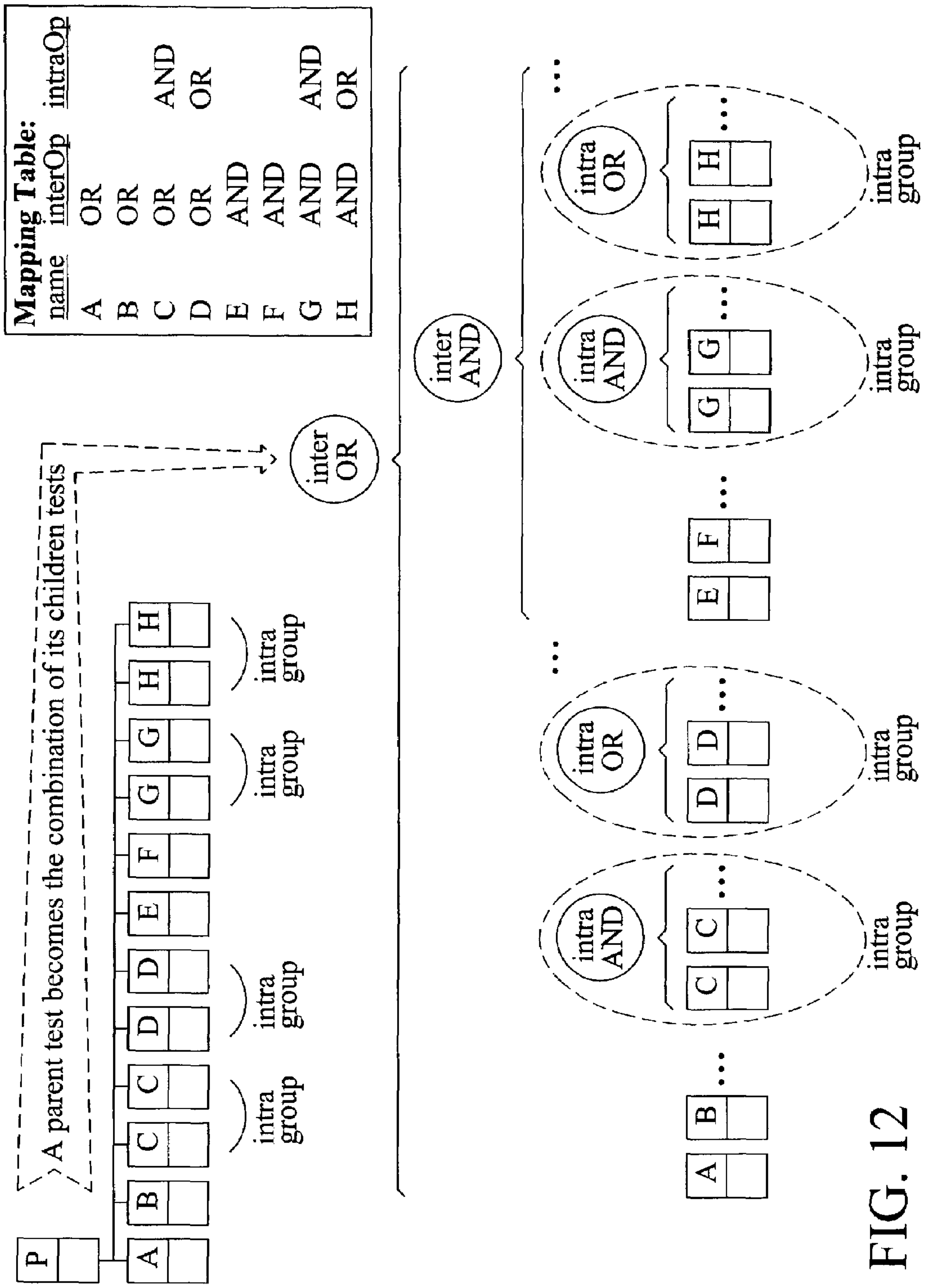
FIG. 12 illustrates a parent test.

In many cases, preference tests of the same type under a single parent will have a specific desired combination for those preferences before they are combined with the other different children of that parent. Each entry in the Mapping Table has a field that defines how this type of preference test should be combined with similar type preference tests under the same parent. This may be referred to as the intra group combinatorial operator (IntraOperator). Referring to FIG. 12, the parent test has four dissimilar children and four pairs of similar children. The similar children are first combined into intra groups using either respective IntraOperator. Then the intra group results are combined with the other groups and tests using their respective InterOperator.

The rules for combining similar and dissimilar tests (with the operator mappings of OR and AND) may be, for example:

(1) evaluate all the tests;

(2) group together test results that have the same name, forming Intragroups;

(3) AND the test results within Intragroups which have IntraOp=AND, forming IntraAND results;

(4) OR the test results within Intragroups which have IntraOp=OR, forming IntraOR results;

(5) AND all the solitary test results (not part of an Intragroup) and Intragroup results which have InterOp=AND, forming the InterAND result;

(6) OR all the solitary test results and Intragroup results which have InterOp=OR, with the InterAND result, forming the InterOR result; and (7) the InterOR result is the final result for the parent test.

Figure 13:
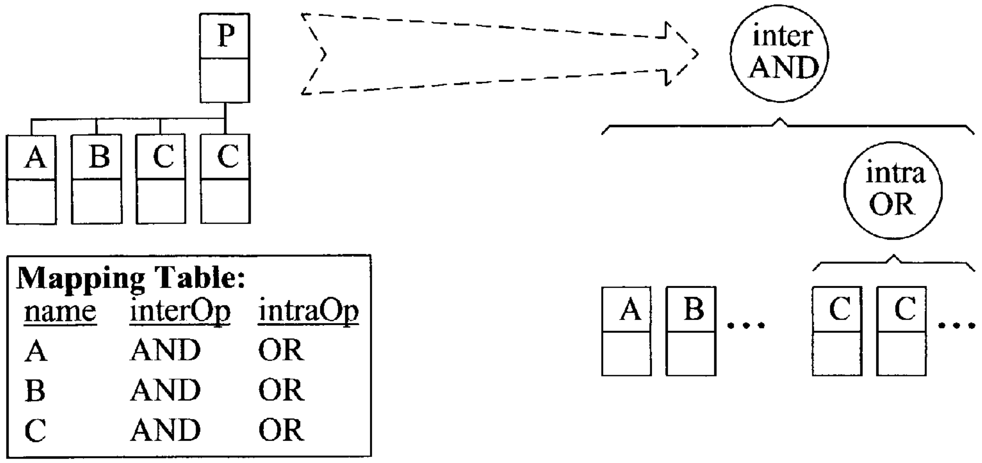
FIG. 13 illustrates a default case of FIG. 12.

The general case of intra group combinations shown in FIG. 12 has the special default case shown in FIG. 13. This simplified approach supports the most common intra group operation, OR'ing and the most common inter group operation, AND'ing. One of the advantages of the approach of FIG. 12 is that the most common operations are supported with reduced constructs, and other combinations are supported by duplicating the hierarchy as necessary. The default mapping allows field updates to the User Preferences Description schema without requiring a change to the application or Mapping Table.

An example of a default mapping may include defining a parent (e.g., node) in the user preference that maps to a parent (e.g., node) in the Program Description and setting a "default" comparison between the two. In the event that an additional child user preference is added to the parent in the hierarchal tree then this child is automatically mapped to a corresponding child of the parent in the hierarchal tree of the Program Description. Preferably the two children have the same name to simplify identification.

Figure 14:
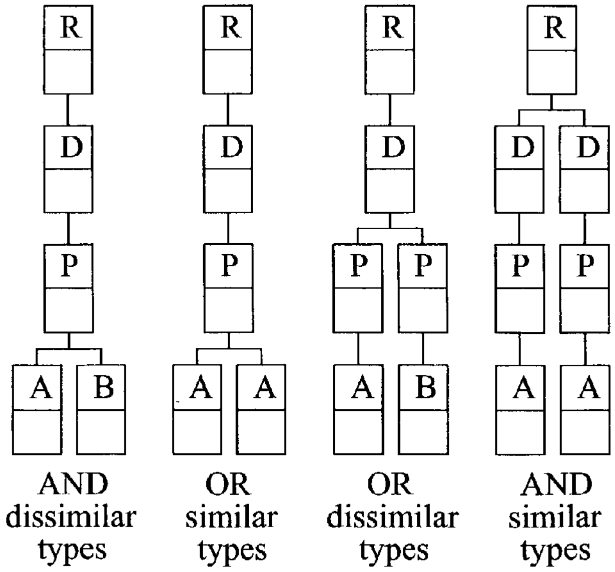
FIG. 14 illustrates four permutations.

The example illustrated in FIG. 14 show the four permutations for combining two leaf tests that may be of type A or B, namely, AND dissimilar types, OR similar types, OR dissimilar types, and AND similar types. In addition, these leaf tests could also be parent tests themselves, composed of their own sub-hierarchy. The simplified approach relies on there being a layer (below the topmost layer) that has IntraOperator AND, while the rest of the hierarchy further down uses IntraOperator OR. This supports combining similar or dissimilar tests by merely going up in the hierarchy a sufficient number of levels.

The location mappings described in the Mapping Table yield global paths that start from the root node in the Program Description ("/Program"). Some preference tests may require support for a relative path. A special form of the InterOperator AND is defined which constrains a group of tests to be performed on the same element or parent element in the Program Description. This is defined as a Constrained-AND (CAND) combinatorial operator.

The constrained operation has a base path and multiple tests. The base path defines the starting node for all the predicate tests to be performed from. In the general example illustrated in FIG. 15, the parent of the three Constrained-AND tests is "P". The mapped location for "P" in the Program Description is the base path, which resolves to "r/s/t/p". Therefore, for each instance of "r/s/t/p" in the Program Description, the children elements "x" and "y/z" are tested by "X", and the two "Y" tests.

A user trying to find programs on stuffed pasta might create the following profile fragment:

```
<KeywordPreferences xml:lang=en>    calzone    </KeywordPreferences>
<KeywordPreferences xml:lang=en>    tortelini  </KeywordPreferences>
<KeywordPreferences xml:lang=en>    ravioli    </KeywordPreferences>
```

The word calzone is a type of stuffed pasta in English, but it is underwear in Spanish.

Without the use of Constrained-AND, the agent may erroneously retrieve programs such as

```
<Creation>
    <CreationDescription xml.lang=en>
    Victoria Secrets models women's underwear</CreationDescrition>
    <CreationDescription xml.lang=es>
    El Secreto de Victoria se demuestra los calzones de mujer
    </CreationDescrition>
</Creation>
```

Figure 16A:
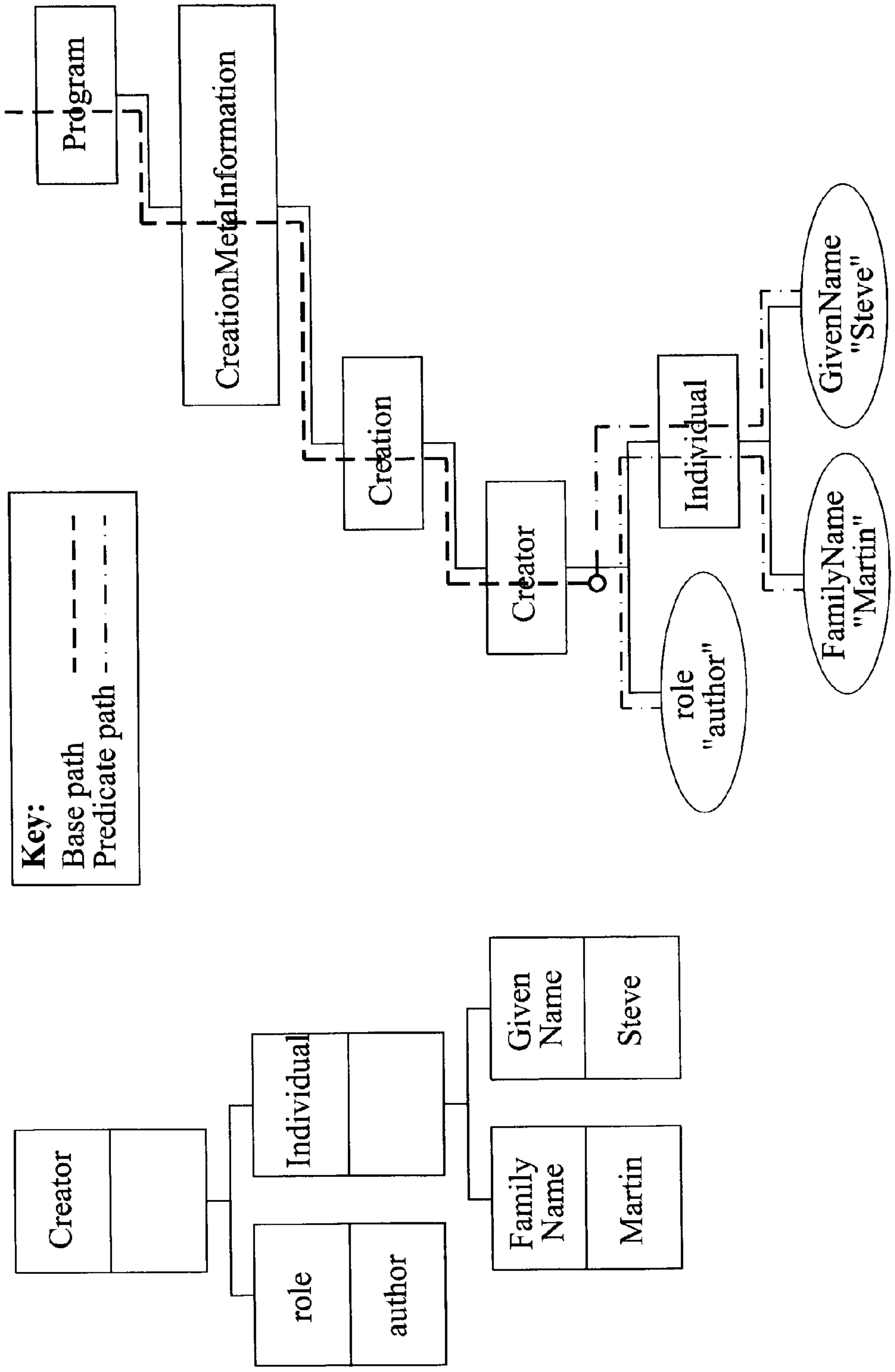
FIG. 16 illustrates a constrained operator.
Figure 16B:
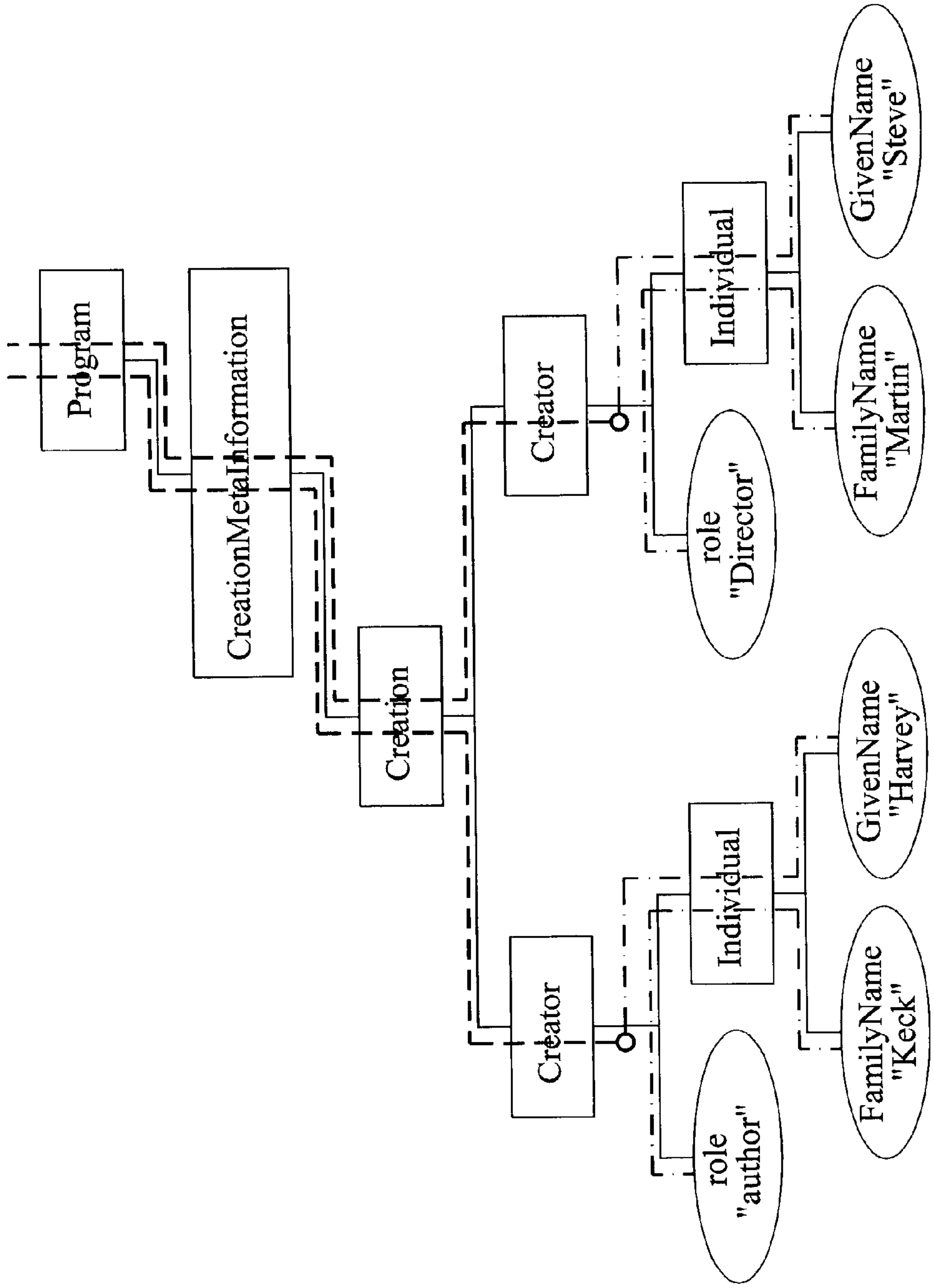

The example shown in FIG. 16 depicts the Constrained-AND operator used for the Creator preference. A special syntax in the Mapping Table indicates that the base path is "/Program/CreationMetalnformation/Creation//Creator". Therefore, the predicate tests are performed against the node instances of "Creator". The first Program Description examples passes this Constrained-AND test, while the second fails. Notice that the second Program Description would have passed a test that was composed of regular AND operators and their global paths.

As shown in FIG. 16, if all the CAND's were all regular AND's, then the User Preference would be asking:

(1) Are there any nodes of path "/Program/CreationMetalnformation/Creation/Creator/role" that have value matching "Author" AND;

(2) are there any nodes of path "/Program/CreationMetalnformation/Creation/Creator/Individual/FamilyName" that have value matching "martin" AND;

(3) are there any nodes of path "/Program/CreationMetalnformation/Creation/Creator/Individual/FamilyName" that have value matching "Martin".

This test would pass both Program Descriptions shown in the example.

As shown in FIG. 16, with the defined CAND's, the User Preference is asking:

(1) are there any nodes of path "/Program/CreationMetalnformation/Creation/Creator", then, at each instance of these nodes;

(2) are there any child nodes of path "role" that have value matching "Author" AND;

(3) are there any child nodes of path "Individual/FamilyName" that have value matching "Martin" AND;

(4) are there any child nodes of path "individual/GivenName" that have value matching "Steve".

This test would only pass the first Program Description. This illustrates that the user of AND and CAND operators on the same program description may result in different results.

Referring to FIG. 17, a general example demonstrates Inter Operators, Intra Operators, and Constrained Operators. The rules for combining the tests may be, for example:

(1) group together tests which have InterOp=CAND, forming the CAND group;

(2) determine the base path for the CAND group from the lowest common Program Description path indicated in the Mapping Table;

(3) for each path instance in the Program Description that is equivalent to this base path, evaluate all the tests within the CAND group, from this path instance;

(4) evaluate all the tests not within the CAND, from the root path;

(5) group together test results within Intragroups which have IntraOp=AND, forming IntraAND results;

(6) AND the test results within Intragroups which have IntraOp=AND, forming IntraAND results;

(7) OR the test results within Intragroups which have IntraOp=OR, forming IntraOR results;

(8) AND the solitary test results (not part of an Intragroup) and Intragroup results which have InterOp=CAND, forming the InterCAND result;

(9) AND the solitary test results and Intragroup results which have InterOp=AND, with the InterCAND result, forming the InterAND result;

(10) OR the solitary test results and Intragroup results which have InterOp=OR, with the InterAND result, forming the InterOR result; and

(11) The InterOR result is the result for the parent test.

Figure 17A:
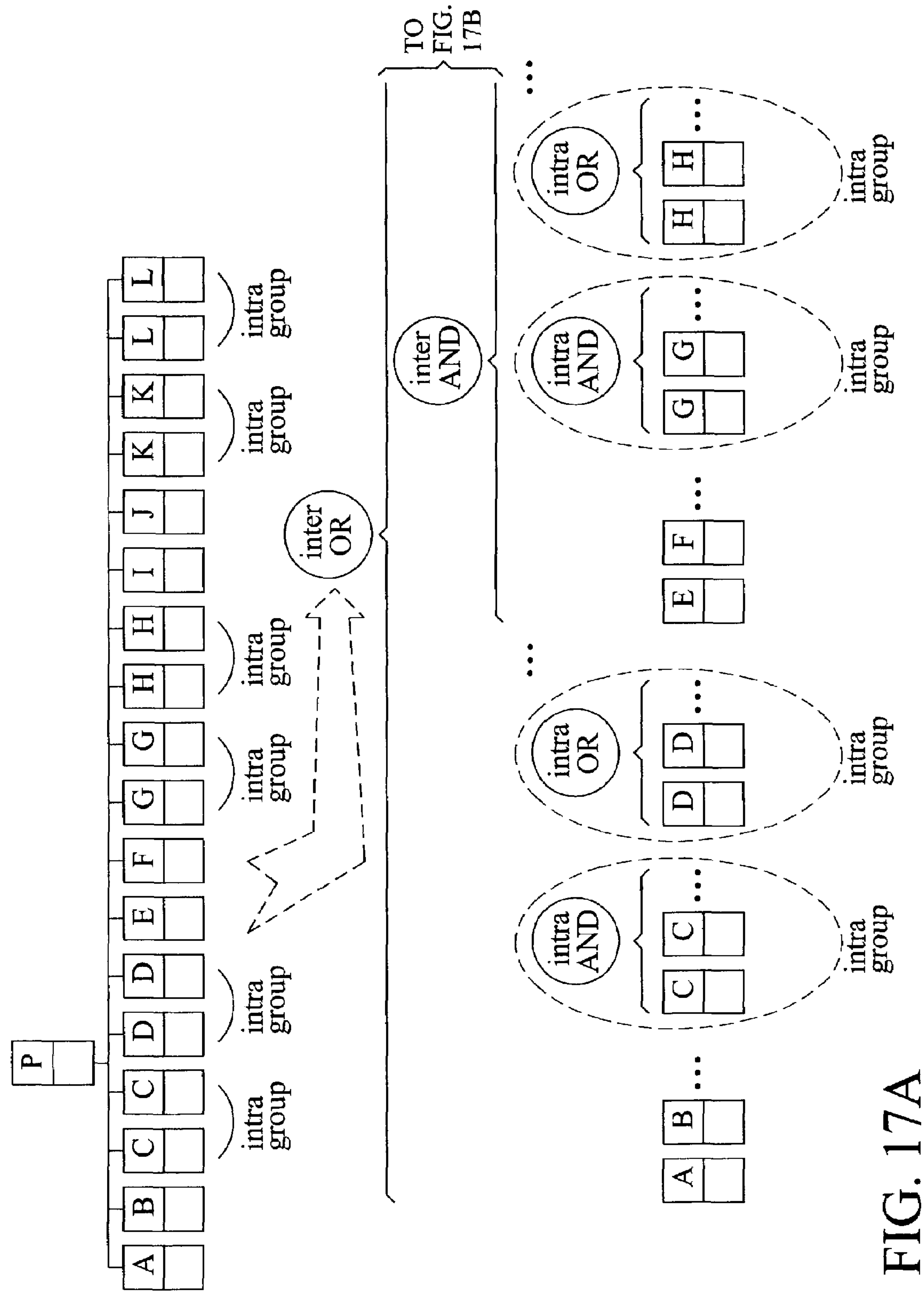
FIG. 17 illustrates operators.
Figure 17B:
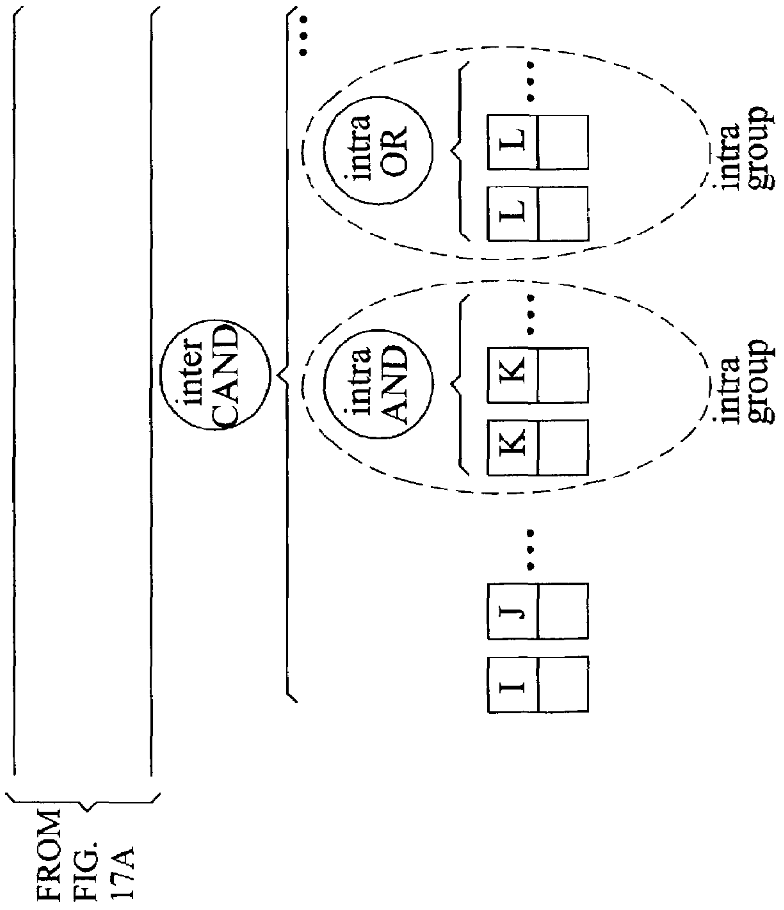
Figure 17C:
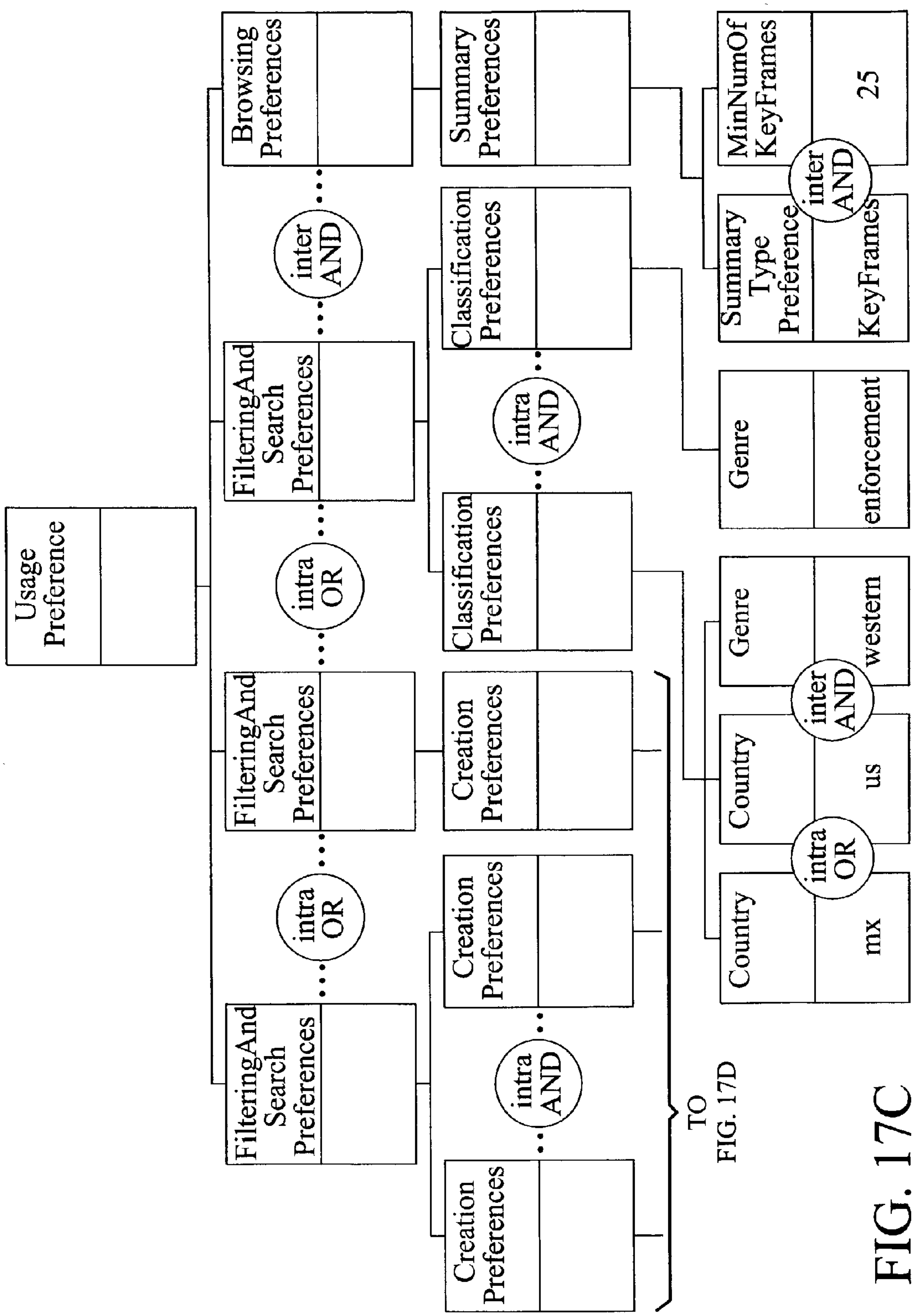
Figure 17D:
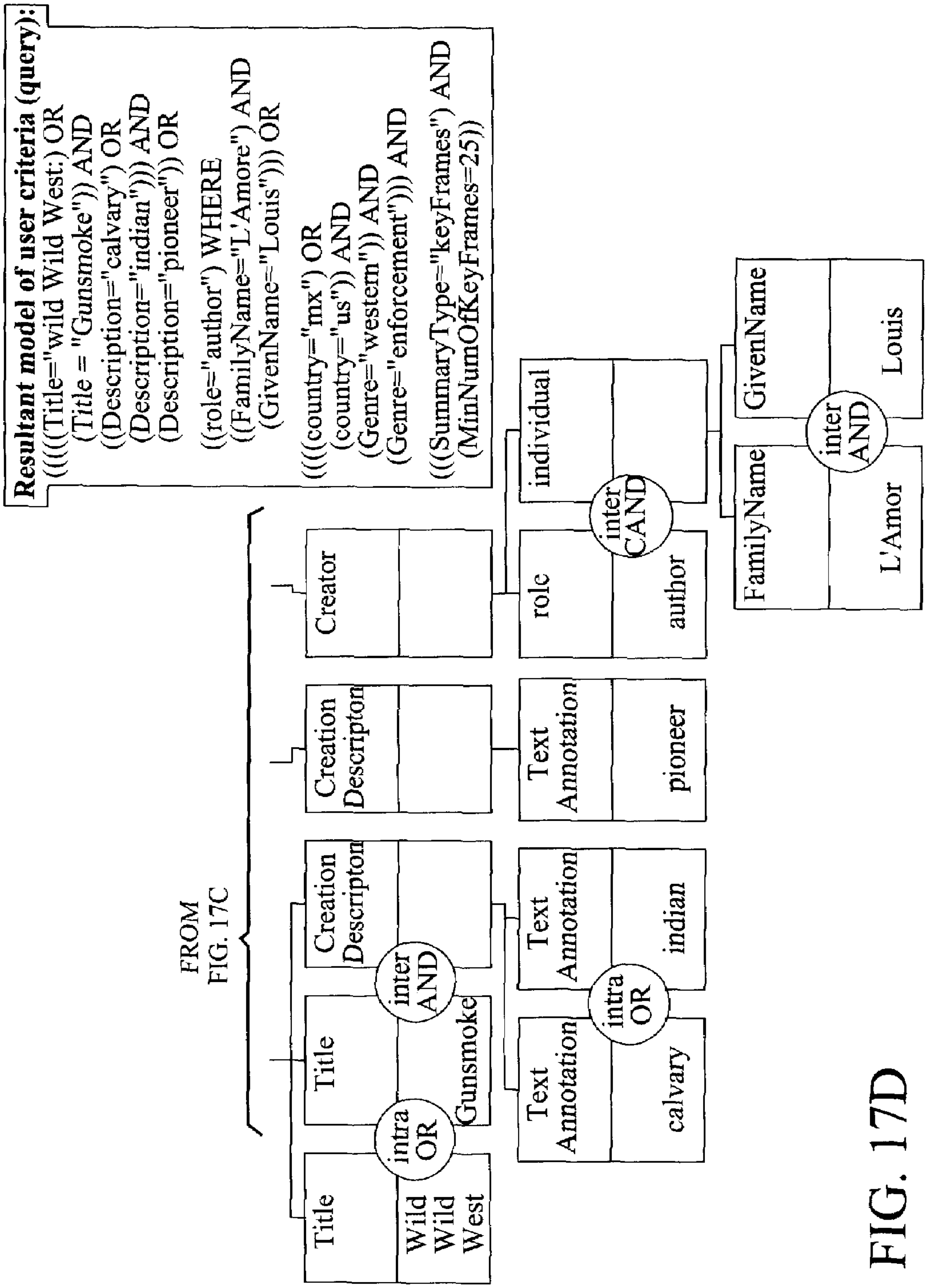

An illustrative example of one embodiment of the technique described herein includes the example illustrated in FIGS. 17C-17D together with the resulting Mapping Table illustrated in FIGS. 18A-18C. It is noted that the default for InterOp/IntraOp operations are AND/OR. It is also noted that the preferences just below the highest level (CreationPreferences, ClassificationPreferences, SummaryPreferences) are AND/AND. Also some of the composite preferences such as Creator have child preferences that are CAND/OR. Further, the multiple Filtering And Search Preferences may be distinguished by Preference Type attributes. The IntraOp for multiple Filtering And Search Preferences and multiple Browsing Preferences is specified.

The multiple User Preference elements may contain a ranking attribute. Such ranking attributes may be applied at each comparison test and each combinatorial operation, to yield a composite ranking score. this may be utilized to provide a sorted test result for the user.

Figure 19:
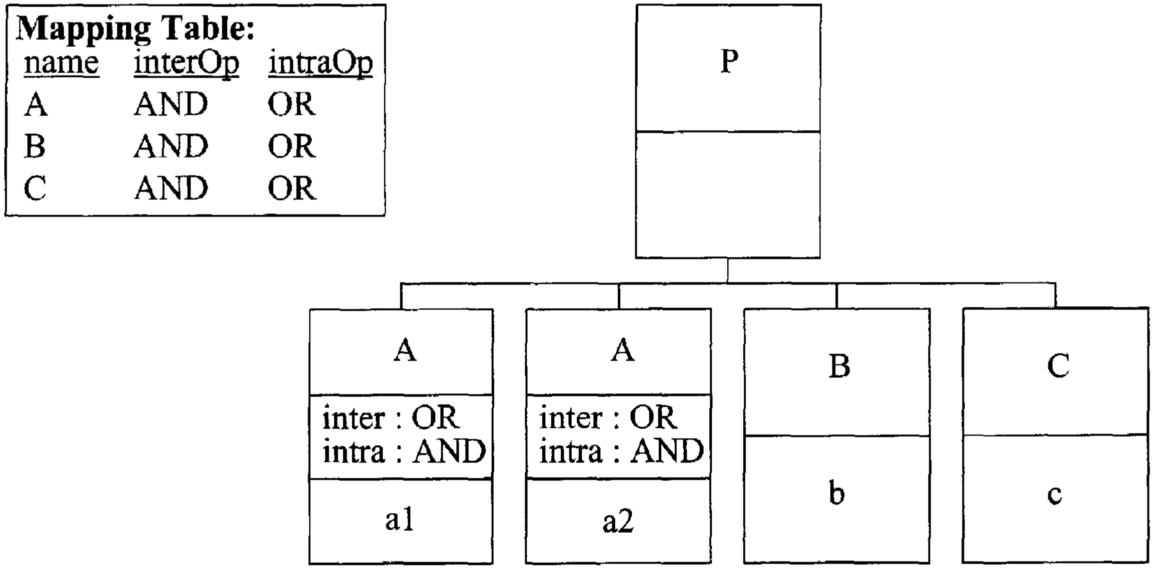
FIG. 19 illustrates a user preference hierarchy.

Referring to FIG. 19, the user preference hierarchy of (name:value) pairs may be supplemented with attributes regarding the intended combination of individual preference tests. The supplementation may indicate that the two tests of type A should be AND'd together and this result OR'd with the other tests under this parent. The primary advantage of this supplemental enhancement is that the user preference description may override the default behavior for specific tests. This makes interpretation of the user preference description more flexible so that it may be tailored to the user's specific preference criteria.

The discrete implementation of the filter agent will yield as output a group of program descriptions that are merely members of the input set. The output group may actually just be a list of the input Program Descriptions that passed the selections. However, there can be components of the User Preference Descriptions that are well suited to extract a subset of the whole Program Description that yields an output more tailored to the user's preference criteria. For instance, the user may request a maximum number of key frames in order to prevent overloading the bandwidth capabilities of their system.

The process of cloning the selected input Program Descriptions and modifying them to include a particular desired subset by the user may achieve enhanced benefits. The modified Program Description is a clone of the input because it refers to the same base set of Program Media. However, it is modified to refer to the subset of the Program Media that is desired by the particular user. In some cases this may result in smaller quantity of the program being available. In other cases, this may result in different summaries of the program, though it refers to the full program.

The cloned Program Description provides a more succinct representation of what the user prefers. In this manner, it may not be necessary to annotate or provide additional identifiers to describe what the user actually desires.

In a modular implementation, the filter agent may not be closely coupled with the media manager and the presentation processes. In this case, the cloned Program Description offers a standardized format for describing the desired program, without having to create a new syntax or an application programming interface (API).

The cloned Program Description may also be used to create a "pull" for Program Media that will yield only the desired portions of the media. This provides a convenient technique for a media provider to provide to the user only that specific media that is desired.

A service provider may likewise provide service to the user according to the user's preference where service includes a modified cloned program description. The cloned description may be a subset of the complete "rich" program description that is usually maintained by the service provider. The clone may contain varying levels of "richness". This permits the provider to offer various service levels to its clients.

The cloned Program Description also allows the customer and/or service provider to tailor the amount of material that will be transmitted to the customer. This enables the quantity of material to be matched to the available memory in the client device and the available bandwidth of the delivery channel.

The cloned program descriptions may provide a memory efficient way of storing descriptions of selected programs in the client's local storage.

Figure 20:
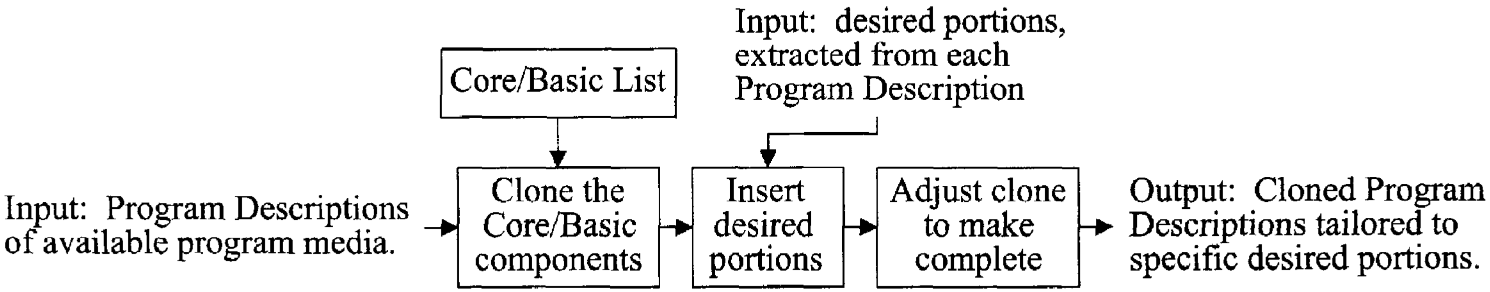
FIG. 20 illustrates cloning by addition.

One technique to achieve cloning is cloning by "addition", as illustrated in FIG. 20. The core elements of a Program Description are identified and copied into the clone. These items typically include the root "/Program" element, the "/MediaInformation", etc. To this core set, the extractor adds the desired components for the user. Also, some adjustment may be necessary to resolve interdependencies of the extracted elements. For example, the Program Description may contain elements or groups of elements that are extensions or refinements of other elements in the Program Description. These extension elements may refer to the base elements without actually duplicating the base elements. In this instance, if the extractor should extract the extension elements but not the base elements then all the base elements must be inserted into the closed Program Description to make it accurate.

Figure 21:
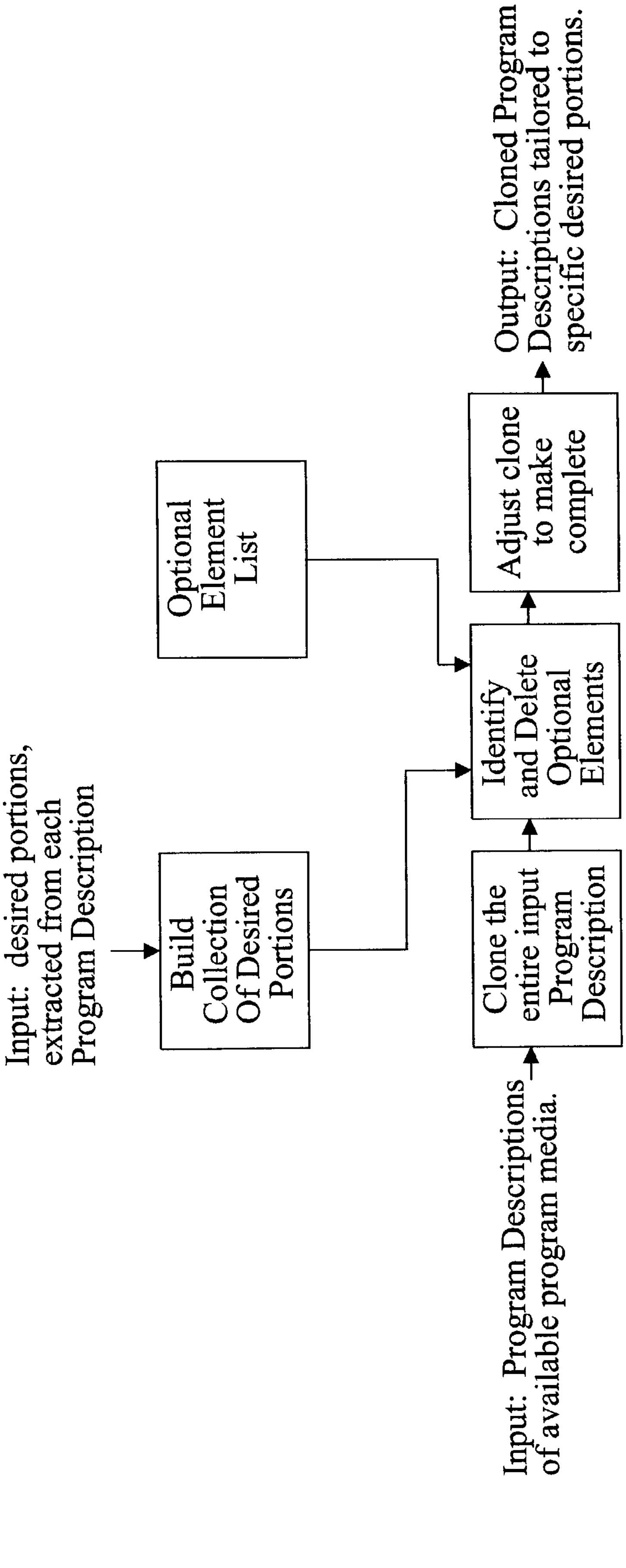
FIG. 21 illustrates cloning by deletion.

Another technique to achieve cloning is cloning by "deletion", as illustrated in FIG. 21. The entire input Program Description is cloned for the output. The extractor then builds a list of the desired components that are to be retained in the output. Then, optional elements are identified in the clone. If these optional elements are not included in the list of elements to be retained, then they are deleted. Thereafter, some adjustments may be necessary to resolve interdependencies of the extracted elements, as previously described. One advantage of cloning by deletion over cloning by addition is that it is less susceptible to changes in the Program Description. Items that are not explicitly listed as being optional will be passed on. In effect, this method errs on the side of passing too much data, while cloning by addition errs on the side of passing too little.

A vast amount of audiovisual material exists from which the user may select appropriate audiovisual materials that may be of interest. However, there needs to be developed effective techniques to determine which audiovisual materials are most likely appropriate for a particular user. Typically these techniques include the use of an agent that compares in some manner the user's preferences to the audiovisual content. Existing agents typically offer rudimentary preference weighting techniques based upon preference items such as title, keyword, author, and cast. The weighting scheme determines to what extent a particular set of user preferences matches the description of the different audiovisual materials, such as a binary yes/no determination. After determining the extent to which the user preferences matches a particular audiovisual material an overall score is calculated. After computing the overall score for each of the audiovisual materials they may be ranked in order from which the user may select desirable material. However, the use of such a technique makes it difficult to distinguish between programs that are strongly desired versus fringe programs that the user may be rarely interested in. An effective agent should include a technique for identifying priority interests and a mechanism for sorting the priority interests. In essence, the audiovisual content should be distinguished in a meaningful manner.

Figure 22:
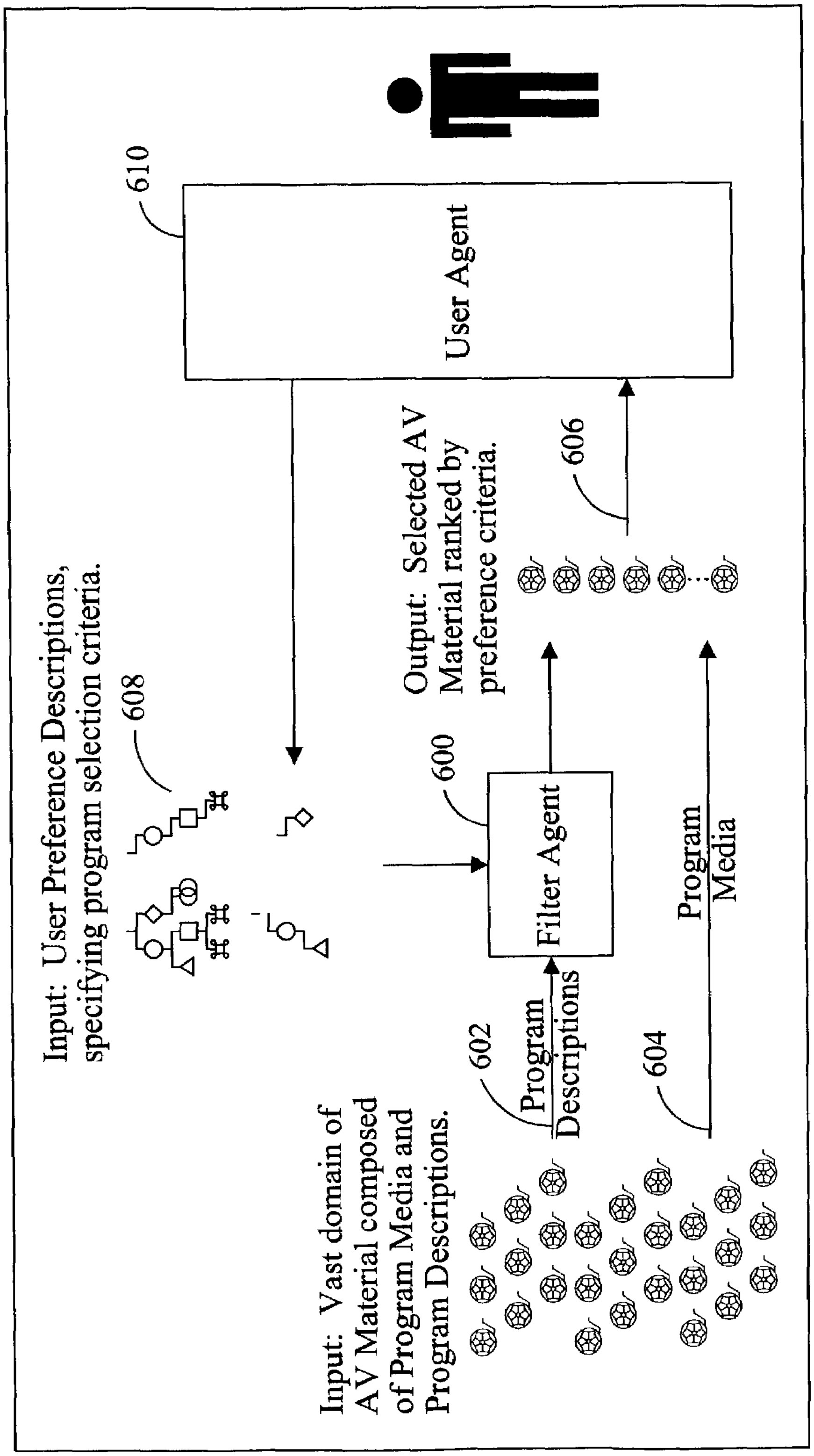
FIG. 22 illustrates a filtering system.

Referring to FIG. 22, the input to a filter agent 600 may include program descriptions 602 relating to one or more audio, video, or audiovisual (collectively referred to as audiovisual without limitation) materials 604. The filter agent 600 also receives user preference descriptions 608, typically from a user agent 610, which may be hierarchical if desired. The filter agent 600 based upon the user preference descriptions 608 and the program descriptions 602 provides selected audiovisual materials 606, which may be rated if desired. The selected audiovisual materials may be provided to a user agent 610 and then to the user, if desired. The user agent 610 may create the user preference profile. Alternatively, the user or other party may utilize an authoring tool or automatic profile generator to create the user preference profile.

Figure 23:
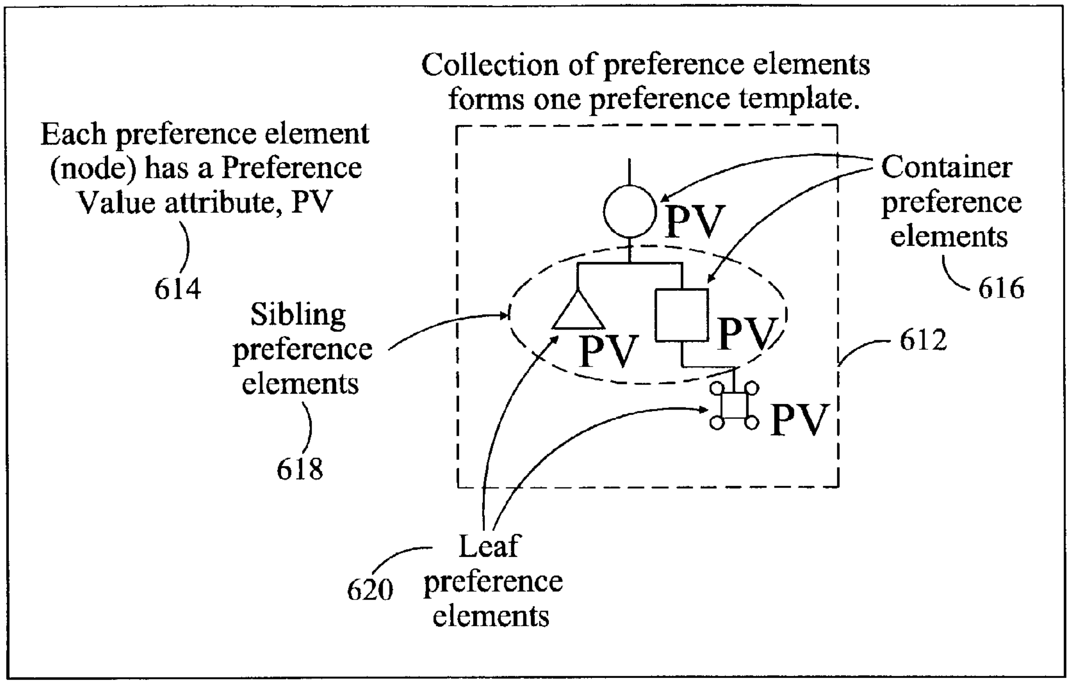
FIG. 23 illustrates a collection of preferences.

Referring to FIG. 23, a collection of related preferences may form a single preference template 612 (e.g., comedies with Eddie Murphy). The user agent 610 may create a group of one or more preference templates 612 that are evaluated to present the user with filtered and ranked programs. Each component of a preference template that may carry a preference value (PV) attribute may be referred to as a preference element (or node) 614. A container (or parent) 616 preference element has children preference elements 618. A parent may also have an individual preference test. Leaf preference elements 620 are those that do not have children and may refer to an individual preference test (e.g., genre is comedy).

Figure 24:
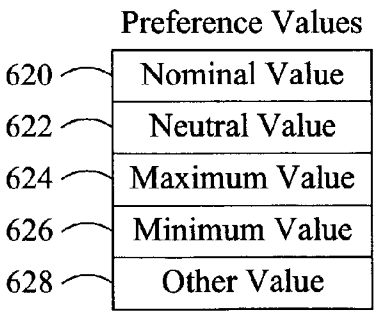
FIG. 24 illustrates preference values.

Referring to FIG. 24, the values defined by the preference value may take one or more values, such as for example, nominal value 620, neutral value 622, maximum value 624, and minimum value 626. It is to be understood that the preference values may take on other values. The neutral value 622 is preferably zero or some other predefined value representative of a neutral preference or indifference to programs with the associated preference. Typically, preference values with a neutral value (or null set) are not included in the resulting classification or scoring of the associated audiovisual content. The nominal value 620 preferably has a value other than zero, or some other predefined value, representative of a desire or disdain for programs with the associated preference. In essence, the nominal value 620 indicates which programs are desirable by the user and which programs are not desired by the user. In this manner, programs which are desirable are more likely provided to the user, while programs that contain disdained content will be more likely not provided to the user. The nominal value 620 may be a constant value or otherwise a range of values to indicate a relative desire or disdain for particular content. Preferably, the user agent 610 or filter agent 600 provides a default value for the nominal values 620, so that the user does not have to explicitly define each of the nominal values. The user may define any of the nominal values 620, as desired. Preferably, there is not a predefined maximum value 624 or minimum value 626. Conceptually, a maximum value may represent that the user agent wants programs with a particular preference to always be selected and ranked highest. Similarly, a minimum value might represent that the user agent wants programs with a particular preference to always be rejected. In both of these cases the user agent may effectively simulate the maximum and minimum concept by selecting the value appropriately (e.g., +/−1, 000,000).

The user preference description may include a hierarchy of preferences, many of which include preference value attributes. When each "individual preference" is evaluated against the corresponding information from the program descriptions a score is calculated for that individual preference. In one embodiment, the hierarchy of preferences for an individual hierarchy may be evaluated by creating a composite score from the aggregation of individual scores within the hierarchy. The resulting composite score is then compared against other composite scores for other program descriptions to determine a relative ranking. The composite score for a particular program description may be determined free from consideration of other program descriptions, if desired.

While a composite score provides a relatively good measure for the desirability for any particular media, especially when compared against other composite scores, the present inventor determined that the resulting relative composite scores may be misleading of the desirability of the content. For example, a particular audiovisual program may have only a limited occurrence of a particular event or item, in which case the composite score will likely consider that limited occurrence as being fully present in the program. However, a different audiovisual program may have frequent occurrences of a particular event or item, in which case the composite score will likely merely consider that frequent occurrence in the same manner as the limited occurrence. Accordingly, it may be preferable to rank programs at an intermediate level, described later. Also, it is not preferable to combine the preference values into a single composite preference value. Instead, each score, which is evaluated using its associated preference value, is combined into a composite score. When examining a user preference, it may be useful to combine one or more of the preference values, but this is actually combining the resultant scores when the preference is found to match a corresponding program description attribute. Also, it is likewise preferable not to compare a score against a preference value. Rather, the score is the result of the actual test considered with the preference value, and this score should be compared against other scores or against implementation-fixed thresholds.

There are preferably at least two distinct processes occurring when the filter agent 600 processes a user preference 608. One process is the filtering of programs (pass or reject). The other process is the scoring and ranking of the selected programs into an ordered list (e.g., from most preferred to least preferred). The ranking values may be any type of indication, as desired. These two processes may be implemented by a variety of functions (e.g. filtering-function ∈ {Boolean-AND, Boolean-OR, etc.}, ranking-function ∈ {MIN, MAX, SUM, AVG, etc.}). These two processes may be distinct, such as, filter then rank, or rank then filter, or they may be integrated, namely, simultaneously filter and rank. In the hierarchical combination of user preferences, each combinatorial operator (AND, OR, etc) preferably implements some form of a filtering function and a ranking function. There may be a family of varieties of the AND and OR operators (or other operators) which implement different filtering and ranking functions.

Programs may be ranked according to their respective scores, which is a relative relationship. The preference values and scores may be scaled without changing the result of the filter agent 600. The definition of a zero neutral value (or other value) sets a point for the filtering of programs based on score results. Depending on the filtering function, programs with a score above zero (or other value) may be passed and programs with zero or a negative score (or other value) may be rejected. The definition of the nominal value does not set an absolute significance for preference values and scores. The nominal value merely sets the default value that may then be compared (relatively) to other preference values and scores.

The preference values may likewise be more than simply a number to provide further refinement of the selection process. The preference values may take the form of relativistic operations that compare different portions of the user preferences and multiple program descriptions at a level less than the entire program description. In this manner, portions of the program descriptions may be compared to one another which provides significantly improved results. A set of scenarios are provided to illustrate exemplary comparisons that may be implemented by the filter agent 600.

Each comparison may vary according to any suitable criteria, such as, for example, the following criteria:

(1) Hierarchy of preferences includes a single branch or multiple branches that are being compared;

(2) Combinatorial operators such as OR, AND, etc.;

(3) Composite score versus independent evaluation determines whether all of the individual tests are compiled into one composite score for an entire program, or whether one or more branch tests of a program are evaluated and compared in a relative manner against one or more branch tests of other programs; and/or (4) Non-preference indicates a negative preference for a program by appropriate selection of preference values and resulting scores.

Figure 25:
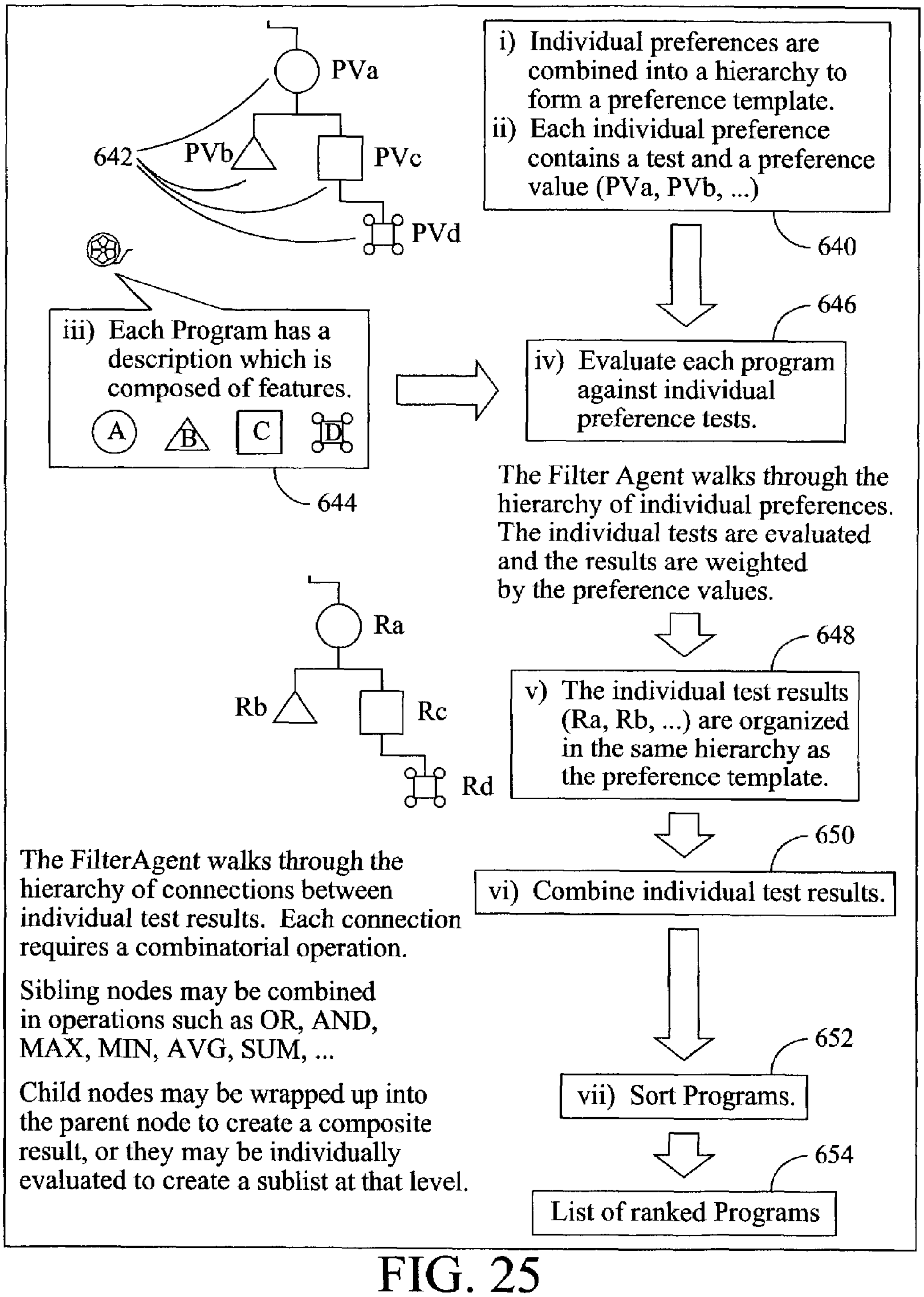
FIG. 25 illustrates a test case.

Referring to FIG. 25, the test case for each example may be evaluated as follows:

(a) In each example, one or more individual preferences 640 may be provided. These are designated by lower case 'a', 'b', 'c', . . . and preferably arranged in a hierarchy.

(b) The value for each individual preference is the preference value. These are designated as 'PVa', 'PVb', 'PVc' . . .

(c) One or more programs may have some measurable presence of the desired program feature 644. These are designated by upper case 'A', 'B', 'C', . . . and are related to the corresponding individual preference (in lower case).

(d) The outcome of each individual preference test 646 is an individual presence value. The individual presence value is multiplied by the preference value for that program feature to yield the individual test result. Any other type of comparison, or other operation, may be used as desired.

(e) All or part of the resultant individual test results are preferably arranged in the same hierarchy as the preference template at block 648.

(f) The individual test results may be combined at block 650. They may be combined across all levels to create one composite score, or they may be combined and evaluated at one or more levels to create sublists at each parent node. These sublists may be used as the basis for ranking in a manner independent of the ranking for the entire program, if desired.

Sibling nodes may be combined in operations such as OR, AND, MAX, MIN, AVG, SUM, . . . Programs with test results that fall below a threshold may be rejected before or after the results are combined.

(g) The ranking of programs at block 652 may be performed by sorting the score results, such as the highest score ranked number one, etc. at block 654.

Figures 26, 27, 28, 29, 30:
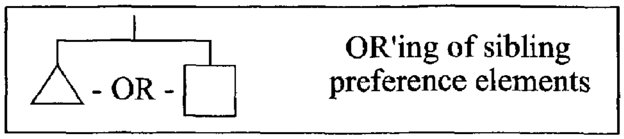
FIG. 26 illustrates an OR'ing combination.
FIG. 27 illustrates more is better combination.
FIG. 28 illustrates just slightly more is better combination.
FIG. 29 illustrates strong preference is better combination.
FIG. 30 illustrates range of preference combination.

Referring to FIG. 26, a single (or multiple) branch combining sibling leaf elements (or other elements) using an OR'ing combination is illustrated. The result is the same as a traditional OR operation, namely, if either is true then the result is true (or score obtained).

Referring to FIG. 27, a single (or multiple) branch combining sibling leaf elements (or other elements) using a MORE IS BETTER combination, which may be implemented as one or more operations, is illustrated.

| | |
|---|---|
| Design Rule 1: | The OR combinatorial operator means "I want programs with at least one of these listed items." Generally, the more that are found, the better and hence more should be ranked above less. |
| Design Rule 2: | The preferred ranking function for the OR combinatorial is the SUM function. |
| Design Rule 3: | An alternative ranking function for the OR combinatorial is the MAX function. The MAX function selects the greatest value, e.g., the most desirable. Other ranking functions may likewise be used. |

Test case description: If the user agent wants to see programs with dogs(A) or cats(B), then programs with dogs and cats should rank above programs with just dogs.

[Test case example illustrated in FIG. 27]

Test=a OR b

PVa=PVb=1

Program J (A=B=1)

Program K (A=1, B=0)

The test is an OR'ing of individual preference 'a' or 'b', where 'a' and 'b' are testing for the presence of 'A' and 'B'. Program 'J' has full presence of 'A' and 'B', and Program 'K' has full presence of 'A' and no presence of 'B'.

Referring to FIG. 28, a single (or multiple) branch combining sibling leaf elements (or other elements) using a JUST SLIGHTLY MORE IS BETTER combination, which may be implemented as one or more operators, is illustrated.

Test case description: If the user agent wants to see programs with dogs(A) or cats(B), then programs with dogs and only a tiny amount of cats, should rank higher than programs with just dogs. Likewise, Program K would rank higher than Program J, if B=0.3 for Program K.

[Test case example shown in FIG. 28]

Test=a OR b

PVa=PVb=1

Program J (A=1, B=0.01)

Program K (A=1, B=0)

Referring to FIG. 29, a single branch (or multiple) combining sibling leaf elements (or other elements) using a STRONG PREFERENCE IS BETTER, which may be implemented as one or more operators, is illustrated.

Design rule 4: If a user agent has a strong preference for something, this should override nominal or weaker preferences.

Test case description: If the user agent strongly wants to see programs with dogs(A) or nominally wants to see cats(B) or mice(C), then programs with dogs should rank above programs with cats and mice.

[Test case example illustrated in FIG. 29]

Test=a OR b OR c

PVa=4, PVb=PVc=1

Program J (A=1, B=C=0)

Program K (A=0, B=C=1)

Referring to FIG. 30, a single (or multiple) branch combining sibling leaf elements (or other elements) using a RANGE OF PREFERENCE AND PRESENCE YIELDING RANGE OF RANKING, which may be implemented as one or more operators, is illustrated.

Design rule 5: The evaluation and combination of individual test results should be linear such that partial preferences and partial presences are ranked in a range from neutral preference/non-presence to full preference/full presence.

Test case description: If the user agent strongly wants to see programs with bears(A) or nominally wants to see lions(B) or tigers(C), then programs with partial bears should rank the same, or higher, or lower than programs with full tigers and lions, depending on the preference values. Programs should be ranked linearly, or in any other manner, according to the PVs and the degree of presence.

[Test case example illustrated in FIG. 30]

Test=a OR b OR c

PVa=4, PVb=PVc=1

Program J (A=0.4, B=C=0)

Program K (A=0.5, B=C=0)

Program L (A=0, B=C=1)

Program M (A=0.1, B=C=1)

Figures 31, 32, 33, 34, 35:
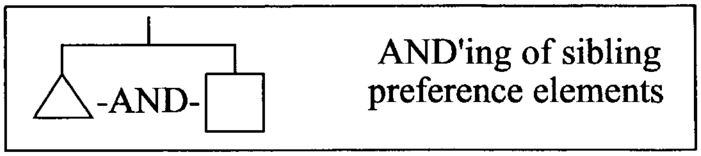
FIG. 31 illustrates AND'ing combination.
FIG. 32 illustrates more is better combination.
FIG. 33 illustrates range of preference combination.
FIG. 34 illustrates filter first combination.
FIG. 35 illustrates filter first combination.

Referring to FIG. 31, a single (or multiple) branch combining sibling leaf elements (or other elements) using an AND'ing combination is illustrated. The result is the same as a traditional AND operation, namely, if both are true then the result is true (or some value).

Referring to FIG. 32, a single branch (or multiple) combining sibling leaf elements (or other elements) using a MORE IS BETTER, which may be implemented as one or more operators, is illustrated.

Design rule 6: The preferred ranking function for the AND combinatorial is the average function. This takes the average of the component test results to create a score that is used for ranking.

Design rule 7: An alternative ranking function for the AND combinatorial is the minimum function. This takes the value of the lowest test result as the score for the combination.

Design rule 8: When evaluating the AND combination, as with the OR combination, more preference and presence is typically better.

Test case description: If the user agent wants to see programs with neural(A) and network(B), then programs with full neural and full network should rank above programs with full neural and partial network.

[Test case example illustrated in FIG. 32]

Test=a AND b

PVa=PVb=1

Program J (A=B=1)

Program K (A=1, B=0.5)

Referring to FIG. 33, a single (or multiple) branch combining sibling leaf elements (or other elements) using a RANGE OF PREFERENCE AND PRESENCE, which may be implemented as one or more operators, is illustrated.

Design rule 9: When evaluating the AND combination, as with the OR combination, the individual tests and the combination of individual test results should be linear (or any other type) such that partial preferences and partial presences are ranked in a range from neutral preference/non-presence to full preference/full presence.

Test case description: If the user agent wants to see neural (A) and network(B), then programs with full neural and tiny network should rank same, or higher, or lower than programs with partial neural and partial network, depending on the presence and preference values.

[Test case example illustrated in FIG. 33]

Test=a AND b

PVa=PVb=1

Program J (A=B=0.6)

Program K (A=1, B=0.1)

Program L (A=B=0.5)

Referring to FIG. 34, a single (or multiple) branch combining sibling leaf elements (or other elements) using a FILTER FIRST VERSUS SCORE FIRST, which may be implemented as one or more operators, is illustrated.

Design rule 10: The preferred order of operation for the AND combinatorial is score then filter. In this order, the score for the AND combination is calculated and then if it is below some threshold, the program is rejected.

Test case description: If the user agent wants to see artificial(A) and vision(B), then programs with full artificial and partial vision should rank above programs with partial artificial and partial vision which rank above programs with full artificial and no vision.

[Test case example illustrated in FIG. 34]

Test=a AND b

PVa=PVb=1

Program J (A=1, B=0.9)

Program K (A=B=0.9)

Program L (A=1, B=0)

Referring to FIG. 35, an alternative single (or multiple) branch combining sibling leaf elements (or other elements) using a FILTER FIRST VERSUS SCORE FIRST, which may be implemented as one or more operators, is illustrated.

Design rule 11: An alternative order of operation for the AND combinatorial may be filter then score. In this order, if a program has zero or less of some AND'd preference, then it is rejected, regardless of the rest of the scoring. If the score is propagated upward in the hierarchy to be used in other combinatorial operations, then the score should indicate neutral or non-preference (e.g. zero or negative value).

Test case description: If the user agent wants to see artificial(A) and vision(B), then programs with full artificial and no vision should fail.

[Test case example illustrated in FIG. 35]

Test=a AND b

PVa=PVb=1

Program L (A=1, B=0)

Container preference elements may be evaluated and combined with other preference elements (either container, leaf, or otherwise) in a variety of combinatorial operations.

Figures 36, 37, 38:
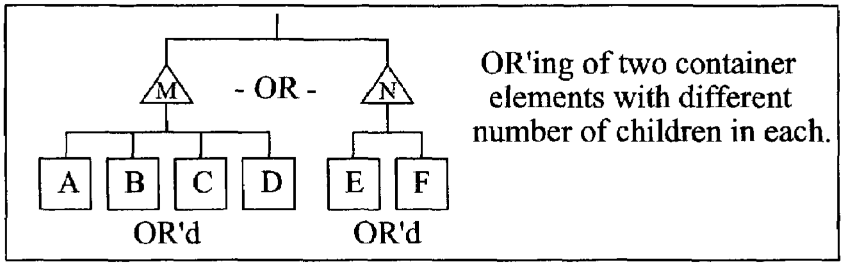
FIG. 36 illustrates multi-branch OR'ing combination.
FIG. 37 illustrates multi-branch OR'ing combination.
FIG. 38 illustrates a test case.

Referring to FIGS. 36 and 37, a multiple branch combining sibling leaf elements (or other elements) using a MULTI-BRANCH OR'ING, which may be implemented as one or more operators, is illustrated.

Design rule 12: The OR combinatorial function implemented by SUM (or other functions) should combine all the sibling elements (or otherwise) the same, without regard to the number of siblings (or otherwise).

User agent rule: If the user agent intends that the ratio of passing preferences should matter, then the agent should adjust the preference values accordingly.

Design rule 13: An alternative ranking function for the OR combination would account for the ratio of passed components.

Test case description: A user agent wants to see movies with as many actors from group-N as possible or as many actors from group-M as possible. If N={A,B,C,D) and M={E, F}, then the user agent may wish to see a movie with A, B, C ranked over a movie with E, F.

[Test case example illustrated in FIG. 37]

Test=x ORy; x=a OR b OR c OR d; y=e OR f

PVx=PVy=PVa=PVb=PVc=PVd=PVe=PVf=1

Program J (A=B=C=1, D=E=F=0)

Program K (A=B=C=D=0, E=F=1)

Test case description: A user agent wants to see movies with the highest percentage of actors from group-N or the highest percentage of actors from group-M. Illustrated in FIG. 38. If N={A, B, C, D} and M={E, F}, then the user agent may wish to see a movie with E, F ranked over a movie with A, B, C.

[Test case example illustrated in FIG. 38]

Test=x OR y; x=a OR b OR c OR d; y=e OR f

PVx=PVy=PVa=PVb=PVc=PVd=1

PVe=PVf=2

Program J (A=B=C=1, D=E=F=0)

Program K (A=B=C=D=0, E=F=1)

Referring to FIGS. 39 and 40, a multiple branch combining sibling leaf elements (or other elements) using a COMPOSITE SCORING, which may be implemented as one or more operators, is illustrated.

Design rule 14: A preferred method for combining the children test results of a parent element (or otherwise) is to combine them into one composite score and pass this up to the containing grandparent element (or otherwise), as illustrated in FIG. 39. At the root composite element, this composite score is used to rank all the programs. This method may be referred to as composite scoring.

Test case description: In a composite scoring combination, if the user agent partially wants to see westerns (X) that star Eastwood(A) or Wayne(B), or fully wants to see dramas (Y)

with a sub-preference that is full for Gibson(C) or small for Cruise(D), then a western with Eastwood should rank higher than a drama with Cruise. The user agent is intending to seek for programs with the highest overall score for all their preferences.

[Test case example illustrated in FIG. 40]

Test=x OR y; x=a OR b; y=c OR d

PVx=0.8, PVy=PVa=PVb=PVc=1, PVd=0.5

Program J (A=B=1, C=D=0)

Program K (A=B=0, C=D=1)

Referring to FIGS. 41-44, a multiple branch combining sibling leaf elements (or other elements) using a INDEPENDENT EVALUATION, which may be implemented as one or more operators, is illustrated.

Design rule 15: An alternative method for combining the children test results of a parent element (or otherwise) is to rank all the programs for each of the children tests (or otherwise) separately. These sublists of rankings are then inserted, as a block, into a super list for the parent element, where each block is ranked according to the preference value of the child test. This method may be referred to as independent evaluation.

Design rule 16: When sublists are inserted into super lists, the position of any program should assume the position that the program takes in the highest sublist that contains the program. (Only keep the highest position for each program.)

Test case description: In an independent evaluation combination, if the user agent partially wants to see westerns (X) that star Eastwood(A) or Wayne(B), or fully wants to see dramas(Y) with a sub-preference that is full for Gibson(C) or small for Cruise(D), then a western with Eastwood should rank lower than a drama with Cruise. The user agent is intending to seek for dramas above all westerns.

[Test case example illustrated in FIGS. 42, 43, and 44]

Test=x OR y; x=a OR b; y=c OR d

PVx=0.8, PVy=PVa=PVb=PVc=1, PVd=0.5

Program J (A=B=1, C=D=0)

Program K (A=B=0, C=D=1)

Design rule 17: The OR'ing of sibling container preferences with equal PVs using independent evaluation is equivalent to using composite scoring.

User agent rule: If the user agent intends to intermingle the ranked results across two branches (or otherwise), but also intends to rank one branch's results slightly higher than the other (or otherwise), then the agent can use composite scoring and adjust the PVs of the leaf tests (or otherwise) of the higher preferred branch to give this slight advantage, and the results will still be intermingled.

Referring to FIG. 45, a multiple branch combining sibling leaf elements (or other elements) using a COMPARING VARIOUS PVS ACROSS HIERARCHY, which may be implemented as one or more operators, is illustrated.

Design rule 18: In AND operations, creating branch sublists and then merging these lists should yield the same results as creating one composite list. Therefore "independent evaluations" are not relevant. All the components of the AND operation should be scored and these results should be combined into a composite score.

Test case description: If the user agent is strongly interested in horses(A) or ostriches(B), and nominally interested in breeding(C) or grooming(D), then a program with partial horses and full grooming should rank lower than a program with full horses and partial grooming.

[Test case example illustrated in FIG. 45]

Test=x AND y; x=a OR b; y=c OR d

PVx=2, PVy=PVa=PVb=PVc=PVd=1

Program J (A=0.9, B=C=D=1)

Referring to FIG. 46, a multiple branch combining sibling leaf elements (or other elements) using a UNQUALIFIED OR'ING OF NON-PREFERENCES MAY RETRIEVE LARGE QUANTITY OF RESULTS, which may be implemented as one or more operators, is illustrated.

Design rule 19: The use of OR combination with non-preferences is a special case that should be used in conjunction with other AND'd preferences. If the non-preference is OR'd in the main branch, without being further qualified with another AND'd preference, this will tend to retrieve the majority of the programs available. OR'ing of non-preferences is generally only useful if this branch is qualified with another branch in an AND'ing combination.

Referring to FIG. 47, a multiple branch combining sibling leaf elements (or other elements) using a QUALIFIED OR'ING OF NON-PREFERENCES IS PREFERRED, which may be implemented as one or more operators, is illustrated.

Design rule 20: The nature of OR'ing operations is such that individual members of the combination should not decrease the combined score, rather, they can only increase the score. When combining non-preferences in an OR combination, the individual test result (negative value) should be translated into the positive preference range by adding the individual preference value to the result.

Test case description: If the user agent wants to see programs with "nature" (A) or without "city" (B), then a program with nature and city should be ranked lower than a program with just nature.

[Test case example illustrated in FIG. 48]

Test=a OR b

PVa=1, PVb=−1

Program J (A=B=1)

Program K (A=1, B=0)

Referring to FIG. 49, a multiple branch combining sibling leaf elements (or other elements) using a NON-PREFERENCE SCORE FIRST RESULTS IN ANY PRESENCE YIELDING LOWER RANKING, which may be implemented as one or more operators, is illustrated.

Design rule 21: The preferred order of operation for the AND combinatorial of non-preferences is to score then filter. In this case, the score for the AND combination is calculated and if the composite score is below zero, the program is rejected.

Design rule 22: When the order of operation for positive preferences is filter-first and the order for non-preferences is score-first, then the programs are first filtered according to the presence/absence of positive preferences, then the score is calculated for all component preferences (positive and negative). This score is then used to again filter (reject programs below a threshold) and finally rank the programs. (This design rule is not demonstrated in the test cases below.)

Test case description: If the user agent wants to see programs with "nature" (A) and without "city" (B), then a program with just a glimpse of city should pass lower than a program with just nature.

[Test case example illustrated in FIG. 49]

Test=a AND b

PVa=1, PVb=−1

Program J (A=1, B=0.01)

Program K (A=1, B=0)

Test case description: If the user agent strongly does not want to see city, then a program with just a glimpse of city should fail.

[Test case example illustrated in FIG. 50]

Test=a AND b

PVa=1, PVb=−100

Program J (A=1, B=0.01)

Referring to FIG. 51, a multiple branch combining sibling leaf elements (or other elements) using a NON-PREFERENCE FILTER-FIRST MAY RESULT IN ANY PRESENCE YIELDING REJECTION, which may be implemented as one or more operators, is illustrated.

Design rule 23: An alternative order of operation for the AND combinatorial of non-preferences is to filter-first then score. So if a program has the slightest amount of a non-preference, then it is rejected, regardless of the rest of the scoring. If the score must be propagated upward to be used in other OR statements, then the score should be zero or something negative.

Test case description: If the user agent wants to see programs with "nature" (A) and without "city" (B), then a program with just a glimpse of city should fail.

[Test case example illustrated in FIG. 51]

Test=a AND b

PVa=1, PVb=−1

Program J (A=1, B=0.01)

The range and number of multimedia content available to users have increased at a staggering rate, rendering conventional methods of selecting such multimedia content, such as simple browsing, impractical. In order to provide a usable technique to select desirable multimedia, typically the system limits the set of choices available to the user by constructing and maintaining a user profile, which provides a compact description of a user's interests and personal preferences. This user profile may be subsequently used to (a) filter input content, so that programs or items that the user has shown interest in are presented to the user, and/or (b) request from a content distribution service the programs of interest. If desired, the user profile may be specified directly by the user, who explicitly states the descriptions of the programs he/she is interested in. Alternatively, user profiles can be automatically generated and updated to match content consumption behavior of users by recording and subsequently analyzing usage history information. Furthermore, content providers (broadcasters and advertisers) can use the usage history information to accurately determine consumer response to, and ratings of, specific programs; to provide personalized content to individuals based on their preferences; and develop various content access, billing, and compensation models for consumers and content creators/owners.

Existing systems for selecting multimedia content focus on collecting a limited amount of information as part of the usage history. The list of available actions and content description items provided by these systems is not suitable for extension as new requirements and applications arise. Furthermore, there is a lack of standardized formats for representation of (multimedia) usage history information; hence the usage history data collected by a certain type of device or service cannot often be utilized directly by others. Additionally, usage history has traditionally been considered only as a tool for generating user preferences and profiles. Further, existing systems provide no technique to record usage history in terms of both individual user actions and detailed categorized lists.

After consideration of the existing limitations with respect to the selection of multimedia content the present inventors developed a system for collecting and describing usage history information of one or more users in a much improved manner. The improved system allows non-intrusive observation of user actions over a period of time, enabling collection of consumption-related data without explicit user input. The period of time may be specified, modified, or otherwise dynamic, as desired. The collected usage history provides a list of the actions carried out by the user over a period of time, if desired, as well as statistical information with respect to the content descriptions, if desired. The content descriptions for the system may be custom for the particular system, standard multimedia descriptions, and may be in any format desired. In particular, descriptions may be in the form of a standard description (such as those defined by the MPEG-7, TV-Anytime Forum, ATSC-PSIP or DVB-SI) that accompanies the input content. The descriptions may also be provided as an auxiliary service, such as electronic program guides provided by cable services and Internet sites like Gist.com and TVGuide.com.

The collected usage history information is preferably expressed in a compact, structured, and consistent format. These properties permit efficient and effective exchange of usage history information between various devices, platforms, applications, service providers, equipment and such, thereby increasing the likelihood of interoperability between these entities.

The preferred implementation uses a description scheme/XML-based approach for describing the content usage history of a user over a period of time. The description schemes define a syntax and semantics for specifying usage history descriptions; i.e. description schemes for usage histories include a sets of rules to which an individual usage history description should comply. Descriptors are generally referred to as attributes of these descriptions. The use of a common set of description schemes and descriptors also enables interoperability; that is, different devices and systems are able to interpret usage histories that comply with the description schemes. At the same time, description schemes do not need to prescribe completely how an application should use the information embedded in the description, for instance, applications are free to process a usage history description in various ways to generate a user profile. In all these aspects, the proposed system is different from existing systems, due mainly to the way of describing program and usage history information, and to the fact that it provides an exchangeable representation for interoperability. Further, the program descriptions may generate usage histories that are rather rich in content and structure. Furthermore, many different types of information can be associated with individual user actions, thereby allowing different implementations to include, configure, and customize the usage history data according to their needs without sacrificing interoperability.

The present inventors determined that the system may include the concept of a "UserAction," which provides a compact yet generic and flexible representation mechanism for collecting usage history information. The list of UserAction types supported by the proposed system may be defined in terms of a thesaurus, and can thus be extended relatively easily. The thesaurus can include a diverse set of items and cover a multitude of different applications. Thus the system may track a diverse set of user activities such as retail purchases, requests for pay-per-programming, and the like. This approach provides a significance improvement over previously introduced methods which permit a very limited number of actions to be represented, and which cannot be easily extended to address various requirements.

The time information associated with each user action may be defined in terms of the general time, which denotes the time of occurrence in Coordinated Universal Time (UTC); media time, which denotes the time information that is encoded with a piece of multimedia content; or both. This functionality allows the time information that is associated with such actions as "fast forward" or "rewind" to be provided accurately.

The proposed framework facilitates the handling of a variety of multimedia content types, such as audio and video data, web pages, or content that is locally available to the consumer on his/her electronic equipment (e.g. a DVD player or Personal Video Recorder (PVR)). This functionality may be enabled by allowing any type of action and all major content categorization methods to be represented in the history.

The system likewise facilitates the referencing functionality to allow different information sources to be associated with a particular action. This aspect of the proposed system allows the reference to a specific part of relevant content descriptions (such as the description of a segment that the user reviews in slow motion). Furthermore, content material related to an action (such as the content of a hyperlink that the user follows; the web site of a product that the user purchases; the electronic program guide which provides a listing of the programs available for the given time period; etc.) can be explicitly specified by virtue of this property.

The system also allows usage history information to be captured at different levels of detail. For example, a usage history description can contain a detailed list of all the actions the user has performed over a period of time; or basic statistical information according to certain categorizations of content, such as language, country of origin, ratings, actors, etc.; or both. This flexibility enables even systems with limited resources (e.g. in terms of available storage space) to generate standardized, exchangeable usage histories.

The structure of the usage history description scheme may be such that the captured usage history information can be arranged and presented in multiple different ways, in whatever form is most useful and efficient for the application that makes use of the history. For example, the usage history can be organized according to the type of user action (e.g. all "record" actions), program genre (e.g. usage history for sports programs), or even specific programs (e.g. usage history for the program "Seinfeld.")

The design may respect a user's privacy by allowing a user to hide his/her identity from being revealed to third parties when the usage history is circulated or distributed.

The description scheme-XML based framework enables the usage history descriptions to co-exist with other description schemes (e.g., those that are included in MPEG-7, for example, Usage Preferences Description Schemes) in the very same framework. These description schemes allow functionalities to the user so that the user can consume the content in ways that fits to his/her preferences, e.g., by consuming programs that are requested on the basis of a recurring preferred theme in the usage history.

The collected usage history information may be personalized at multiple levels of granularity; i.e. it may be defined for multiple users (such as an entire family), or for a single user. This feature expedites many applications; for example, more detailed program rating information can be collected; parents can track their children's viewing habits and more easily control their access to objectionable content; the collected information can be used to generate more personalized programming; etc.

The system is preferably free from relying on explicit user input; rather, it preferably functions in the background and collects data without prompting the user to fill out questionnaires or to respond to questions, which are often considered intrusive by users.

While explicit user input about viewing habits are not required (as noted previously), the system may support a configuration layer or tool that the user can manipulate to define the types of activity and/or content information which he/she would not want the system to monitor or track. The configuration utility allows the user to provide the system with a list of activities approved for collection, which implies that the user has the ultimate control over the type and extent of the information collected.

Figure 52:
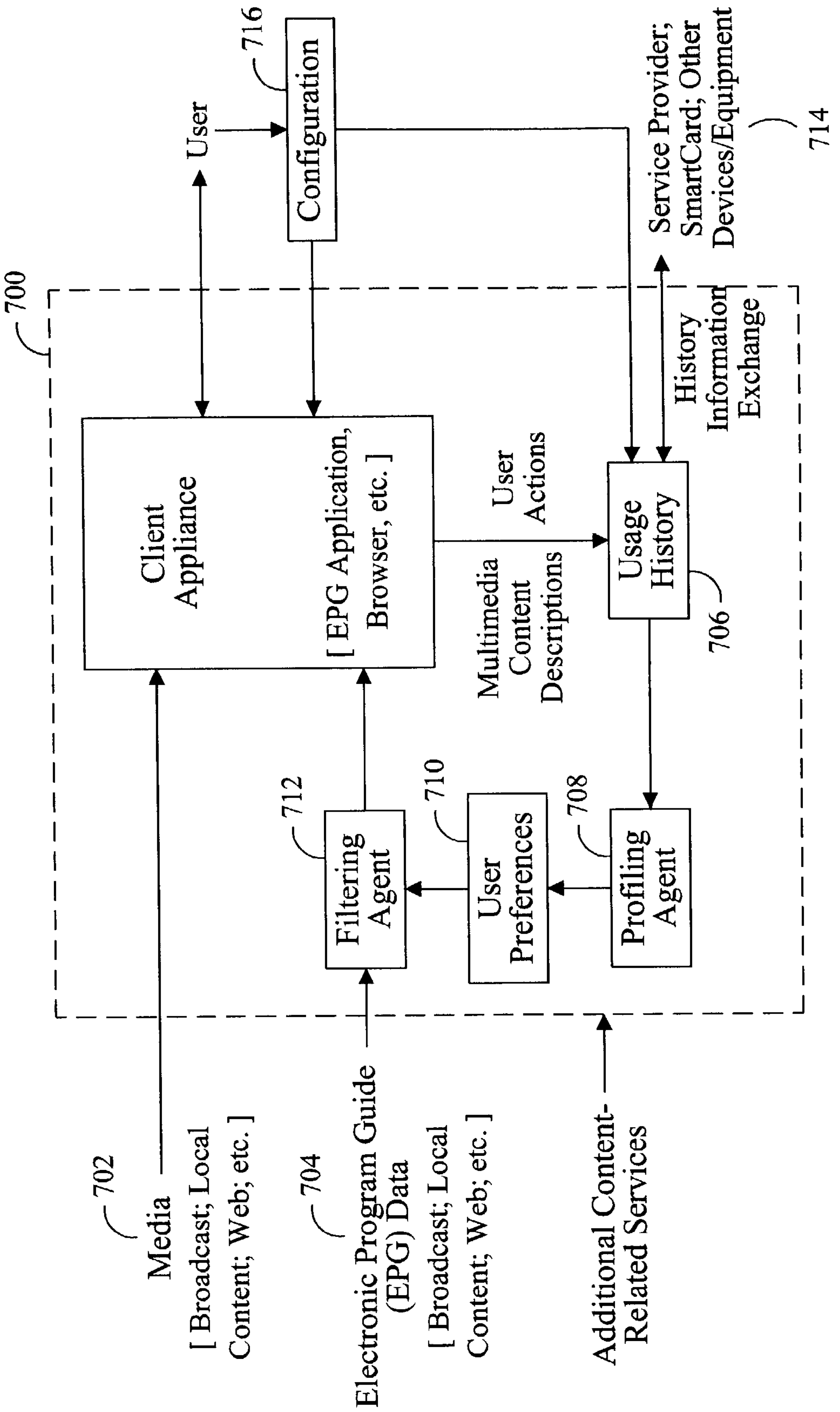
FIG. 52 is a system including user preferences.

The preferred context of the system is depicted in FIG. 52. The usage history process 700 has access to rich multimedia content descriptions, which may be available directly from broadcasters 702, electronic program guide providers 704, or other services or providers. These descriptions may contain meta data associated with the consumable media. A user's actions are monitored and linked to the content descriptions by the usage history module 706. The generated usage history information, typically from the usage history module 706, may be utilized by a local profiling agent 708 to generate user preferences 710, which may in turn be used by a filtering agent 712 to assist the viewer in making program selections. Alternatively, the usage history information may be exchanged with a service provider 714, or be transferred to other devices or equipment, where it can be processed in various ways. Since the usage history is preferably expressed in a standardized format, exchange of this information is expedited and carried out without the need for further translation or modification. Using the configuration utility 716 the user can control the types of activities and/or content that are monitored, and modify the settings of the usage history and/or client appliance settings 718. The configuration utility 716 enables the user to have control over the information collected about him/her.

Figure 53:
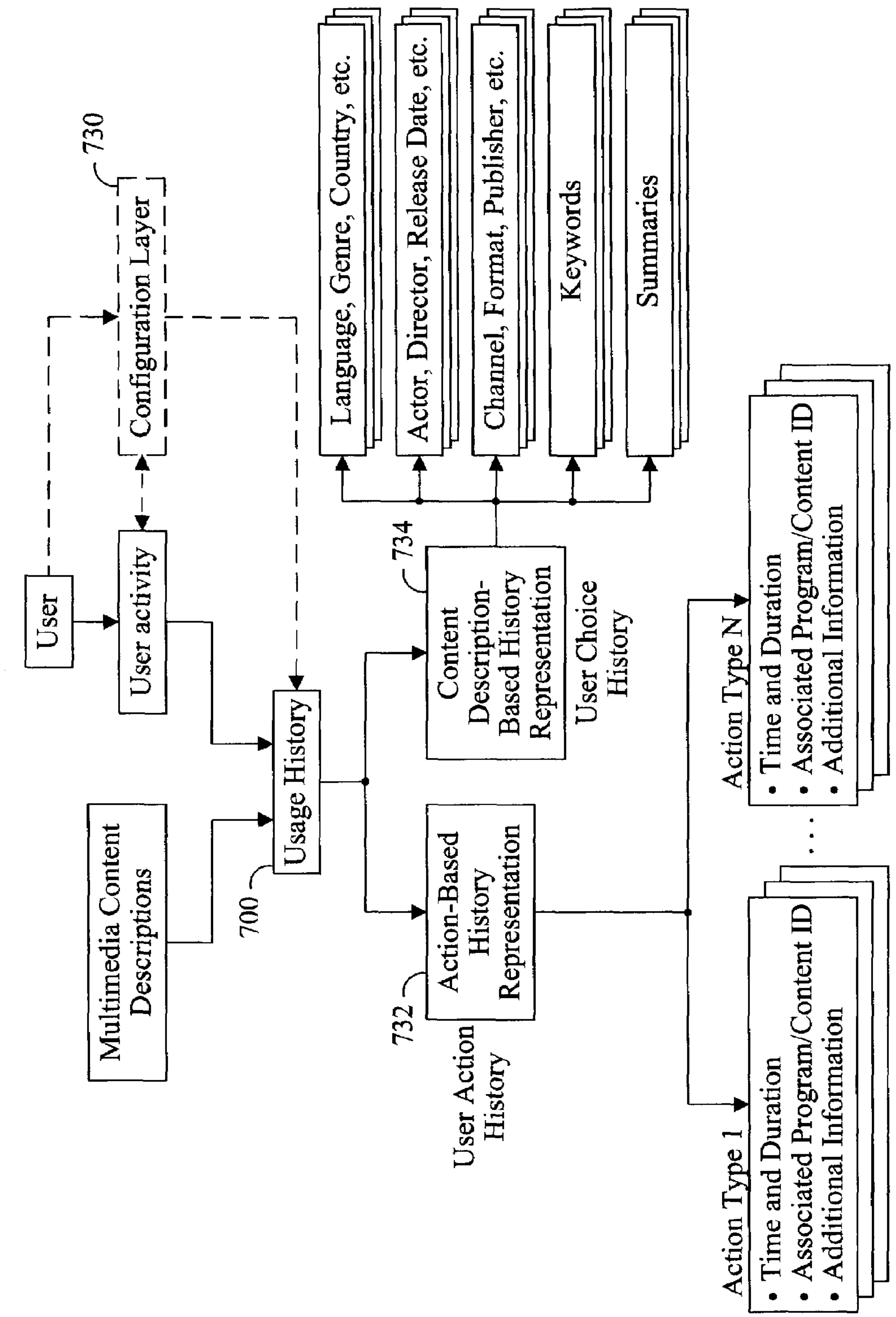
FIG. 53 illustrates usage history information.

Referring to FIG. 53, the preferred structure of the proposed system for collection and representation of usage history information is shown. The usage history process 700 has access to descriptions of the multimedia content that is consumed by the user. These content descriptions are typically generated by one or more commercial providers, and may be transmitted with, or separately from, the media content. The usage history process also may possess the ability to monitor the actions that the user performs on a variety of devices, such as A/V equipment, computer terminals, set-top boxes, personal digital recorders, and the like. The monitored actions can correspond to switching between channels; changing the audio/video settings of a device; recording a program; following a hyperlink; and so on. The set of actions monitored and logged by the usage history module is specified by the user through the configuration layer 730, which restricts the usage history module to collect information about authorized activities only. When approved user activity is detected, usage history process 700 records, for the given action, the time of occurrence; the duration (if applicable); the unique identification of the program or multimedia content that the action is associated with; and/or additional content description information, in the UserActionHistory component 732. Additionally, usage history information can be represented as a categorized table using the UserChoiceHistory component 734. To achieve this, the content descriptions may be analyzed, and a predefined subset of these descriptions are recorded, preferably in tabulated format. The number of times a program or multimedia content of certain type (e.g. movies of "Western" genre; films that star "Kevin Costner," etc.) is consumed by the user is tracked by the UserChoiceHistory 734, which acts as a collection of categorized counters. In general, the usage history 700 and the configuration layer 730 are typically processes, whereas the other items typically only contain data.

Figure 54:
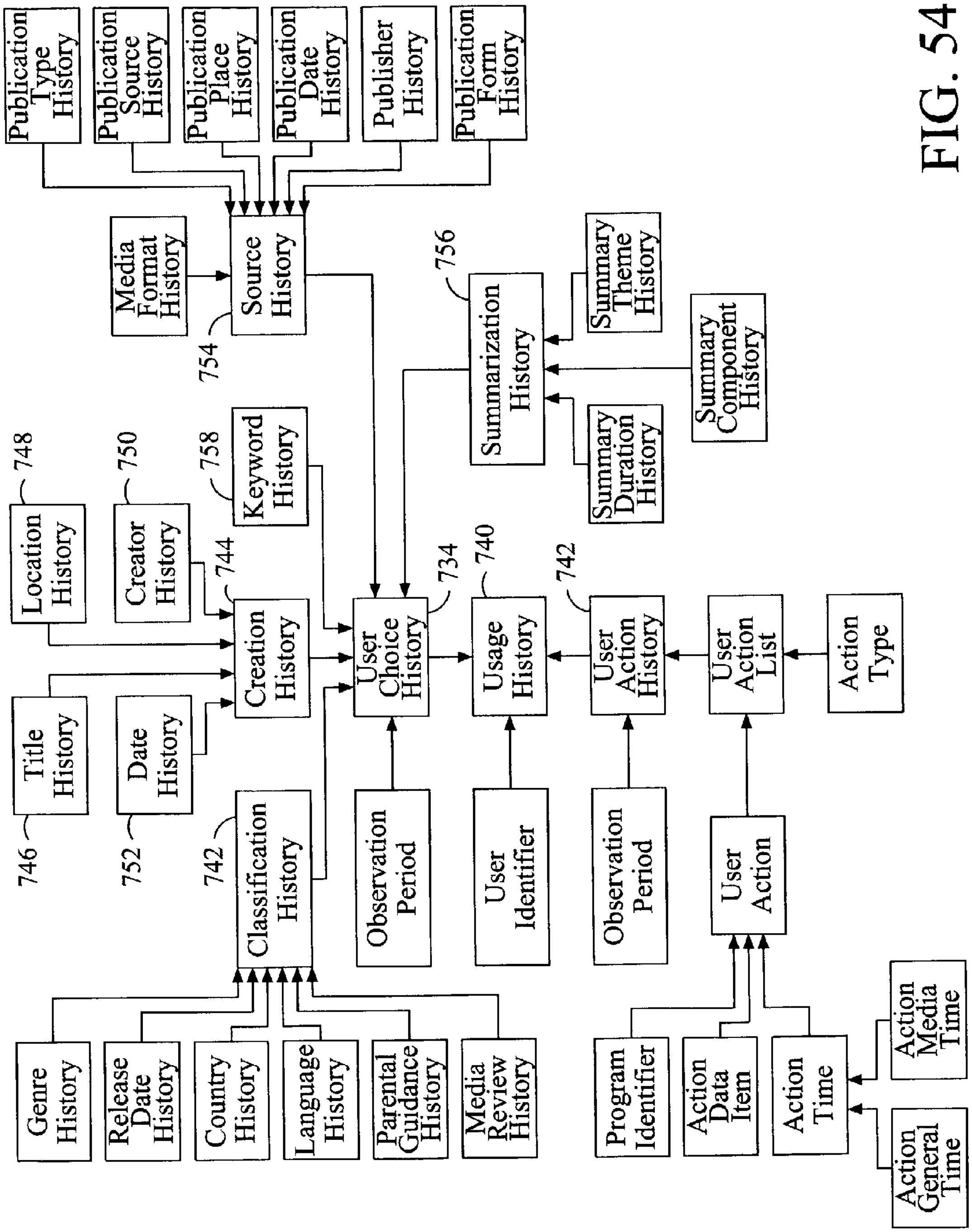
FIG. 54 illustrates description schemes.

Referring to FIG. 54, the description schemes may be arranged as follows:

(a) UsageHistory Description Scheme 740;
(b) UserActionHistory Description Scheme 732; and
(c) UserChoiceHistory Description Scheme 734.

The UsageHistory Description Scheme 740 serves as a container description scheme for the UserActionHistory Description Scheme 732 and the UserChoiceHistory Description Scheme 734, and describes the consumption history information for a given period of time. The UserActionHistory Description Scheme 732 contains a list of the different types of actions performed by the user during this period of time. The UserChoiceHistory Descriptino Scheme 734 contains the history of user choices with respect to the descriptions associated with the consumed content. FIG. 54 illustrates an entity-relationship diagram of the structure and interactions of these description schemes The UserActionHistory Description Scheme 732 contains multiple user action lists, each of which may provide a temporally ordered log of a specific type of action (such as "record" or "play"). Associated with every action are a program identifier that uniquely identifies the program or content for which the action is defined, and also one or more action data items, which can refer to any desired piece of the content description.

The UserChoiceHistory Description Scheme 734 provides a counter-like functionality for categorizing each content item based on its description data. The principal purpose of this component of the UsageHistory description scheme 740 is to provide an alternative history representation that specifies general statistical information about the consumed content. The statistical information may be constantly or periodically updated with the descriptions that accompany the content consumed by the user. This representation is especially useful for long observation periods, when the storage requirements for logging of all user actions and (if desired) associated meta data may become inhibiting for some systems. The UserChoiceHistory Description Scheme 734 may include multiple parts, such as for example, five different parts:

The Classification history 742, may provide a history of the user's choices with respect to classification descriptions of content; such as genre, language, and country of origin;

The Creation history 744, may provide a history of the user's choices with respect to creation descriptions of content, such as title 746, location 748, creator 750, date 752, and actor/director.

The Source history 754, may provide a history of the user's choices with respect to source (such as its publisher or distributor) and format (such as coding type) descriptions of the content.

The Summarization history 756, may provide the summarization-associated viewing/consumption history for a user.

The Keyword history 758, may provide a history of the keywords the user has used while viewing/consuming content.

The UserChoiceHistory Description Scheme 734 preferably shares a similar structure with UsagePreferences description scheme in MPEG-7 described in MPEG-7, ISO/IEC CD 15938-5 Information Technology—Multimedia Content Description Interface—Part 5 Multimedia Description Schemes, N3705, La Baule, France, October 2000, incorporated by reference herein. The principal motivation for the similarity is to simplify mapping of the available history information to the standardized user preference description. However, this similarity is not intended to constrain the set of applications for user choice history, since the information in the description is generic and flexible enough to be utilized in any way desirable. Moreover, the UserChoiceHistory may be structured in any suitable manner.

It should be understood that the UsageHistory Description Scheme 740 serves as a structure to link all the pieces of information together. Various scenarios in different application environments exist in which not all the various parts of the UsageHistory Description Scheme 740 are provided together in one description, but in other cases they may be. For example, in some cases only the UserActionHistory Description Scheme may be instantiated, or parts thereof, whereas in other only UserChoiceHistory Description Scheme might be utilized to describe the usage history, or parts thereof. Also, different descriptions may share description parts through the use of identifiers and identifier references. Different parts of the scheme proposed may exist in standalone descriptions.

SYNTAX EXAMPLES

Usage History Description Scheme Syntax and Semantics

```
<!-- ##################################################### -->
<!-- Definition of UsageHistory DS                   -->
<!-- ##################################################### -->

<element name="UsageHistory" type="mpeg7:UsageHistoryType"/>

<complexType name="UsageHistoryType">
        <complexContent>
```

```
        <extension base="mpeg7:DSType">
            <sequence minOccurs="0" maxOccurs="1">
                <element name="UserIdentifier"
                    type="mpeg7:UserIdentifierType"
                    minOccurs="0" maxOccurs="1"/>
                <element name="UserActionHistory"
                    type="mpeg7:UserActionHistoryType"
                    minOccurs="0" maxOccurs="unbounded"/>
                <element name="UserChoiceHistory"
                    type="mpeg7:UserChoiceHistoryType"
                    minOccurs="0" maxOccurs="unbounded"/>
            </sequence>
            <attribute name="allowCollection" type="boolean"
                use="default" value="true"/>
        </extension>
    </complexContent>
</complexType>
```

```
<!-- ##################################################### -->
<!-- Definition of UserActionHistory DS                   -->
<!-- ##################################################### -->

<element name="UserActionHistory" type="mpeg7:UserActionHistoryType"/>

<complexType name="UserActionHistoryType">
    <complexContent>
        <extension base="mpeg7:DSType">
            <sequence minOccurs="0" maxOccurs="1">
                <element name="ObservationPeriod"
                                        type="mpeg7:TimeType"
                    minOccurs="1" maxOccurs="unbounded"/>
                <element name="UserActionList"
                                    type="mpeg7:UserActionListType"
                    minOccurs="1" maxOccurs="unbounded"/>
            </sequence>
```

```
            <attribute name="protection" type="boolean"

                use="default" value="true"/>

        </extension>

    </complexContent>

</complexType>

<!-- ################################################## -->

<!-- Definition of UserActionList DS                -->

<!-- ################################################## -->

<element name="UserActionList" type="mpeg7:UserActionListType"/>

<complexType name="UserActionListType">

    <complexContent>

        <extension base="mpeg7:DSType">

            <sequence minOccurs="0" maxOccurs="1">

                <element name="ActionType"
```

```
                        type="mpeg7:ControlledTermType"
                    minOccurs="1" maxOccurs="1"/>
                <element name="UserAction"
                            type="mpeg7:UserActionType"
                    minOccurs="0" maxOccurs="unbounded"/>
            </sequence>
            <attribute name="numInstances" type="nonNegativeInteger"
                use="optional"/>
            <attribute name="totalDuration" type="mpeg7:durationType"
                use="optional"/>
        </extension>
    </complexContent>
</complexType>


<!-- ################################################## -->
<!-- Definition of UserAction DS                  -->
<!-- ################################################## -->
```

```
<element name="UserAction" type="mpeg7:UserActionType"/>



<complexType name="UserActionType">

        <complexContent>

                <extension base="mpeg7:DSType">

                        <sequence minOccurs="0" maxOccurs="1">

                                <element name="ActionTime" minOccurs="0"

                                                maxOccurs="1">

                                        <complexType>

                                                <sequence minOccurs="0"

maxOccurs="1">

                                                        <element

name="ActionMediaTime"

                                                        type="mpeg7:MediaTimeType"

                                                                minOccurs="0"

                                                                        maxOccurs="1"/>

                                                        <element
```

```
             name="ActionGeneralTime"
                                          type="mpeg7:TimeType"
                                          minOccurs="0"
                                                       maxOccurs="1"/>
                       </sequence>
                    </complexType>
                 </element>
                 <element name="ProgramIdentifier"
                                          type="mpeg7:UniqueIDType"
                              minOccurs="1" maxOccurs="1"/>
                 <element name="ActionDataItem"
                                          type="mpeg7:ReferenceType"
                              minOccurs="0" maxOccurs="unbounded"/>
              </sequence>
           </extension>
        </complexContent>
```

```
</complexType>

<!-- ################################################### -->
<!-- Definition of UserChoiceHistory DS -->
<!-- ################################################### -->

<element name="UserChoiceHistory" type="mpeg7:UserChoiceHistoryType"/>

<complexType name="UserChoiceHistoryType">
    <complexContent>
        <extension base="mpeg7:DSType">
    <sequence minOccurs="1" maxOccurs="1">
        <element name="ObservationPeriod" type="mpeg7:TimeType"
        minOccurs="1" maxOccurs="unbounded"/>
          <element name="ClassificationHistory"
            type="mpeg7:ClassificationHistoryType"
        minOccurs="0" maxOccurs="1"/>
```

```
<element name="CreationHistory" type="mpeg7:CreationHistoryType"
minOccurs="0" maxOccurs="1"/>
<element name="SourceHistory" type="mpeg7:SourceHistoryType"
minOccurs="0" maxOccurs="1"/>
<element name="SummarizationHistory"
type="mpeg7:SummarizationHistoryType"
minOccurs="0" maxOccurs="1"/>
<element name="KeywordHistory"
type="mpeg7:KeywordHistoryType"
minOccurs="0" maxOccurs="1"/>
</sequence>
<attribute name="numTotalInstances" type="nonNegativeInteger"/>
<attribute name="protection" type="boolean" use="default"
value="true"/>
</extension>
</complexContent>
</complexType>
```

```
<!-- ################################################## -->
<!--      Definition of ClassificationHistory DS     -->
<!-- ################################################## -->

<complexType name="ClassificationHistoryType">
     <complexContent>
          <extension base="mpeg7:DSType">
          <sequence minOccurs="1" maxOccurs="1">
               <element name="CountryHistory" minOccurs="0"
     maxOccurs="unbounded">
                    <complexType>
               <extension base="mpeg7:ISO3166-1CountryCode">
                 <attribute name="numInstances" type="nonNegativeInteger"/>
                  <attribute name="totalDuration" type="mpeg7:durationType"/>
                         <attribute name="id" type="ID"/>
                    </extension>
               </complexType>
```

```
</element>
<element name="ReleaseDateHistory" minOccurs="0"
maxOccurs="unbounded">
        <complexType>
    <extension base="mpeg7:TimeType">
        <attribute name="numInstances" type="nonNegativeInteger"/>
          <attribute name="totalDuration" type="mpeg7:durationType"/>
                        <attribute name="id" type="ID"/>
                  </extension>
          </complexType>
 </element>
 <element name="LanguageHistory" minOccurs="0"
 maxOccurs="unbounded">
          <complexType>
     <extension base="LanguageType">
          <attribute name="numInstances" type="nonNegativeInteger"/>
          <attribute name="totalDuration" type="mpeg7:durationType"/>
```

```xml
            <attribute name="id" type="ID"/>

          </extension>

        </complexType>

      </element>

      <element name="GenreHistory" minOccurs="0" maxOccurs="unbounded">

        <complexType>

          <extension base="mpeg7:GenreType" >

            <attribute name="numInstances" type="nonNegativeInteger"/>

            <attribute name="totalDuration" type="mpeg7:durationType"/>

            <attribute name="id" type="ID"/>

          </extension>

        </complexType>

      </element>

      <element name="MediaReviewHistory" minOccurs="0" maxOccurs="unbounded">

        <complexType>
```

```
<sequence minOccurs="1" maxOccurs="1">
    <element name="Reviewer"
            type="mpeg7:PersonType"/>
    <element name="RatingCriterion">
        <complexType>
            <sequence minOccurs="1"
                maxOccurs="1">
                <element
                name="CriterionName"
        type="mpeg7:TextualType"/>
                <element
                name="WorstRating"
                    type="integer"/>
                <element
name="BestRating"
                    type="integer"/>
            </sequence>
```

```
</complexType>
</element>
<element name="RatingValue"
        maxOccurs="unbounded">
    <complexType>
        <simpleContent>
<extension base="integer">
    <attribute name="numInstances"
        type="nonNegativeInteger"/>
    <attribute name="totalDuration"
        type="mpeg7:durationType"/>
            </extension>
        </simpleContent>
    </complexType>
</element>
</sequence>
<attribute name="numInstances" type="nonNegativeInteger"/>
```

```
<attribute name="totalDuration" type="mpeg7:durationType"/>
<attribute name="id" type="ID"/>
</complexType>
</element>
<element name="ParentalGuidanceHistory" minOccurs="0"
maxOccurs="unbounded">
<complexType>
<extension base="mpeg7:ParentalGuidanceType">
<attribute name="numInstances" type="nonNegativeInteger"/>
<attribute name="totalDuration" type="mpeg7:durationType"/>
<attribute name="id" type="ID"/>
</extension>
</complexType>
</element>
</sequence>
<attribute name="numTotalInstances" type="nonNegativeInteger"/>
</extension>
```

```
   </complexContent>
</complexType>

<!-- ################################################## -->
<!--                Definition of CreationHistory DS        -->
<!-- ################################################## -->

<complexType name="CreationHistoryType">
        <complexContent>
                <extension base="mpeg7:DSType">
        <sequence minOccurs="1" maxOccurs="1">
                <element name="TitleHistory" minOccurs="0"
                                                maxOccurs="unbounded">
                        <complexType>
                   <extension base="mpeg7:TitleType">
                        <attribute name="numInstances" type="nonNegativeInteger"/>
                        <attribute name="totalDuration" type="mpeg7:durationType"/>
```

```
                <attribute name="id" type="ID"/>
            </extension>
        </complexType>
    </element>
    <element name="CreatorHistory" minOccurs="0"
maxOccurs="unbounded">
        <complexType>
          <extension base="mpeg7:CreatorType">
            <attribute name="numInstances"
                            type="nonNegativeInteger"/>
            <attribute name="totalDuration"
                            type="mpeg7:durationType"/>
                <attribute name="id" type="ID"/>
            </extension>
        </complexType>
    </element>
```

```
<element name="LocationHistory" minOccurs="0"
maxOccurs="unbounded">
    <complexType>
<extension base="mpeg7:PlaceType">
        <attribute name="numInstances"
type="nonNegativeInteger"/>
        <attribute name="totalDuration"
type="mpeg7:durationType"/>
        </extension>
    </complexType>
</element>
<element name="DateHistory" minOccurs="0"
maxOccurs="unbounded">
    <complexType>
  <extension base="mpeg7:TimeType">
        <attribute name="numInstances"
                type="nonNegativeInteger"/>
```

```
                        <attribute name="totalDuration"
                                    type="mpeg7:durationType"/>
                            <attribute name="id" type="ID"/>
                        </extension>
                    </complexType>
                </element>
            </sequence>
            <attribute name="numTotalInstances" type="nonNegativeInteger"/>
        </extension>
    </complexContent>
</complexType>


<!-- ################################################## -->
<!--    Definition of SourceHistory DS          -->
<!-- ################################################## -->


<complexType name="SourceHistoryType">
```

```
<complexContent>

    <extension base="mpeg7:DSType">

<sequence minOccurs="1" maxOccurs="1">

    <element name="PublicationTypeHistory" minOccurs="0"

    maxOccurs="unbounded">

        <complexType>

            <extension base="mpeg7:ControlledTermType">

                <attribute name="numInstances" type="nonNegativeInteger"/>

                <attribute name="totalDuration" type="mpeg7:durationType"/>

                    <attribute name="id" type="ID"/>

                </extension>

            </complexType>

    </element>

    <element name="PublicationSourceHistory" minOccurs="0"

    maxOccurs="unbounded">

        <complexType>

            <simpleContent>
```

```
        <extension base="string">

            <attribute name="numInstances"

                        type="nonNegativeInteger"/>

            <attribute name="totalDuration" type="mpeg7:durationType"/>

                        <attribute name="id" type="ID"/>

            </extension>

        </simpleContent>

    </complexType>

</element>

<element name="PublicationPlaceHistory" minOccurs="0"

maxOccurs="unbounded">

    <complexType>

  <extension base="mpeg7:PlaceType">

        <attribute name="numInstances" type="nonNegativeInteger"/>

        <attribute name="totalDuration" type="mpeg7:durationType"/>

            </extension>

    </complexType>
```

```
</element>

<element name="PublicationDateHistory" minOccurs="0"
maxOccurs="unbounded">

    <complexType>

  <extension base="mpeg7:TimeType">

        <attribute name="numInstances" type="nonNegativeInteger"/>

        <attribute name="totalDuration" type="mpeg7:durationType"/>

            <attribute name="id" type="ID"/>

        </extension>

    </complexType>

</element>

<element name="PublisherHistory" minOccurs="0"
maxOccurs="unbounded">

    <complexType>

  <extension base="mpeg7:AgentType">

        <attribute name="numInstances" type="nonNegativeInteger"/>

        <attribute name="totalDuration" type="mpeg7:durationType"/>
```

```
        </extension>
</complexType>
</element>
<element name="PublicationFormHistory" minOccurs="0"
maxOccurs="unbounded">
<complexType>
    <attribute name="formType">
        <simpleType>
            <restriction base="string">
                <enumeration value="payPerView"/>
                <enumeration value="payPerUse"/>
                <enumeration value="live"/>
                <enumeration value="repeat"/>
            </restriction>
        </simpleType>
    </attribute>
  <attribute name="numInstances" type="nonNegativeInteger"/>
```

```
                <attribute name="totalDuration"
type="mpeg7:durationType"/>
                <attribute name="id" type="ID"/>
        </complexType>
        </element>
        <element name="MediaFormatHistory" minOccurs="0"
        maxOccurs="unbounded">
            <sequence minOccurs="1" maxOccurs="1">
                <choice minOccurs="1" maxOccurs="1">
            <element name="FileFormat"
                type="mpeg7:ControlledTermType"/>
            <element name="Medium"
type="mpeg7:ControlledTermType"/>
            <element name="System" type="mpeg7:ControlledTermType"/>
                <element name="VisualCodingFormat"
             type="mpeg7:ControlledTermType"/>
            <element name="AspectRatio"
```

```
                type="mpeg7:ControlledTermType"/>
            <element name="Color" type="mpeg7:ControlledTermType"/>
                <element name="AudioCodingFormat"

          type="mpeg7:ControlledTermType"/>
                    <element name="AudioPresentation"
          type="mpeg7:ControlledTermType"/>
                </choice>
            </sequence>
        <attribute name="numInstances" type="nonNegativeInteger"/>
        <attribute name="totalDuration" type="mpeg7:durationType"/>
            <attribute name="id" type="ID"/>
        </element>
    </sequence>
    <attribute name="numTotalInstances" type="nonNegativeInteger"/>
   </extension>
</complexContent>
```

```
</complexType>
<complexType name="KeywordHistoryType">
  <complexContent>
    <extension base="mpeg7:DSType">
      <sequence minOccurs="1" maxOccurs="1">
        <element name="KeywordItem" minOccurs="0"
        maxOccurs="unbounded">
          <complexType>
            <extension base="mpeg7:KeywordAnnotationType">
              <attribute name="numInstances" type="nonNegativeInteger"/>
              <attribute name="totalDuration" type="mpeg7:durationType"/>
                      <attribute name="id" type="ID"/>
                  </extension>
              </complexType>
          </element>
      </sequence>
      <attribute name="numTotalInstances" type="nonNegativeInteger"/>
```

```
    </extension>
  </complexContent>
</complexType>


<!-- ################################################ -->
<!--   Definition of SummarizationHistory DS   -->
<!-- ################################################ -->


<complexType name="SummarizationHistoryType">
    <complexContent>
        <extension base="mpeg7:DSType">
    <sequence minOccurs="1" maxOccurs="1">
        <element name="SummaryComponentHistory" minOccurs="0"
        maxOccurs="unbounded">
            <complexType>
          <extension base="mpeg7:SummaryComponentType">
            <attribute name="numInstances" type="nonNegativeInteger"/>
```

```
        <attribute name="totalDuration" type="mpeg7:durationType"/>
                    <attribute name="id" type="ID"/>
                </extension>
        </complexType>
</element>
<element name="SummaryThemeHistory" minOccurs="0"
maxOccurs="unbounded">
        <complexType>
    <extension base="mpeg7:TextualType">
      <attribute name="numTotalInstances"
    type="nonNegativeInteger"/>
        <attribute name="protection" type="boolean" use="default"/>
                    <attribute name="id" type="ID"/>
                </extension>
        </complexType>
</element>
<element name="SummaryDurationHistory" minOccurs="0"
```

```
maxOccurs="unbounded">
        <complexType>
                <sequence minOccurs="1" maxOccurs="1">
        <element name="MinNumSummaryFrames"
                        type="nonNegativeInteger"
          minOccurs="0" maxOccurs="1"/>
        <element name="MinSummaryDuration"
                        type="mpeg7:durationType"
          minOccurs="0" maxOccurs="1"/>
        <element name="MaxNumSummaryFrames"
                        type="nonNegativeInteger"
          minOccurs="0" maxOccurs="1"/>
        <element name="MaxSummaryDuration"
                        type="mpeg7:durationType"
          minOccurs="0" maxOccurs="1"/>
        <element name="AvgNumSummaryFrames"
                        type="nonNegativeInteger"
```

```
            minOccurs="0" maxOccurs="1"/>
          <element name="AvgSummaryDuration"
                    type="mpeg7:durationType"
            minOccurs="0" maxOccurs="1"/>
              </sequence>
              <attribute name="id" type="ID"/>
          </complexType>
        </element>
      </sequence>
      <attribute name="numTotalInstances" type="nonNegativeInteger"/>
    </extension>
  </complexContent>
</complexType>
```

Description Scheme Semantics

| Name | Definition |
|---|---|
| | UsageHistory DS Semantics |
| UsageHistoryType | Specifies user's multimedia content consumption history. |
| UserIdentifier | Identifies the individual for whom the usage history is provided specifies. This element is of type UserIdentifierType, which is described as part of UserPreferences DS, and contains the protected attribute. Thus the identity of the user is not disclosed unless this attribute is set to false. |
| UserActionHistory | Describes history of the actions the user has carried out during the observation period. See below for the specification of UserActionHistoryType. |
| UserChoiceHistory | Describes a categorized listing of the set of choices the user has made while consuming content. See below for the specification of UserChoiceHistoryType. |
| AllowCollection | This attribute specifies whether the user allows his/her usage history data to be collected. The default value for allowCollection attribute is true. |
| | UserActionHistory DS Semantics |
| UserActionHistoryType | Specifies a history of the actions carried out by the user. |
| ObservationPeriod | Describes the time period(s) during which the associated history items have been recorded. Multiple instance of ObservationPeriod can be used to represent discontinuous time periods |
| UserActionList | Describes a list of actions of the same type, i.e. all actions in the UserActionList carry the same ActionType value. See below for the specification of UserActionListType. |
| protection | This attribute specifies whether the given UserActionHistory information is to be protected from 3rd parties, or disclosed freely. |
| | UserActionList DS Semantics |
| UserActionListType | Specifies a list of user actions, with associated semantics. |
| ActionType | Denotes the specific action performed by the user, such as "View," "Pause," "Play," etc. Defined as ControlledTermType to provide extensibility for different actions. All actions in an ActionList have the same ActionType. A list (dictionary) of possible values of ActionTypeis shown below. |
| UserAction | Characterizes a specific user action in the list. Each action is associated with a single program. See the specification of UserActionType shown below for more detail. |
| numInstances | Specifies the number of UserAction elements in a UserActionList. (e.g. 21 "Record" actions; 5 "View" actions; etc.). |
| totalDuration | he total time spent by the user during the observation period performing a specific action (e.g. 32 min for "Record" action). |

A list of actions that define an exemplary set of values for ActionType elements is shown. Each term has a numeric identifier, listed in the first column, and a textual label, listed in the second column. A description of each term is listed in the third column. This is one example of a thesaurus for ActionType of usage history.

| Term | Label | Description |
|---|---|---|
| 1 | Audio-Video | Actions Related to Audio and Video |
| 1.1 | PlayRecording | Play content from a recording |
| 1.2 | PlayStream | Play content from input stream |
| 1.3 | Record | Record input stream to local storage media |
| 1.4 | Preview | View or listen to a summary of the input stream |
| 1.5 | Pause | Pause the input stream |
| 1.6 | FastForward | Fast forward the input stream |
| 1.7 | Rewind | Rewind the input stream |
| 1.8 | SkipForward | Skip forward over a portion of the input stream |
| 1.9 | SkipBackward | Skip backward over a portion of the input stream |
| 1.10 | Mute | Turn sound off |
| 1.11 | VolumeUp | Increase volume |

-continued

| Term | Label | Description |
|---|---|---|
| 1.12 | VolumeDown | Reduce volume |
| 1.13 | Loop/Repeat | Repeat/loop (part of) the input stream |
| 1.14 | Shuffle | Randomly select next track |
| 1.15 | SkipToEnd | Go to the beginning of the stream |
| 1.16 | SkipToStart | Go to the end of the stream |
| 1.17 | CopyCD | Copy all or part of a CD |
| 2 | Video | Actions Related to Video |
| 2.1 | Zoom | Zoom (in) to the on-screen image or sequence |
| 2.2 | SlowMotion | View input stream in slow motion |
| 2.3 | CCOn | Closed caption is on |
| 2.4 | StepForward | Advance to next frame |
| 2.5 | StepBackward | Return to previous frame |
| 3 | Data | Actions Related to Miscellaneous Data |
| 3.1 | ClickThrough | Follow an available link |
| 3.2 | ScrollUp | Scroll up in a web page/composite page |
| 3.3 | ScrollDown | Scroll down in a web page/composite page |
| 3.4 | ViewGuide | View program/resource guide |
| 3.5 | SavePage | Save web page/composite page |
| 3.6 | PrintPage | Print web page/composite page |
| 3.7 | Search | Search the web or local resources |
| 3.8 | SubmitForm | Submit a form with requested information |
| 3.9 | SubmitQuery | Submit a query |
| 3.10 | Archive | Archive content to persistent local storage media |
| 4 | Commerce | Actions Related to Commerce |
| 4.1 | Buy | Purchase a product or item |
| 4.2 | AddToWishList | Designate a product or item as possible future purchasing item |
| 4.3 | AddToCart | Designate a product or item as potential immediate purchase item |

| Name | Definition |
|---|---|
| | UserAction DS Semantics |
| UserActionType | Specifies a detailed description of an action, with associated semantic. |
| ActionTime | Specifies the time that the action took place and, if applicable, its duration (e.g. for "Play," "Pause," etc.). The time of occurrence of the action can be described in two ways: by ActionMediaTime and/or by ActionGeneralTime. The duration of a UserAction refers to the duration in terms of the media time, which is identical to the duration in UTC for a large number of action types, but may be different for such action types as "Repeat" or "FastForward." |
| ActionMediaTime | Action time relative to the time reference established for the given media. This time referencing method is useful for such action items as "Repeat" or "FastForward," and for manipulating content on the user's local system (such as personal CDs or DVDs). |
| ActionGeneralTime | Action time relative to Coordinated Universal Time (UTC) in the Gregorian date/time format. |
| ProgramIdentifier | Unique identifier of the program that is associated with the given action. Each Action is associated with a single program and, consequently, a single ProgramIdentifier. |
| ActionDataItem | Refers to a specific part of the description of the AV content, or to other material related to the action (e.g. the URL the user chooses to follow in an enhanced TV application). Shall refer to an id attribute of an AV content description instance. |
| | UserAction DS Semantics |
| UserActionType | Specifies a detailed description of an action, with associated semantics. |
| ActionTime | Specifies the time that the action took place and, if applicable, its duration (e.g. for "Play," "Pause," etc.). The time of occurrence of the action can be described in two ways: by ActionMediaTime and/or by ActionGeneralTime. The duration of a UserAction refers to the duration in terms of the media time, which is identical to the duration in UTC for a large number of action types, but may be different for such action types as "Repeat" or "FastForward." |
| ActionMediaTime | Action time relative to the time reference established for the given media. This time referencing method is useful for |

-continued

| Name | Definition |
| --- | --- |
| | such action items as "Repeat" or "FastForward," and for manipulating content on the user's local system (such as personal CDs or DVDs). |
| ActionGeneralTime | Action time relative to Coordinated Universal Time (UTC) in the Gregorian date/time format. |
| ProgramIdentifier | Unique identifier of the program that is associated with the given action. Each Action is associated with a single program and, consequently, a single ProgramIdentifier. |
| ActionDataItem | Refers to a specific part of the description of the AV content, or to other material related to the action (e.g. the URL the user chooses to follow in an enhanced TV application). Shall refer to an id attribute of an AV content description instance. |
| | UserChoiceHistory DS Semantics |
| UserChoiceHistoryType | Specifies a categorized listing of the set of choices the user has made while consuming content. |
| ObservationPeriod | Describes the time period(s) during which the associated history items have been recorded. Multiple instance of ObservationPeriod can be used to represent discontinuous time periods. |
| ClassificationHistory | Describes history of the user's choices with respect to classification descriptions of content. |
| CreationHistory | Describes history of the user's choices with respect to creation descriptions of content. |
| SourceHistory | Describes history of the user's choices with respect to source descriptions of the content, such as its publisher or distributor. |
| KeywordHistory | Describes history of the keywords the user has used while viewing/consuming content. |
| SummarizationHistory | Describes history of the media summaries the user has consumed during the observation period. |
| numTotalInstance | Total number of content items/descriptions considered in UserChoiceHistory |
| protection | This attribute specifies whether the given UserChoiceHistory information is to be protected from 3rd parties, or disclosed freely |
| | ClassificationHistory DS Semantics |
| ClassificationHistory-Type | Specifies history of the user's choices with respect to classification descriptions of content. |
| CountryHistory | Describes usage history with respect to country of origin of the content. The attributes numInstances and totalDuration specify usage statistics for a specific country instance. |
| ReleaseDateHistory | Describes usage history with respect to date of release of the content. The attributes numInstances and totalDuration specify usage statistics for a specific release date instance. |
| LanguageHistory | Describes usage history with respect to language of the content. The attributes numInstances and totalDuration specify usage statistics for a specific language instance. |
| GenreHistory | Describes usage history with respect to genre of the content. The attributes numInstances and totalDuration specify usage statistics for a specific genre instance. |
| SubjectHistory | Describes usage history with respect to subject of the content. The subject classifies content from a point of view of types of program, without considering genre classification. The attributes numInstances and totalDuration specify usage statistics for a specific subject instance. |
| MediaReviewHistoryType | A data type for description of usage history with respect to reviews of the content, with associated semantics:<br>Reviewer: Reviewers/critics of the content.<br>RatingCriterion: The rating criterion used in the review. RatingCriterion includes CriterionName and the rating scale (form WorstRating to BestRating<br>RatingValue: The rating value assigned to the content.<br>numInstances/totalDuration —Describe the usage statistics associated with the given Rating Value.<br>numInstances/totalDuration: Describe the usage statistics associated with the given MediaReviewHistory.<br>id: ID of the MediaReviewHistory instance. |
| ParentalGuidance-History | Describes user history with respect to parental guidance ratings of the content. The attributes numInstances and totalDuration specify usage statistics for a specific parental guidance instance. |
| numTotalInstances | Total number of content items for which ClassificationHistory information has been generated. |

-continued

| Name | Definition |
|---|---|
| | SourceHistory DS Semantics |
| SourceHistoryType | Specifies history of the user's choices with respect to source (such as its publisher or distributor) and format (such as coding type) descriptions of the content. |
| PublicationTypeHistory | Describes usage history with respect to publication medium of content, such as satellite broadcast, CD, etc. The attributes numInstances and totalDuration specify usage statistics for a specific publication type instance. |
| PublicationSource-History | Describes usage history with respect to publication source of the content, such as broadcast channels. The attributes numInstances and totalDuration specify usage statistics for a specific publication channel instance. |
| PublicationPlace-History | Describes usage history with respect to the place content is distributed from. The attributes numInstances and totalDuration specify usage statistics for a specific publication place instance. |
| PublicationDateHistory | Describes usage history with respect to time/date of content distribution. The attributes numInstances and totalDuration specify usage statistics for a specific publication date instance. |
| PublisherHistory | Describes usage history with respect to publisher or distributor of content. The attributes numInstances and totalDuration specify usage statistics for a specific publisher instance. |
| PublicationFormHistory | Describes usage history with respect to the form in which content in available. The attributes numInstances and totalDuration specify usage statistics for a specific publication form instance. |
| MediaFormatHistory | Describes usage history with respect to format of the content. The format specifiers considered are file format; content medium; system; video and audio coding format; aspect ratio; color appearance; and audio presentation. The attributes numInstances and totalDuration specify usage statistics for a specific media format instance. |
| numTotalInstances | Total number of content items for which SourceHistory information has been generated. |
| | KeywordHistory DS Semantics |
| KeywordHistoryType | Specifies history of the keywords the user has used while viewing/consuming content. |
| KeywordItem | Describes a specific keyword instance, and the statistical information associated with it (through numInstances and totalDuration attributes |
| numTotalInstances | Total number of content items for which KeywordHistory information has been generated |
| | SummarizationHistory DS Semantics |
| SummarizationHistory-Type | Specifies summarization-associated viewing/consumption history for a user. |
| SummaryComponent-History | Describes the list of summary components consumed by the user (such as keyFrames, keyVideoClips, etc.) and the statistics associated with each, as defined by. |
| SummaryThemeHistory | Describes the list of textual themes associated with the summaries consumed by the user, as well as the statistics for each theme, as defined by the attributes numInstances and totalDuration. |
| SummaryDurationHistory | Describes the duration information for the summaries consumed by the user. The associated elements of this complex type are: |
| MinNumSummaryFrames | Size of the shortest/smallest key frame-based summary consumed by the user (stated in number of frames). |
| MinSummaryDuration | Temporal duration of the shortest summary consumed by the user. |
| MaxNumSummaryFrames | Size of the longest/largest key frame-based summary consumed by the user (stated in number of frames) |
| MaxSummaryDuration | Temporal duration of the longest summary consumed by the user. |
| AvgNumSummaryFrames | Average size of the key frame-based summaries consumed by the user (stated in number of frames). |
| AvgSummaryDuration | Average temporal duration of the summaries consumed by the user. |
| numTotalInstances | Total number of content items for which SummzarizationHistory information has been generated. |

The following example highlights instantiations of the various UsageHistory description schemes. The example contains UserActionHistory and UserChoiceHistory information collected for 12 hours over two days.

The example illustrates how the functionality provided by the ActionMediaTime and ActionGeneralTime elements are different for some user actions such as "Rewind," "FastForward" and "SlowMotion." For example, as shown in the example, a "FastForward" action that lasts only a few seconds in terms of general time may actually correspond to several minutes in terms of the media time base. Relying only on the general time to represent the time of occurrence and duration of an action may lead to inconsistencies and ambiguity. Thus the proposed syntax supports representation of ActionTime in terms of both media time and general time.

```
<UsageHistory id="usage-history-001" allowCollection="true">
  <UserIdentifier protected="true"
    <UserName xml:lang="en">John Doe</UserName>
      </UserIdentifier>
      <UserActionHistory id="useraction-history-001" protection="false">
      <ObservationPeriod>
        <TimePoint>2000-10-09T18:00-08:00</TimePoint>
```

```
        <Duration>PT6H</Duration>
</ObservationPeriod>
<ObservationPeriod>
        <TimePoint>2000-10-10T18:00-08:00</TimePoint>
        <Duration>PT6H</Duration>
</ObservationPeriod>
<UserActionList id="ua-list-001"
        numInstances="2" totalDuration="P2H30M">
        <ActionType><Label>Record</Label></ActionType>
        <UserAction> ... </UserAction>
        <UserAction> ... </UserAction>
</UserActionList>
<UserActionList id="ua-list-002"
        numInstances="25" totalDuration="P7H02M">
        <ActionType><Label>View</Label></ActionType>
        <UserAction>
                <ProgramIdentifier>
```

<IDOrganization>
<FreeTerm>AnIDOrg</FreeTerm>
</IDOrganization>
<IDName>
<FreeTerm>AnIDName</FreeTerm>
</IDName>
<UniqueID>02-mnf-100900</UniqueID>
</ProgramIdentifier>
</UserAction>
<UserAction>
<ProgramIdentifier>
<IDOrganization>
<FreeTerm>AnIDOrg</FreeTerm>
</IDOrganization>
<IDName>
<FreeTerm>AnIDName</FreeTerm>
</IDName>

<UniqueID>02-mnf-100900</UniqueID>

</ProgramIdentifier>

<ActionDataItem>

<href> www.abc.com/content/mnf/100900/mnf-stream.xml#segment_145

</href>

</ActionDataItem>

</UserAction>

. . .

</UserActionList>

<UserActionList id="ual-003"

numInstances="3" totalDuration="PT4M10S">

<ActionType><Label>FastForward</Label></ActionType>

<UserAction>

<ActionTime>

<ActionMediaTime>

<MediaTimePoint>2000-10-
09T19:10:12</MediaTimePoint>
<MediaDuration>PT1M45S</MediaDuration>
</ActionMediaTime>
<ActionGeneralTime>
<TimePoint>2000-10-09T19:10:12-08:00</TimePoint>
<Duration>PT8S</Duration>
</ActionGeneralTime>
</ActionTime>
<ProgramIdentifier>
<IDOrganization>
<FreeTerm>AnIDOrg</FreeTerm>
</IDOrganization>
<IDName>
<FreeTerm>AnIDName</FreeTerm>
</IDName>
<UniqueID>02-mnf-100900<UniqueID>

</ProgramIdentifier>
<ActionDataItem>
<href>
www.abc.com/content/mnf/100900/mnf-stream.xml#comm_break_17
</href>
</ActionDataItem>
</UserAction>
<UserAction>
<ActionTime>
<ActionMediaTime>
<MediaTimePoint>2000-10-
10T18:16:08</MediaTimePoint>
<MediaDuration>PT1M35S</MediaDuration>
</ActionMediaTime>
<ActionGeneralTime>
<TimePoint>2000-10-10T18:16:08-08:00</TimePoint>
<Duration>PT7S</Duration>

</ActionGeneralTime>
</ActionTime>
<ProgramIdentifier>
<IDOrganization>
<FreeTerm>AnIDOrg</FreeTerm>
</IDOrganization>
<IDName>
<FreeTerm>AnIDName</FreeTerm>
</IDName>
<UniqueID>01-wnpj-101000</UniqueID>
</ProgramIdentifier>
<ActionDataItem>
<href>
www.abc.com/content/news/101000/wnpj.xml#news-
item-8
</href>
</ActionDataItem>

</UserAction>
<UserAction>
<ActionTime>
<ActionMediaTime>
<MediaTimePoint>2000-10-
10T20:05:34</MediaTimePoint>
<MediaDuration>PT1M</MediaDuration>
</ActionMediaTime>
<ActionGeneralTime>
<TimePoint>2000-10-10T20:05:34-08:00</TimePoint>
<Duration>PT5S</Duration>
</ActionGeneralTime>
</ActionTime>
<ProgramIdentifier>
<IDOrganization>
<FreeTerm>AnIDOrg</FreeTerm>
</IDOrganization>

```
                <IDName>
                    <FreeTerm>AnIDName</FreeTerm>
                </IDName>
                <UniqueID>03-tss-000063</UniqueID>
            </ProgramIdentifier>
            <ActionDataItem>
                <href>
                    www.fox.com/xml/that70sshow/063/tss-063.xml#break_2
                </href
            </ActionDataItem>
        </UserAction>
</UserActionList>
<UserActionList id="ual-004" numInstances="1">
        <ActionType>
                <Label>ClickThrough</Label>
        </ActionType>
        <UserAction>
```

<ActionTime>
<ActionGeneralTime>
<TimePoint>2000-10-09T18:48:01-08:00</TimePoint>
</ActionGeneralTime>
</ActionTime>
<ProgramIdentifier>
<IDOrganization>
<FreeTerm>AnIDOrg</FreeTerm>
</IDOrganization>
<IDName>
<FreeTerm>AnIDName</FreeTerm>
</IDName>
<UniqueID>02-mnf-100900</UniqueID>
</ProgramIdentifier>
<ActionDataItem>
<href>
www.abc.com/content/mnf/100900/mnf-stream.xml#related_media_ID_12

</href>
</ActionDataItem>
</UserAction>
</UserActionList>
</UserActionHistory>
<UserChoiceHistory id="userchoice-history-001" protection="false">
<ObservationPeriod>
<TimePoint>2000-10-09T18:00-08:00</TimePoint>
<Duration>PT6H</Duration>
</ObservationPeriod>
<ObservationPeriod>
<TimePoint>2000-10-10T18:00-08:00</TimePoint>
<Duration>PT6H</Duration>
</ObservationPeriod>
<ClassificationHistory id="classification-hist-001"
numTotalInstances="24">
<CountryHistory id="country-hist-001"

numInstances="15"
totalDuration="PT7H22M>us</CountryHistory>
...
<GenreHistory id="genre-hist-001" numInstances="7"
totalDuration="PT2H23M" term="1.2.3"
scheme="AScheme">
<Label xml:lang="en">Football</Label>
</GenreHistory>
<GenreHistory id="genre-hist-002" numInstances="4"
totalDuration="PT1H46M" term="2.4" scheme="AScheme">
<Label xml:lang="en">Sitcom</Label>
</GenreHistory>
...
</ClassificationHistory>
<CreationHistory id="creation-hist-001"
numTotalInstances="26">
<TitleHistory xml:lang="en" id="title-hist-001" numInstances="26"

```
    totalDuration="PT2H23M">Monday Night
                        Football</TitleHistory>
...
<CreatorHistory id="creator-hist-001" numInstances="6"
    totalDuration="PT56M">
    <Role term="3.5.2" scheme="AnotherScheme">
      <Label>Actor</Label>
    </Role>
    <Person>
      <Name xml:lang>
        <GivenName>Jason Alexander</GivenName>
      </Name>
    </Person>
    <Character><GivenName>George
                  Costanza</GivenName></Character>
</CreatorHistory>
```

```
        </CreationHistory>
        <SourceHistory id="source-hist-001"
            numTotalInstances="22">
            ...
            <PublisherHistory xsi:type="OrganizationType"
                id="publisher-hist-001" numInstances="3"
                totalDuration="PT4H42M">
                <Name xml:lang="en">ABC</Name>
            </PublisherHistory>
            ...
            </SourceHistory>
        ...
    </UserChoiceHistory>
</UsageHistory>
```

Profile Updating

With the creation of a hierarchical description, either for the user preferences or the program description, the present inventors then determined that the traditional technique of only manually selecting those preferences with such a hierarchical scheme is unduly burdensome for the user. In contrast, the system preferably automatically generates and provides values to the hierarchical preferences for the user profile. In this manner, the user is alleviated from the need to select the location of data within such a structure. In many instances, it may be necessary for the system to define the hierarchical structure of the program description and/or user description so that the system has a suitable framework to which to include the data.

After consideration of the ability of the system to permit automatic updating of the user profile it was determined that this is suitable for many circumstances, but in other circumstances it is undesirable for the system to automatically update the user profile. For example, during experimentation with different content it may be undesirable for the system to automatically update the profile because the user may not actually prefer the content. As another example, during certain times the user may be viewing content more suitable for "adults", and the user may not desire that the user profile include preferences referring to such content. Normally, preferences are included within the user profile to indicate a positive preference or a negative preference for a vast number of such preferences. However, a system that is totally user selected ("manual") is burdensome for the user to characterize, while a system that is totally free from user selection ("automatic") may similarly be too flexible for the user.

Figure 55:
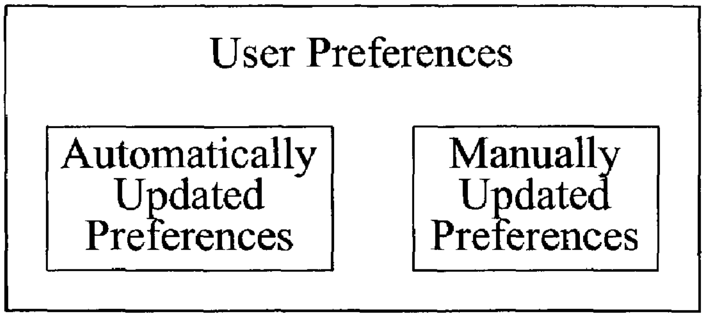
FIG. 55 illustrates manually updated and automatically updated user preferences.

Referring to FIG. 55 in such circumstances, it is desirable to include user preferences where a selected set of the preferences are user selected and thereafter are not automatically updated by the system, and where a selected set of other preferences are automatically created (or user selected) and thereafter are automatically updated by the system. Preferably, the automatically updated portion is different than and non-overlapping with the non-automatically updated portion. In some implementations, this may be considered as a set of "static" preferences and a set of "dynamic" preferences, both together within one set of user preferences for a user (although implementation may include separate files).

Figure 56:
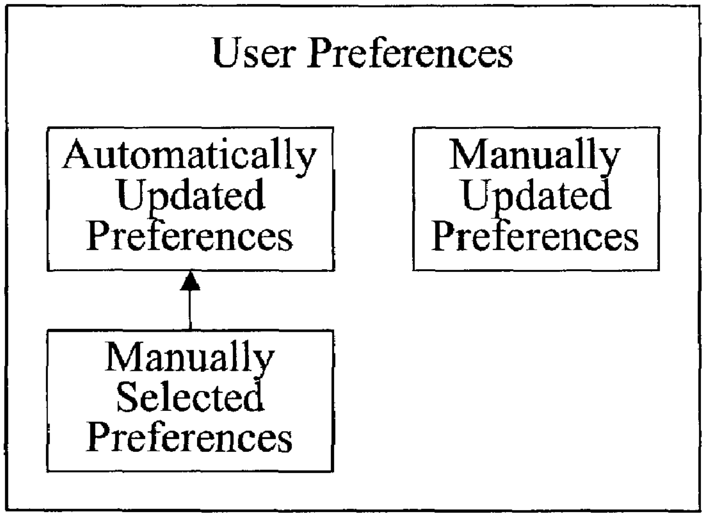
FIG. 56 illustrates manually selecting some of the automatically updated preferences.

Referring to FIG. 56 in some situations the automatically updated preferences may not provide sufficient control for the user. In such circumstances it is useful to permit both supervised and unsupervised modes of modification. The supervised mode of operation does not require explicit user input, as may be required in the manual mode of operation, but rather may make use of user input when available. Preferably the user is not required to indicate the type of content that the user likes, or to generate initial preferences (although the system may use user-authored preference descriptions when available), but rather, the user's actions are observed to infer the relevant information. In this manner, the user may specify portions of the automatically inferred preferences to customize the preferences.

Degree of Membership to Sets

While defining different weights of a preference value is an improement and preference values are good for computer processing and the exchange of data between computers, however, users may have difficulty assigning these values in a way that is meaningful to them. To overcome this limitation the user preferences preferably assign different degrees of membership in different sets. One way of providing different degrees of membership is to use fuzzy sets, which have semantic labels. In this manner the system models a persons likes and dislikes in a more convenient way.

Fuzzy Logic Development

Natural language abounds with vague and imprecise concepts, such as "Sally is tall," or "It is very hot today." Such statements are difficult to translate into more precise language without losing some of their semantic value: for example, the statement "Sally's height is 152 cm." does not explicitly state that she is tall, and the statement "Sally's height is 1.2 standard deviations about the mean height for women of her age in her culture" is fraught with difficulties. Would a woman 1.1999999 standard deviations above the mean be tall? Which culture does Sally belong to, and how is membership in it defined?

While it might be argued that such vagueness is an obstacle to clarity of meaning, only the most staunch traditionalists would hold that there is no loss of richness of meaning when statements such as "Sally is tall" are discarded from a language. Yet this is just what happens when one tries to translate human language into classic logic. Such a loss is not noticed in the development of a payroll program, perhaps, but when one wants to allow for natural language queries, or "knowledge representation" in expert systems, the meanings lost are often those being searched for.

For example, when one is designing an expert system to mimic the diagnostic powers of a physician, one of the major tasks is to codify the physician's decision-making process. The designer soon learns that the physician's view of the world, despite her dependence upon precise, scientific tests and measurements, incorporates evaluations of symptoms, and relationships between them, in a "fuzzy," intuitive manner. Deciding how much of a particular medication to administer will have as much to do with the physician's sense of the relative "strength" of the patient's symptoms as it will their height/weight ratio. While some of the decisions and calculations could be done using traditional logic, a fuzzy systems affords a broader, richer field of data and the manipulation of that data than do more traditional methods.

The precision of mathematics owes its success in large part to the efforts of Aristotle and the philosophers who preceded him. In their efforts to devise a concise theory of logic, and later mathematics, the so-called "Laws of Thought" were posited. One of these, the "Law of the Excluded Middle," states that every proposition must either be True or False. Even when Parminedes proposed the first version of this law (around 400 B.C.) there were strong and immediate objections: for example, Heraclitus proposed that things could be simultaneously True and not True.

It was Plato who laid the foundation for what would become fuzzy logic, indicating that there was a third region (beyond True and False) where these opposites "tumbled about." Other, more modern philosophers echoed his sentiments, notably Hegel, Marx, and Engels. But it was Lukasiewicz who first proposed a systematic alternative to the bi-valued logic of Aristotle.

In the early 1900's, Lukasiewicz described a three-valued logic, along with the mathematics to accompany it. The third value he proposed can best be translated as the term "possible," and he assigned it a numeric value between True and False. Eventually, he proposed an entire notation and axiomatic system from which he hoped to derive modern mathematics.

Later, he explored four-valued logics, five-valued logics, and then declared that in principle there was nothing to prevent the derivation of an infinite-valued logic. Lukasiewicz felt that three- and infinite-valued logics were the most intriguing, but he ultimately settled on a four-valued logic because it seemed to be the most easily adaptable to Aristotelian logic.

Knuth proposed a three-valued logic similar to Lukasiewicz's, from which he speculated that mathematics would become even more elegant than in traditional bi-valued logic. His insight, apparently missed by Lukasiewicz, was to use the integral range [−1, 0 +1] rather than [0, 1, 2]. Nonetheless, this alternative failed to gain acceptance, and has passed into relative obscurity.

The notion common to fuzzy systems is that truth values (in fuzzy logic) or membership values (in fuzzy sets) are indicated by a value on the range [0.0, 1.0], with 0.0 representing absolute Falseness and 1.0 representing absolute Truth. For example, let us take the statement: "Jane is old."

If Jane's age was 75, we might assign the statement the truth value of 0.80. The statement could be translated into set terminology as follows:

"Jane is a member of the set of old people."

This statement would be rendered symbolically with fuzzy sets as:

$$m\text{OLD(Jane)}=0.80$$

where m is the membership function, operating in this case on the fuzzy set of old people, which returns a value between 0.0 and 1.0.

At this juncture it is important to point out the distinction between fuzzy systems and probability. Both operate over the same numeric range, and at first glance both have similar values: 0.0 representing False (or non-membership), and 1.0 representing True (or membership). However, there is a distinction to be made between the two statements: The probabilistic approach yields the natural-language statement, "There is an 80% chance that Jane is old," while the fuzzy terminology corresponds to "Jane's degree of membership within the set of old people is 0.80." The semantic difference is significant: the first view supposes that Jane is or is not old (still caught in the Law of the Excluded Middle); it is just that we only have an 80% chance of knowing which set she is in. By contrast, fuzzy terminology supposes that Jane is "more or less" old, or some other term corresponding to the value of 0.80. Further distinctions arising out of the operations will be noted below.

The next step in establishing a complete system of fuzzy logic is to define the operations of EMPTY, EQUAL, COMPLEMENT (NOT), CONTAINMENT, UNION (OR), and INTERSECTION (AND). It is helpful to state some formal definitions:

Definition 1: Let X be some set of objects, with elements noted as x. Thus, X={x}.

Definition 2: A fuzzy set A in X is characterized by a membership function mA(x) which maps each point in X onto the real interval [0.0, 1.0]. As mA(x) approaches 1.0, the "grade of membership" of x in A increases.

Definition 3: A is EMPTY iff for all x, mA(x)=0.0.

Definition 4: A=B iff for all x: mA(x)=mB(x) [or, mA=mB].

Definition 5: mA'=1−mA.

Definition 6: A is CONTAINED in B iff mA<=mB.

Definition 7: C=A UNION B, where: mC(x)=MAX(mA(x), mB(x)).

Definition 8: C=A INTERSECTION B where: mC(x)=MIN(mA(x), mB(x)).

It is noted that the last two operations, UNION (OR) and INTERSECTION (AND), which represent the clearest point of departure from a probabilistic theory for sets to fuzzy sets. Operationally, the differences are as follows:

For independent events, the probabilistic operation for AND is multiplication, which (it can be argued) is counterintuitive for fuzzy systems. For example, let us presume that x=Bob, S is the fuzzy set of smart people, and T is the fuzzy set of tall people. Then, if mS(x)=0.90 and uT(x)=0.90, the probabilistic result would be:

$$mS(x)*mT(x)=0.81$$

whereas the fuzzy result would be:

$$MIN(uS(x), uT(x))=0.90$$

The probabilistic calculation yields a result that is lower than either of the two initial values, which when viewed as "the chance of knowing" makes good sense.

However, in fuzzy terms the two membership functions would read something like "Bob is very smart" and "Bob is very tall." If we presume for the sake of argument that "very" is a stronger term than "quite," and that we would correlate "quite" with the value 0.81, then the semantic difference becomes obvious. The probabilistic calculation would yield the statement If Bob is very smart, and Bob is very tall, then Bob is a quite tall, smart person. The fuzzy calculation, however, would yield If Bob is very smart, and Bob is very tall, then Bob is a very tall, smart person.

Another problem arises as we incorporate more factors into our equations (such as the fuzzy set of heavy people, etc.). We find that the ultimate result of a series of AND's approaches 0.0, even if all factors are initially high. Fuzzy theorists argue that this is wrong: that five factors of the value 0.90 (let us say, "very") AND'ed together, should yield a value of 0.90 (again, "very"), not 0.59 (perhaps equivalent to "somewhat").

Similarly, the probabilistic version of A OR B is (A+B−A*B), which approaches 1.0 as additional factors are considered. Fuzzy theorists argue that a sting of low membership grades should not produce a high membership grade instead, the limit of the resulting membership grade should be the strongest membership value in the collection.

Another feature common to fuzzy systems is the ability to define "hedges," or modifier of fuzzy values. These operations are provided in an effort to maintain close ties to natural language, and to allow for the generation of fuzzy statements through mathematical calculations. As such, the initial definition of hedges and operations upon them will be quite a subjective process and may vary from one project to another. Nonetheless, the system ultimately derived operates with the same formality as classic logic.

The simplest example is in which one transforms the statement "Jane is old" to "Jane is very old." The hedge "very" is usually defined as follows:

$$m\text{"very"}A(x)=mA(x)\hat{\ }2$$

Thus, if mOLD(Jane)=0.8, then mVERYOLD(Jane)=0.64. Other common hedges are "more or less" [typically SQRT(mA(x))], "somewhat," "rather," "sort of," and so on. Again, their definition is entirely subjective, but their operation is consistent: they serve to transform membership/truth values in a systematic manner according to standard mathematical functions.

It is noted that algorithmic procedures can be devised which translate "fuzzy" terminology into numeric values, perform reliable operations upon those values, and then return natural language statements in a reliable manner.

Fuzzy Profiles

One technique to provide a system that assigns different degrees of membership is to utilize a fuzzy inference system to process and interpret the available usage history data (data regarding content previously viewed). Fuzzy inference methods enable flexible, intuitive representation of system variables to utilize knowledge collected from individuals. An imprecise linguistic description that models how the system operates may be provided by an operator, in the form of a series of rules, which may be readily represented by fuzzy sets and operators. The rules that characterize the system can also be computed automatically from a training set through statistical analysis and data mining techniques.

It is to be understood that the proposed techniques described herein are likewise capable of handling a variety of applications and associated multimedia content types, such as for example, audio, video data, web pages, or content that is otherwise available to the user. The particular form of representation of the content, usage history, and user preference descriptions may be proprietary or in a standard-compliant format. Preferably the representation utilizes Extensible Markup Language (XML) and complies with the multimedia standards for MPEG-7 and TV Anytime. Both MPEG-7 and TV Anytime define description schemes for structured representation of content descriptions, usage history information, and preferences.

Fuzzy Implementation

Figure 57:
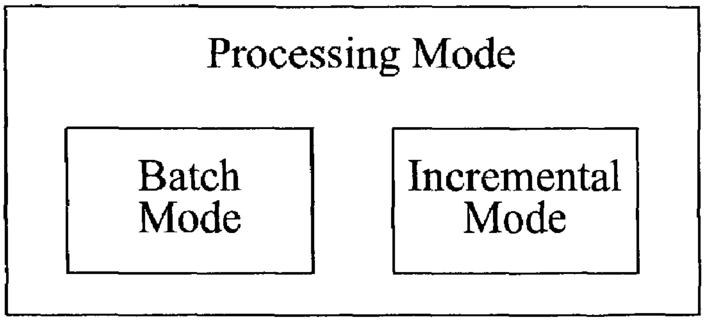
FIG. 57 illustrates batch mode and incremental mode.

Referring to FIG. 57, in general the preferred system incorporates two processing modes for generating and updating user preference descriptions: (i) a batch mode, where no initial user profile information is available, and (ii) incremental mode, where, given a user preferences description and entries in the usage history log, the available preference description is incrementally updated to reflect the changes in the viewing choices of the user. In the following description, two separate techniques are presented to address these two cases; however, the incremental technique by itself is also capable of batch-mode processing; i.e., it is able to construct a preference description from scratch using the available history information.

Figure 58:
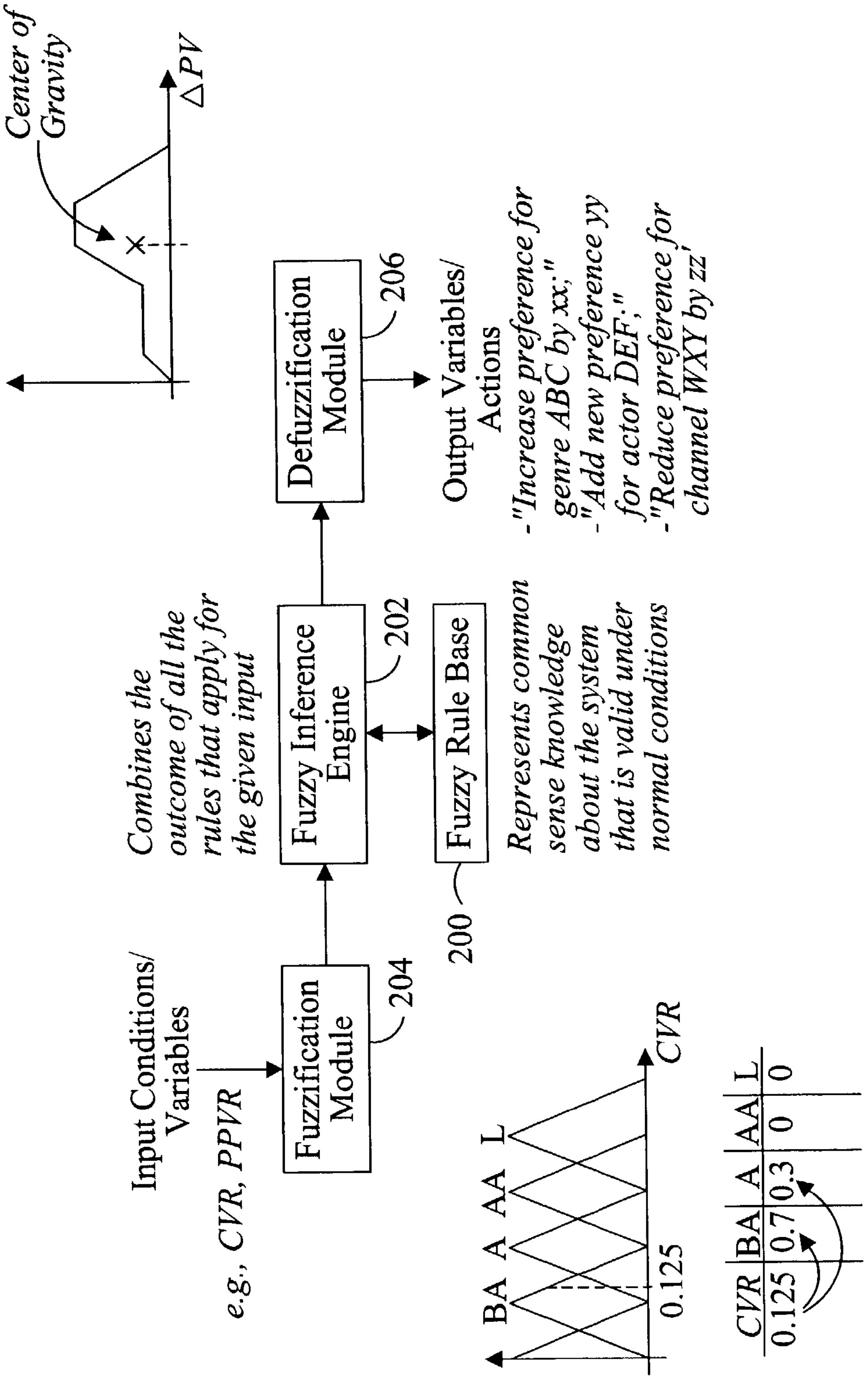
FIG. 58 illustrates fuzzy processing.

The fuzzy inference system readily addresses both of these issues, although other techniques may likewise be used. The fuzzy inference enables the formulation of a mapping between the input and output variables of a system using fuzzy logic. Referring to FIG. 58, a fuzzy inference system may be composed of four main stages; a fuzzy rule base 200, a fuzzy inference engine 202, a fuzzification module 204, and a defuzzification module 206.

Figure 59:
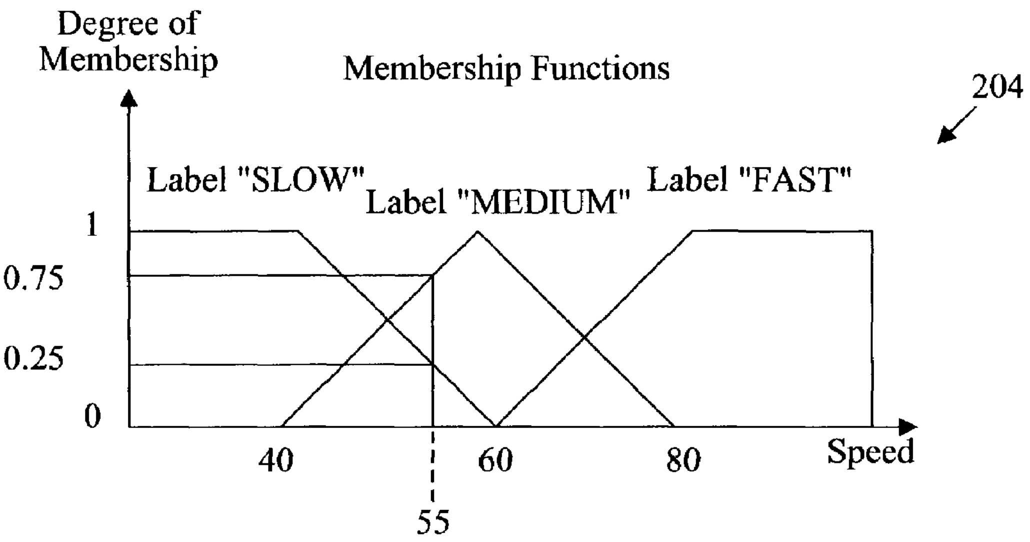
FIG. 59 illustrates degree of membership.

Referring to FIG. 59, the fuzzification module 204 makes the translation from real world values to "fuzzy" world values using membership functions. The example illustrated in FIG. 59 translates a speed=55 into fuzzy values (degree of membership) of slow=0.25, medium=0.75, and fast=0.00.

The fuzzy rule base 200 and fuzzy inference engine 202 may include the following rules for FIG. 59, for example. If speed=slow and home=far then gas=increase. Suppose slow=0.25 and far=0.82, then the rule strength will be 0.25 (the minimum value of the antecedents) and the fuzzy variable "increase" would also be 0.25. Another rule may be: If speed=medium and higher=secure, then gas=increase. Let the case be that medium=0.75 and secure=0.5, then the rule strength will be 0.5 (the minimum value of the antecedents) and the fuzzy variable increase would also be 0.5. So, this illustrates two rules involving the fuzzy variable "increase." The fuzzy "OR" of the two rules will be 0.5 (the maximum value between the two proposed values).

Figure 60:
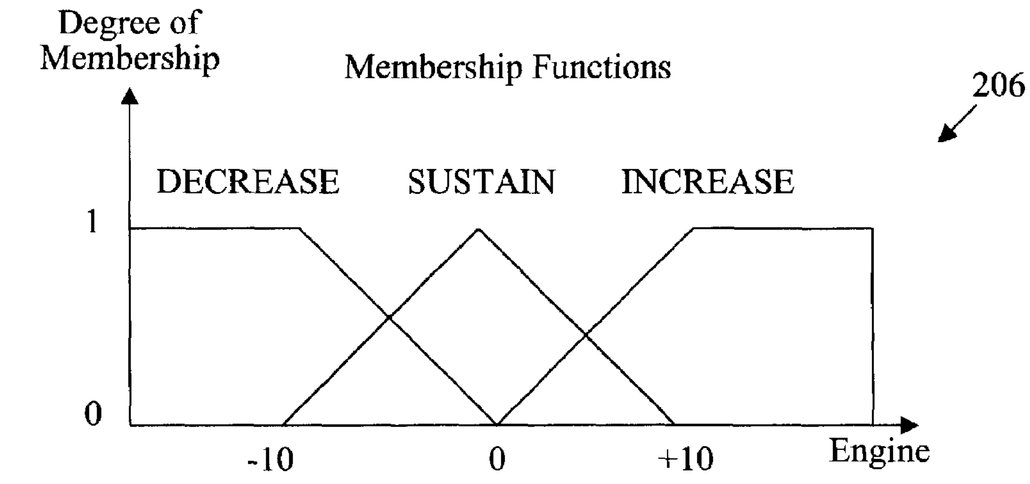
FIG. 60 illustrates membership functions.

The defuzzification module 206 occurs after computing the fuzzy rules and evaluating the fuzzy variables to translate the results back to the real world. Defuzzification uses a membership function for each output variable, such as those illustrated in FIG. 60. Each membership function may be clipped to the value of the correspondent fuzzy variable as illustrated in FIG. 61. A new output membership function is built, taking for each point in the horizontal axis, the maximum value between the three membership values, as illustrated in FIG. 62. To complete the defuzzification process, an equilibrium point may be determined. One technique to do this is with a center of gravity technique as illustrated in FIG. 63, which for the given example provides gives approximately COG≅2.6.

Stated another way, normally the relevant input and output variables for a fuzzy system, together with their range of values, are initially identified. Meaningful linguistic states for each variable are subsequently selected and expressed by appropriate fuzzy sets, which represent labels such as "small", "large", "approximately zero", etc. The fuzzy memberships of each crisp input value in the fuzzy sets are computed by the fuzzification module 204. The membership values are then used by the rule base 200, which may include a set of if-then statements that characterize the relationship between the input and output variables. Given a set of input values, the relevant rules may be evaluated using the corresponding fuzzy logical rules, resulting in a fuzzy set that is defined on the universe of possible actions or outcomes. In the defuzzification module 206, this fuzzy set is converted into a crisp value through defuzzification, as previously discussed.

Given the usage history information and the descriptions of the associated content, the system may first compute, for each description attribute or category of interest, a number of features. Different types of user actions serve as different interest indicators. For example, recording a TV program suggests that the user would like to view that program, while fast-forwarding through parts of a program implies that the user does not care about the content of those portions. These features are then interpreted by the fuzzy inference engine using the available rule base, and finally the appropriate action is taken by the system based on the output.

With respect to batch mode processing a set of input and output variables are introduced. These features take into account the amount of time the user interacts with given content, as well as the way the user interacts with it, to provide an indication of the user's interest in that type of content. The level of interest or affinity of a user for a given program may be modeled using a content affinity feature, such as:

$$CA_i = f(R_i)\bullet\sum_{k\in K}\omega_k A_{ik}$$

where $R_1$ denotes the ranking that the user has assigned to program i, $A_{ik}$ is the ratio of the duration of the kth action associated with i to the duration of I, and $\omega_k$ is the weight of the action. $f(R_i)$ is a function that determines how the user's ranking of the program influences his overall affinity for the program. Each user action is weighted by a coefficient ω that specifies the significance of the action. Actions like "skip" and "fast forward" can be assigned negative weights, since they point to a lack of interest by the user, while others like "record" and "repeat" may receive positive coefficients. The value of the coefficient for each action may be predefined, or determined through analysis of appropriate training data. Similarly, the value of $f(R_1)$ may be negative or less than 1 when the user ranking falls below average, and greater than 1 when the ranking exceeds the average. In the absence of an explicit user ranking or input, $f(R_1)$ is preferably set to 1, and CA is preferably determined through observation of user actions only. Since each user has a different ranking strategy, it may be appropriate to define the function $f(R_1)$ individually for each user, based on the user's ranking habits. For example, a user may be inclined to rank the majority of programs favorably, and assign poor rankings infrequently. In this case, a poor ranking proves more information of the user's interest in the program, and thus the weight of this particular ranking may be adjusted to reflect its significance. The ranking system for a particular user may be determined by computing the probability of each ranking value over a training set of programs.

Using the content affinity (CA) for a program, the system may readily compute an average content affinity (ACA) for a particular description category. A category is a general term that corresponds to a particular value or value range of the descriptive attribute in consideration, such as genre, program title, actor, etc. An example of a category is "the genre attribute has the value comedy." ACA preferably considers all the programs or content that belongs to a particular category of interest (e.g., belonging to a particular genre, or starring a specific actor) to determine the average affinity of the user for an arbitrary program in that category:

$$ACA = (1/|L|)\sum_{i\epsilon L} CA_i$$

where L is a set of programs in the user's history that belong to the category of interest, and |L| denotes the cardinality of L. It is expected that ACA will be large for categories of content that the user likes. ACA constitutes the first input variable of the fuzzy inference system for batch mode processing.

The second input variable for batch mode processing is category affinity ratio, or CAR, which represents the user's affinity for a particular category instance relative to other instances in the given category. CAR may be computed as follows:

$$CAR = \left(\left(\sum_{i\epsilon L} CA_i\right) \Big/ \left(\sum_{p\epsilon P} CA_i\right)\right)$$

L is the number of programs in the user's history that belong to the category of interest, (e.g., all movies in the usage history that belong to the "comedy" genre, or all sitcomes that star Jerry Seinfeld), and P is the set of all programs. It is expected that the higher the user's preference for a particular category, the larger the value of the CAR attribute. For example, in the genre category, if the CAR value for "comedy" is greater than that of "drama," it implies that the user enjoys comedy programs more.

The output variable for the inference system is the preference value, of pV, which denotes the user's preference associated with a particular category based on the two inputs. The pV ranges between 0 and 100. Negative preference values may be assigned in batch processing mode, if desired.

In one embodiment by way of example, the system considers a single action ("view") for computation of the input feature values, and assigns the weight of "1" to this action. In the unsupervised case, no user ranking about programs is available; hence the value of $f(R_1)$ is also set to "1". The average category affinity feature becomes analogous to the average viewing ratio for programs from a particular category. For example, if a viewer has watched 10 minutes of a 30-minute comedy program, and 15 minutes of another, then ACA for comedy programs is (10/30+15/30)/2=5/12. Similarly, category affinity ratio represents the amount of time spent by the user viewing programs from a particular category instance relative to the other instances in the given category. For example, if a user has viewed 2 hours of comedy programs, 1.5 hours of news, and 30 minutes of sports, then the CAR for the three genres will be 2/4=0.5, 1.5/4=0.375, and 0.5/4=0.125, respectively.

Figure 64:
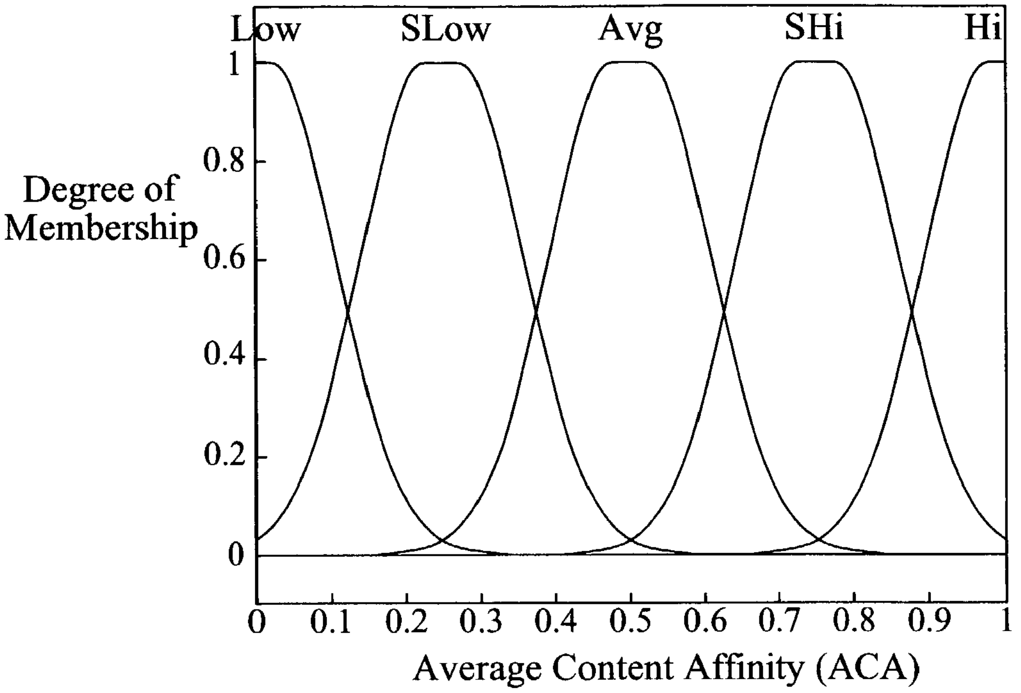
FIG. 64 illustrates average content affinity.
Figure 65:
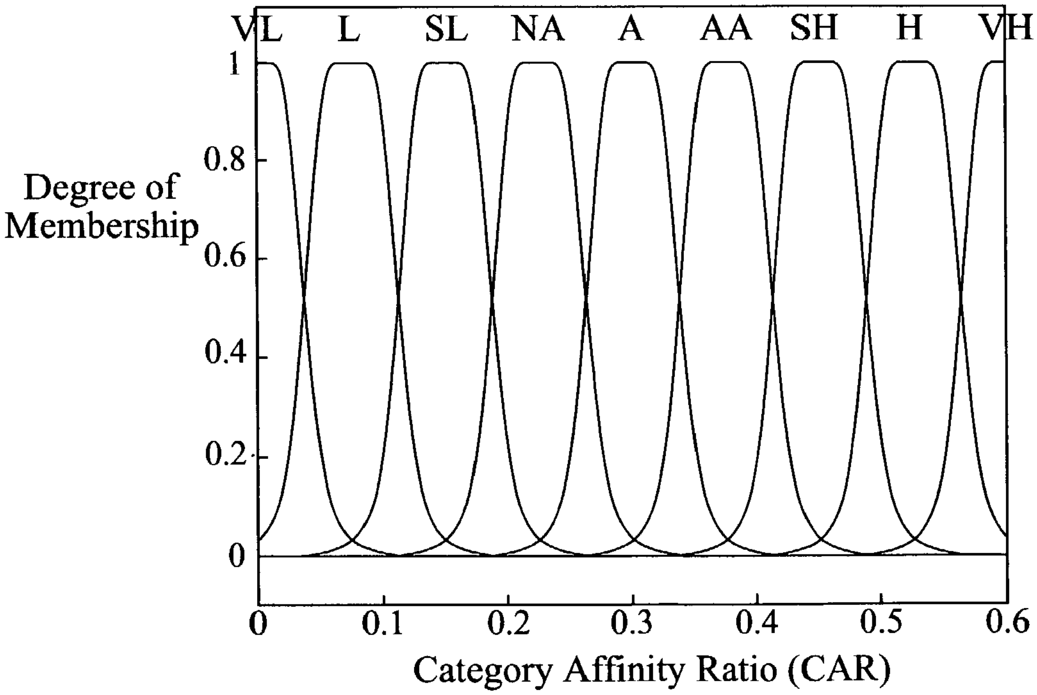
FIG. 65 illustrates category affinity ratio.
Figure 66:
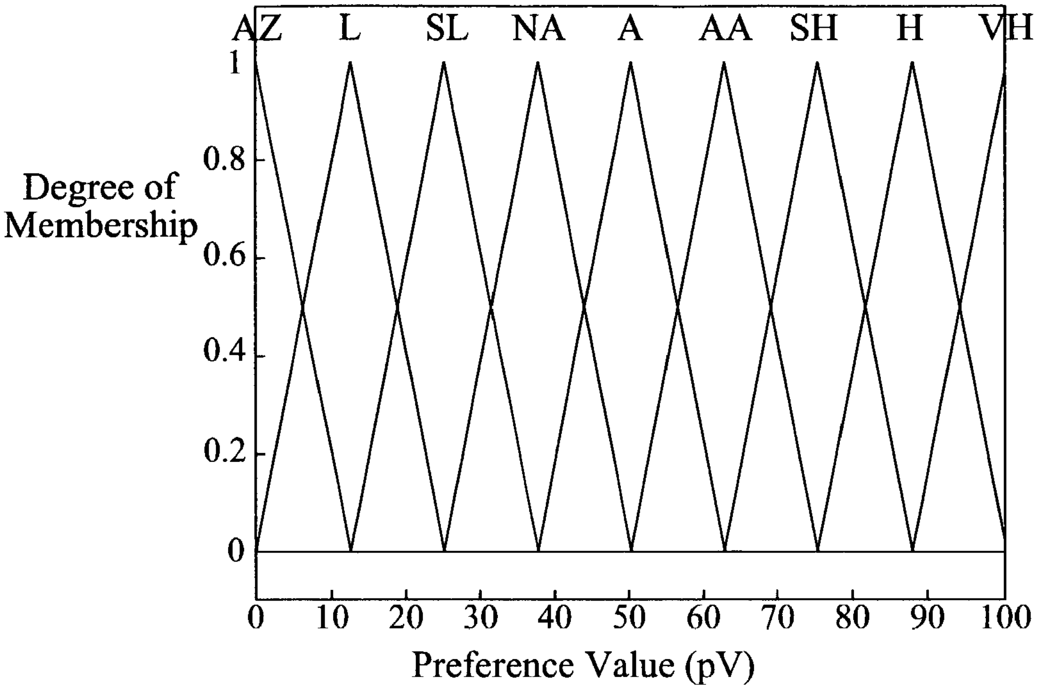
FIG. 66 illustrates preference value.
Figure 67:
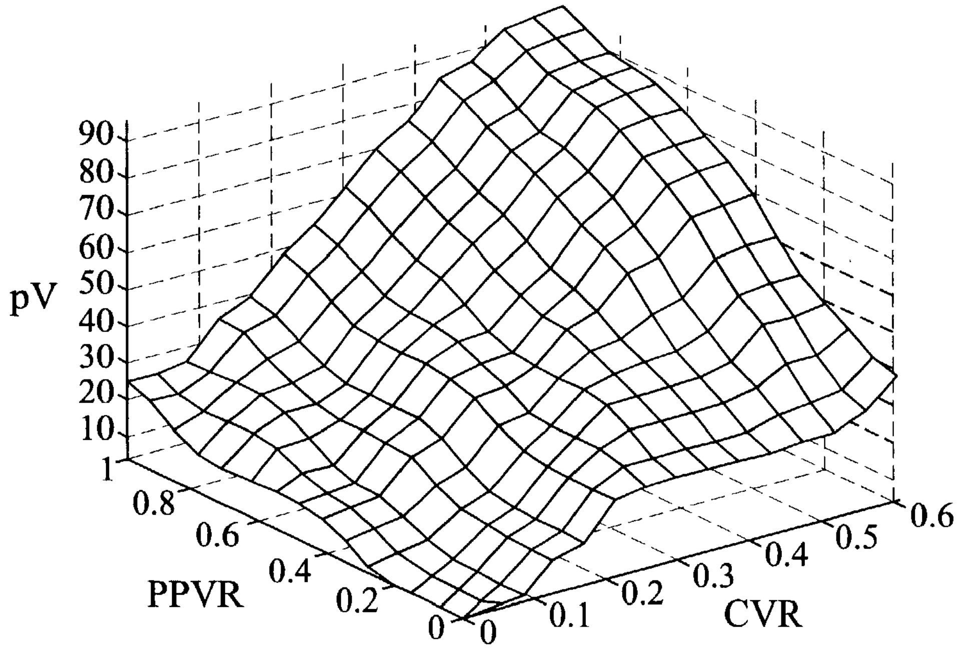
FIG. 67 illustrates a graph of pV, PPVR, and CVR.

The membership functions for the two input variables, ACA and CAR, are illustrated in FIG. 64 and FIG. 65, respectively. The membership functions for pV are depicted in FIG. 66. A surface plot that describes the input-output relationships outlined by the specified inference rules is shown in FIG. 67. Note that other states and membership functions can also be used to model these variables, depending on the requirements of the particular application.

Figure 68:
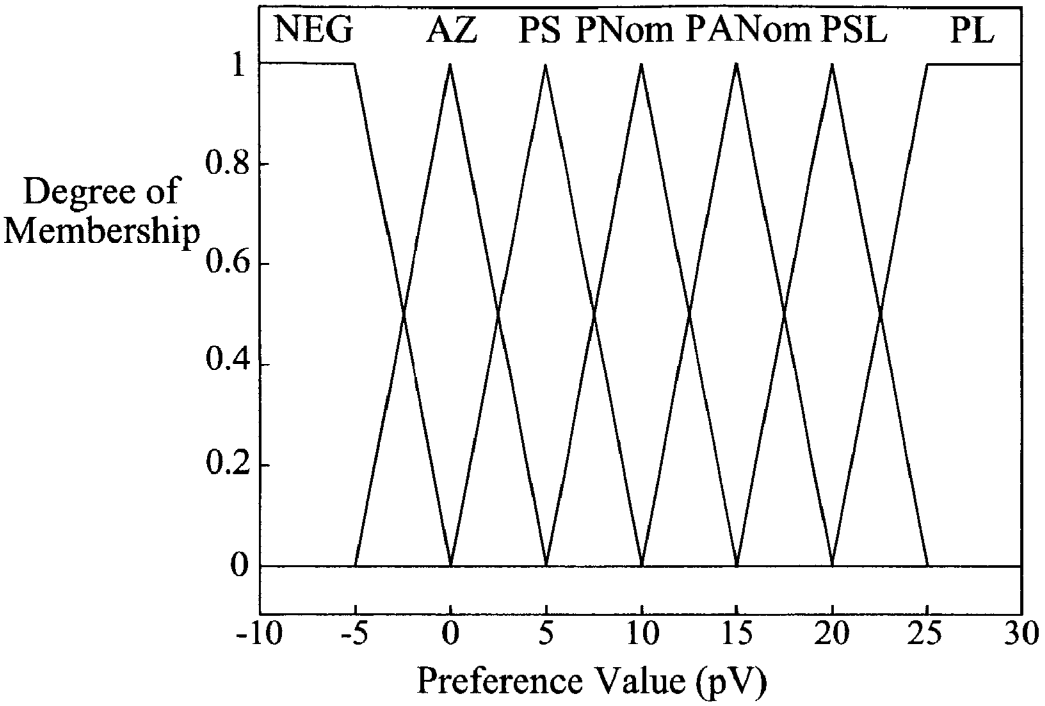
FIG. 68 illustrates pV.

The fuzzy inference system for incremental mode processing may include three input variables and one output variable, for example. The first input variable for the incremental inference system is pV, the current preference value for the preference attribute of interest. The pV can take on positive and negative values, with negative numbers denoting user's dislike. For the preferred system, 7 input states are defined for pV, as illustrated in FIG. 68. It is noted that these functions are different from those used for the same variable in batch mode processing; this is due to the different requirements of the two applications. Other states and membership functions may likewise be used to model this input variable, depending on the requirements of the particular application.

Figure 69:
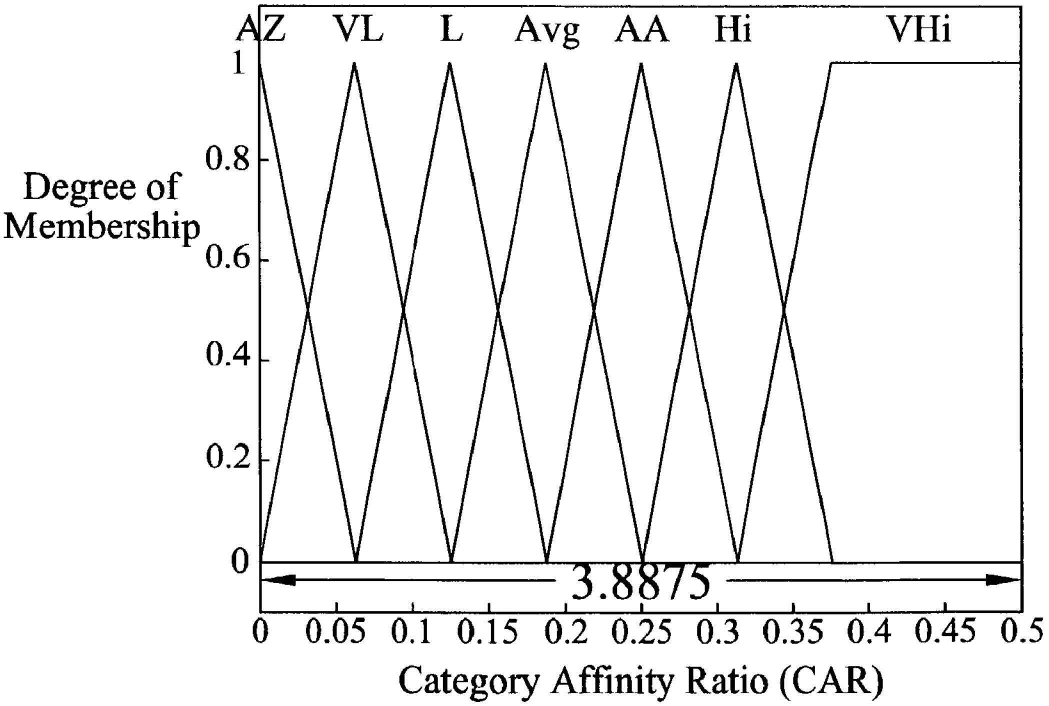
FIG. 69 illustrates category affinity ratio.

The second input variable is current category affinity ratio (CAR) for the attribute of interest, as previously discussed. The membership functions for this variable are illustrated in FIG. 69. It is noted that these functions are different from those used for the same variable in batch mode processing; this is due to the different requirements of the two applications. Other states and membership functions may likewise be used to model this input variable, depending on the requirements of the particular application.

Figure 70:
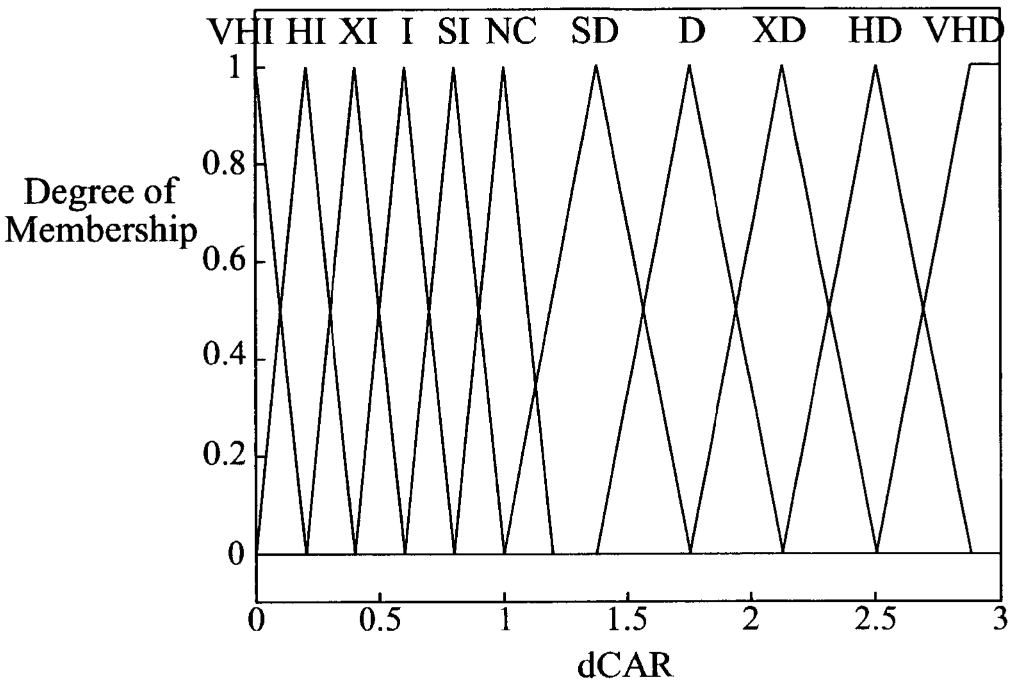
FIG. 70 illustrates dCAR.

The third input variable, dCAR, measures the amount of change between the previous and current category affinity ratios (CARs) for a particular content description category (e.g., genre). dCAR is defined as the ratio of prior and current CARs, i.e., $$dCAR = \frac{CAR^-}{CAR}$$

where $CAR^-$ and CAR denote the previous and present category viewing ratios, respectively. When dCAR is in the range [0,1), this indicates that the viewing ratio for the given category has increased since the last update; whereas $dCAR\epsilon(1,\infty)$ implies a drop of the viewing ratio. The membership functions for this variable are illustrated in FIG. 70. It is noted that these functions are different from those used for the same variable in batch mode processing; this is due to the different requirements of the two applications. Other states and membership functions may likewise be used to model this input variable, depending on the requirements of the particular application.

Figure 71:
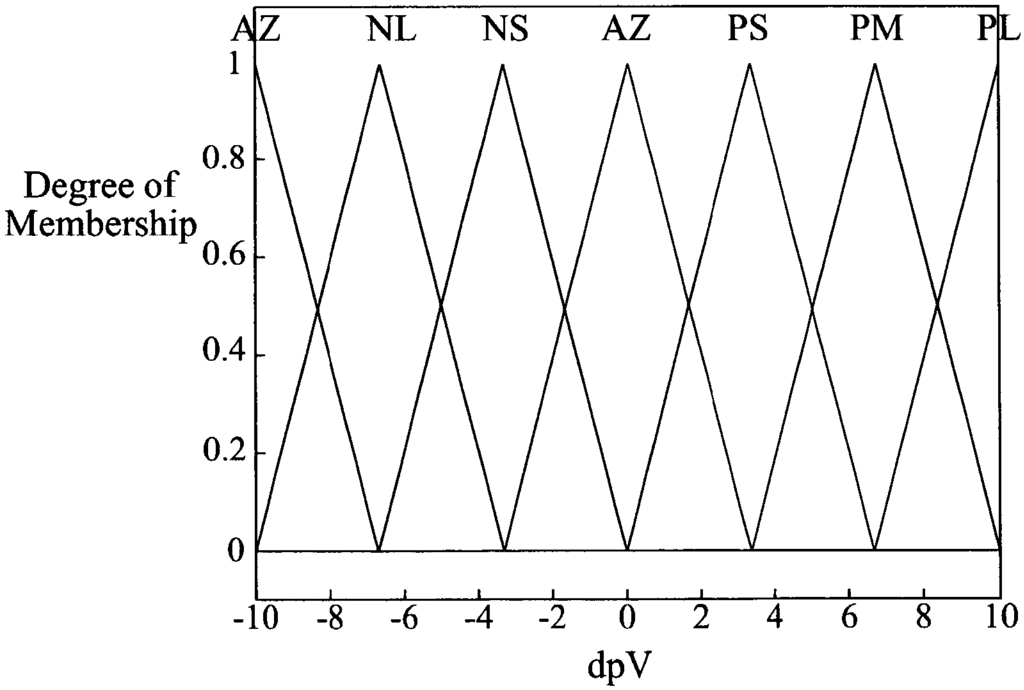
FIG. 71 illustrates dpV.

The output variable is the change in preference value, or dpV, which specifies how much the present preference value for the given category should be incremented or decremented. In the preferred embodiment, dpV ranges between −10 and 10. The 7 states and the corresponding membership functions for the output variable are illustrated in FIG. 71. It is noted that these functions are different from those used for the same variable in batch mode processing; this is due to the different requirements of the two applications. Other states and membership functions may likewise be used to model the first input variable, depending on the requirements of the particular application.

Figure 72:
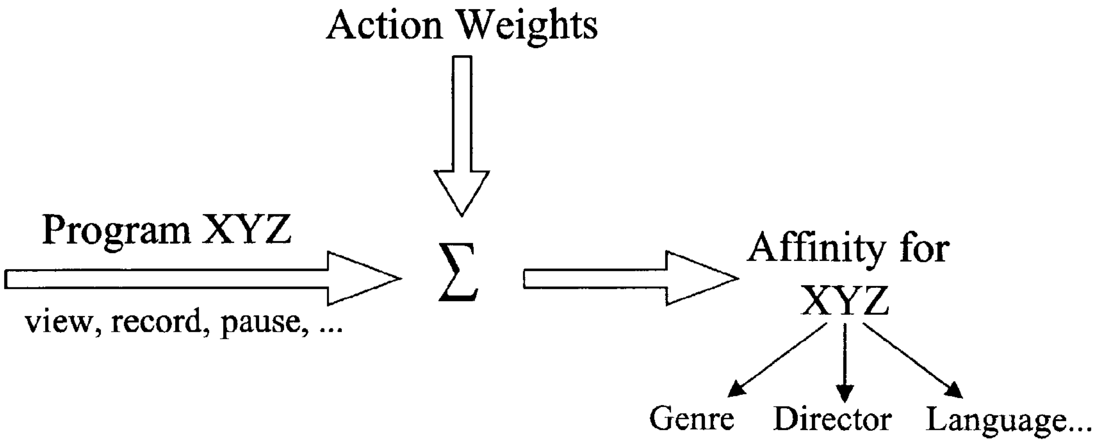
FIG. 72 illustrates program actions, action weights, and the resulting affinity.
Figure 73:
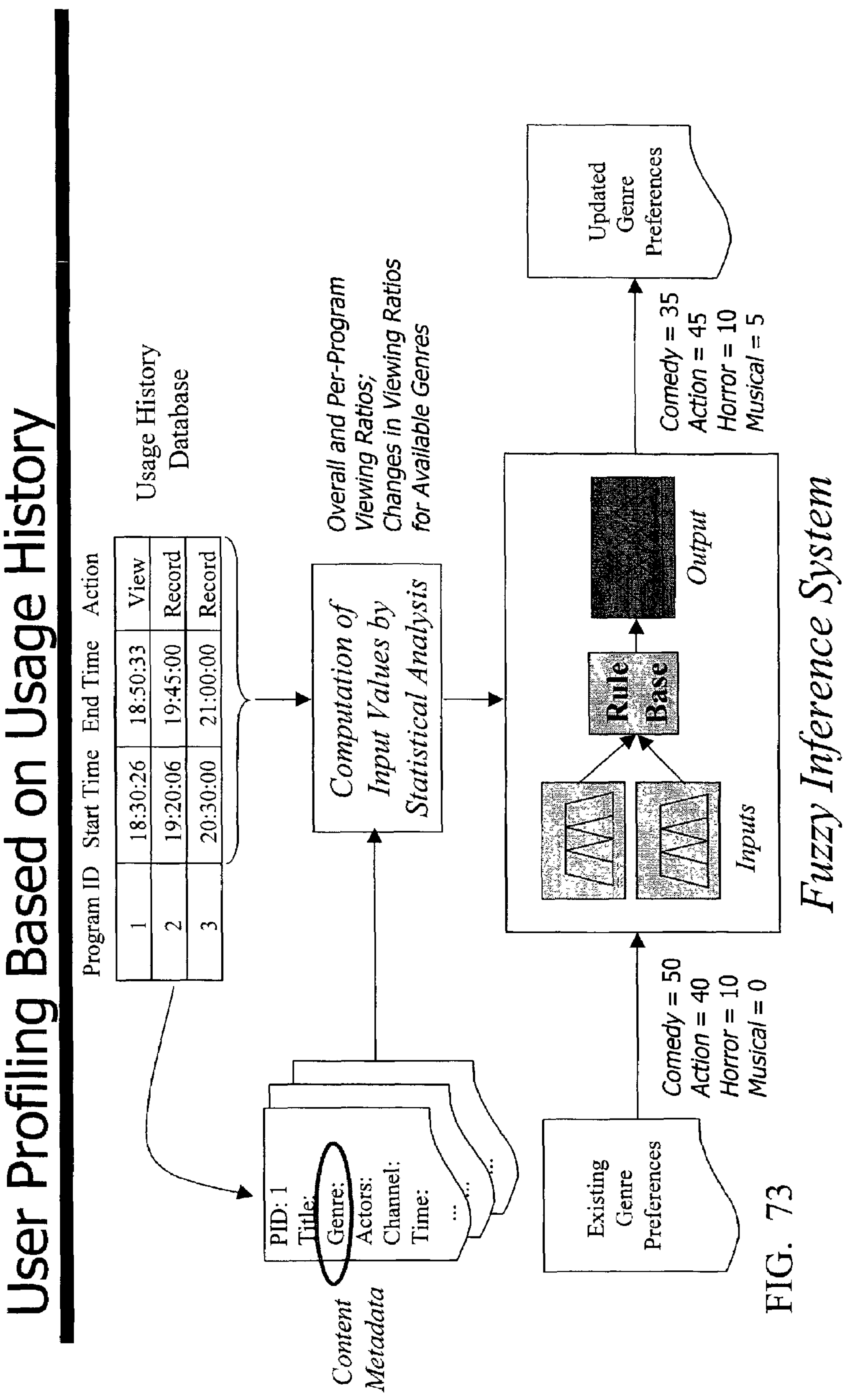
FIG. 73 illustrates user profiling based on usage history.

Referring to FIG. 72, by way of example a system may include the user's interactions with a program indicating his level of interest or affinity for that particular program. With each type of action (e.g., view, record, pause, fast-forward, rewind, replay, etc.) this may influence the affinity in different ways. The affinity for the program may likewise be used to indicate the affinity for the attributes of the program. A more complete system is illustrated in FIG. 73 with the preference values being modified based upon interaction with the program.

Normally the traditional techniques used for updating the filtering is based upon the prior user's actions and selections. After further consideration, the present inventors realized that the choices by one user, such as selecting both Die Hard II as desirable and Lethal Weapon II as desirable, may be used as the basis for supplementing another user's profile. Accordingly, without any additional effort by the user, the user's profile may be supplemented to reflect additional information that may more accurately reflect the user's desires, albeit potentially unknown to the user. In addition, the user may be presented options to incorporate additional potentially desirable content based upon the other user profiles. These options for example could be presented to the user from which the user selects additional potentially desirable content or descriptors, or otherwise automatic upon activation, if desired. A2

Figure 74:
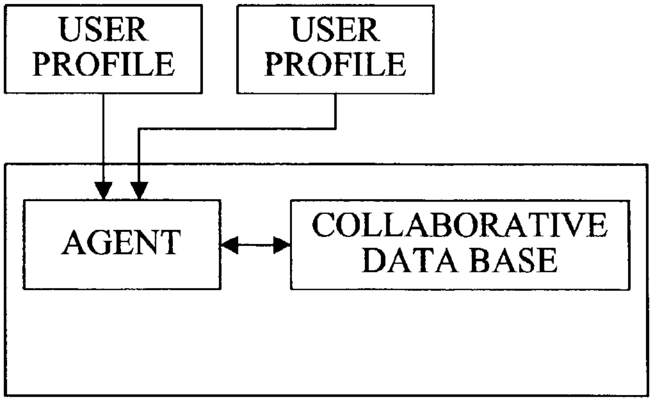
FIG. 74 illustrates multiple user profiles, an agent, and a collaborative data base.

The user profiling and filtering framework, previously described, has the ability to perform both information and collaborative filtering. FIG. 74 illustrates one such system. Collaborative filtering aims to identify similar users, and then recommend to a user items that have been consumed and enjoyed by others with similar tastes. One potential technique is to rely on explicit user ratings assigned to individual items to cluster together users with similar likes and dislikes. In addition, the system may identify similar users by considering their user profiles. Such a comparison will enable the system to group users with similar taste together, and therefore to extend the recommendations made to a particular user; e.g., augment the filtering results obtained for user A's profile, by the results obtained for user B's. It is noted that the profiles of user A and user B might be somewhat different from each other, but they are sufficiently close to infer similar tastes between the two users.

After further consideration of the present inventors came to the realization that the same approach used for information filtering (i.e., matching content descriptions to user profile descriptions) may be utilized directly for user profile comparison. Since the filtering agent may be designed to compare two closely harmonized hierarchical structures, it may also be used as-is to compare two user profile descriptions.

Existing techniques primarily make use of a narrow piece of the available usage history, namely an explicit user rating. The present inventors further determined that the system may compute user similarity on the basis of, at least in part, (a) the type of each user action (as part of the history) comes from an extensible dictionary and (b) the fact that the system can associate a time with each user action. The extensible dictionary permits the system to function on the basis of any type of associated action including a user rating. The associated time permits the system to refine its user matching method, esp. in cases such as TV watching, and provide better recommendations. One example is based on time of day, i.e., what a user watched in the morning can be separated from what he/she watched in the evening. Another example is based on day of the week.

A method to compute actual similarity could use vector similarity. A usage history could be represented by multiple vectors and similarity could be a weighted average of similarity of the individual vectors.

The invention claimed is:

1. A method of describing video content comprising:

(a) an electronic processing device receiving a profile that contains a plurality of preferences that each have non-binary values that together describe video content that is potentially desirable to a user, said values each indicating a degree of desirability of a respective said preference to said user, and providing a mapping table used by a fuzzy inference system to combine a plurality of said preferences into a single test that is applied to program content descriptions so as to automatically identify programming preferable to said user, where said mapping table includes at least one combinatorial operator, and said fuzzy inference system is capable of using any soft said combinatorial operator present in said mapping table when combining said preferences into said single test, where said soft combinatorial operator alters a logical combinatorial operation to provide a different, non-zero value than the altered said logical combinatorial operation, by using a content affinity function that measures the relationship between a user's affinity for respective said preferences and the said non-binary values associated with said preferences;

(b) said processing device automatically modifying said profile based upon video content manually selected by said user; and (c) wherein said plurality of different preferences have different weights relative to each other, said weights being independent of the respective said values of said plurality of preferences.

2. The method of claim 1 wherein said modifying includes adding additional preferences to said profile.

3. The method of claim 1 wherein said modifying includes removing preferences from said profile.

4. The method of claim 3 wherein said removing is at least partially based on a temporal time period.

5. The method of claim 1 wherein user preferences included in said mapping table are automatically selected based upon input said program content descriptions.

6. The method of claim 2 wherein said additional preferences are added without user intervention.

7. The method of claim 1 wherein said different weights may be selectively modified.

8. The method of claim 1 wherein said user may select desired said combinatorial operators when creating a said profile, at least one selectable said combinatorial operator being a soft said combinatorial operator.

9. A method of describing video content comprising:

(a) an electronic processing device receiving a stored profile that contains a plurality of preferences that together describe video content that is potentially desirable to a user, each preference including a field for storing a value indicative of the desirability of an attribute of program content, and providing a mapping table used by a fuzzy inference system to combine a plurality of said preferences into a single test that is applied to program content descriptions so as to automatically identify programming preferable to said user, where said mapping table includes at least one combinatorial operator, and said fuzzy inference system is capable of using any soft said combinatorial operator present in said mapping table when combining said preferences into said single test, where said soft combinatorial operator alters a logical combinatorial operation to provide a different, non-zero value than the altered said logical combinatorial operation, by using a content affinity function that measures the relationship between a user's affinity for respective said preferences and the said non-binary values associated with said preferences;

(b) said processing device removing preferences, including an associated said field of removed said preferences, from said profile and free from intervention from said user.

10. The method of claim 9 wherein said removing of preferences is at least partially based on a temporal time period.

11. The method of claim 10 wherein said removing of preferences is based upon other preferences being added to said profile.

12. A method of modifying a profile of a user comprising:

(a) an electronic processing device receiving said profile that contains a plurality of preferences that together describe video content that is potentially desirable to said user and providing a mapping table used by a fuzzy inference system to combine a plurality of said preferences into a single test that is applied to program content descriptions so as to automatically identify programming preferable to said user, where said mapping table includes at least one combinatorial operator, and said fuzzy inference system is capable of using any soft said combinatorial operator present in said mapping table when combining said preferences into said single test, where said soft combinatorial operator alters a logical combinatorial operation to provide a different, non-zero value than the altered said logical combinatorial operation, by using a content affinity function that measures the relationship between a user's affinity for respective said preferences and the said non-binary values associated with said preferences;

(b) said processing device modifying said profile based upon video content selected by said user and free from intervention by said user; and (c) wherein said plurality of preferences are weighted in a hierarchical order.

13. The method of claim 12 wherein said modifying includes adding additional preferences to said profile.

14. The method of claim 12 wherein said modifying includes removing preferences from said profile.

15. The method of claim 12 wherein said preferences include an associated preference weight.

16. A method of describing to video content comprising:

(a) an electronic processing device receiving a stored user profile that contains a plurality of preferences that together describe video content that is potentially desirable to a user and providing a mapping table used by a fuzzy inference system to combine a plurality of said preferences into a single test that is applied to program content descriptions so as to automatically identify programming preferable to said user, where said mapping table includes at least one combinatorial operator, and said fuzzy inference system is capable of using any soft said combinatorial operator present in said mapping table when combining said preferences into said single test, where said soft combinatorial operator alters a logical combinatorial operation to provide a different, non-zero value than the altered said logical combinatorial operation, by using a content affinity function that measures the relationship between a user's affinity for respective said preferences and the said non-binary values associated with said preferences;

(b) said processing device modifying at least a first portion of said stored user profile based upon video content selected by said user free from intervention by said user; and (c) said processing device modifying at least a second portion of said profile based upon video content selected by said user with intervention by said user.

17. The method of claim 16 wherein said first portion is different than said second portion.

18. The method of claim 17 wherein said first portion and said second portion are non-overlapping.

19. A method of modifying a profile of a user comprising:

(a) an electronic processing device receiving said profile that contains a plurality of preferences that together describe video content that is potentially desirable to said user and providing a mapping table used by a fuzzy inference system to combine a plurality of said preferences into a single test that is applied to program content descriptions so as to automatically identify programming preferable to said user, where said mapping table includes at least one combinatorial operator, and said fuzzy inference system is capable of using any soft said combinatorial operator present in said mapping table when combining said preferences into said single test, where said soft combinatorial operator alters a logical combinatorial operation to provide a different, non-zero value than the altered said logical combinatorial operation, by using a content affinity function that measures the relationship between a user's affinity for respective said preferences and the said non-binary values associated with said preferences;

(b) said processing device automatically modifying said profile based upon video content selected by said user; and (c) wherein said modification is based upon different degrees of membership of said preferences in different sets of said preferences.

20. The method of claim 19 wherein said modification includes mapping using a rule base, a fuzzy inference engine, a fuzzification module, and a defuzzification module.

21. The method of claim 19 wherein said modification is based, at least in part, upon the duration that a particular video is viewed.

22. The method of claim 19 wherein said modification is different, based, at least in part, upon said user viewing a portion of a video and said user viewing the entire said video.

23. The method of claim 19 wherein said modification is based upon how said user interacts with said video.

24. The method of claim 23 wherein said interaction is fast forward.

25. The method of claim 23 wherein said interaction is skip.

26. The method of claim 23 wherein said interaction is repeat.

27. The method of claim 23 wherein said interaction is record.

28. A method of modifying a profile of a user comprising:

(a) an electronic processing device receiving said profile that contains a plurality of preferences that together describe audio content that is potentially desirable to said user and providing a mapping table used by a fuzzy inference system to combine a plurality of said preferences into a single test that is applied to program content descriptions so as to automatically identify programming preferable to said user, where said mapping table includes at least one combinatorial operator, and said fuzzy inference system is capable of using any soft said combinatorial operator present in said mapping table when combining said preferences into said single test, where said soft combinatorial operator alters a logical combinatorial operation to provide a different, non-zero value than the altered said logical combinatorial operation, by using a content affinity function that measures the relationship between a user's affinity for respective said preferences and the said non-binary values associated with said preferences;

(b) said processing device automatically modifying said profile based upon audio content selected by said user; and (c) wherein said modification is based upon different degrees of membership of said preferences in different sets of said preferences.

29. The method of claim 28 wherein said modified includes mapping using a rule base, a fuzzy inference engine, a fuzzification module, and a defuzzification module.

30. The method of claim 28 wherein said modification is based, at least in part, upon the duration that a particular audio is listened to.

31. The method of claim 28 wherein said modification is different, based, at least in part, upon said user listening to a portion of a audio and said listener listening to the entire said audio.

32. The method of claim 28 wherein said modification is based upon how said user interacts with said audio.

33. The method of claim 32 wherein said interaction is fast forward.

34. The method of claim 32 wherein said interaction is skip.

35. The method of claim 32 wherein said interaction is repeat.

36. The method of claim 32 wherein said interaction is record.

* * * * *

UNITED STATES PATENT AND TRADEMARK OFFICE

CERTIFICATE OF CORRECTION

PATENT NO. : 7,657,907 B2
APPLICATION NO. : 10/261550
DATED : February 2, 2010
INVENTOR(S) : A. Mufit Ferman et al.

It is certified that error appears in the above-identified patent and that said Letters Patent is hereby corrected as shown below:

On the title page item (75),
Change "A. Mufit Fennan" to --A. Mufit Ferman--.

Signed and Sealed this

Twenty-third Day of March, 2010

David J. Kappos
*Director of the United States Patent and Trademark Office*